(12) United States Patent
Mihota

(10) Patent No.: US 8,988,993 B2
(45) Date of Patent: Mar. 24, 2015

(54) WIRELESS TRANSMISSION SYSTEM, WIRELESS COMMUNICATION DEVICE AND WIRELESS TRANSMISSION METHOD

(71) Applicant: Sony Corporation, Tokyo (JP)

(72) Inventor: Norihito Mihota, Saitama (JP)

(73) Assignee: Sony Corporation, Tokyo (JP)

( * ) Notice: Subject to any disclaimer, the term of this patent is extended or adjusted under 35 U.S.C. 154(b) by 37 days.

(21) Appl. No.: 13/892,565

(22) Filed: May 13, 2013

(65) Prior Publication Data
US 2013/0258834 A1 Oct. 3, 2013

Related U.S. Application Data

(63) Continuation of application No. 12/805,929, filed on Aug. 25, 2010, now Pat. No. 8,451,720.

(30) Foreign Application Priority Data

Sep. 29, 2009 (JP) .................................. 2009-223682

(51) Int. Cl.
*H04B 7/02* (2006.01)
*H04B 7/06* (2006.01)

(52) U.S. Cl.
CPC ............ *H04B 7/0697* (2013.01); *H04B 7/0682* (2013.01)
USPC ............ 370/229; 370/329; 375/267; 375/271

(58) Field of Classification Search
USPC ........... 370/252, 328, 329, 229; 375/267, 271
See application file for complete search history.

(56) References Cited

U.S. PATENT DOCUMENTS 6,608,875 B1   8/2003   Wolaver
2002/0080897 A1   6/2002   Main et al.
(Continued)

FOREIGN PATENT DOCUMENTS

EP   1 484 843 A1   12/2004
EP   1 821 418 A2   8/2007
(Continued)

OTHER PUBLICATIONS

Japanese Office Action issued Aug. 13, 2013 for corresponding Japanese Application No. 2009-200118.
(Continued)

*Primary Examiner* — Kerri Rose
(74) *Attorney, Agent, or Firm* — Rader, Fishman & Grauer PLLC

(57) ABSTRACT

A wireless transmission system including antenna pairs, a demodulation functional unit, and a transmission characteristic correction unit. The antenna pairs include transmission and reception antennae. A desired wave arrives at a reception antenna in a wireless signal from one transmission antenna. Meanwhile, the reception antenna receives an unnecessary wave in a wireless signal transmitted from a different transmission antenna. The demodulation functional unit corresponding to each antenna pair demodulates a signal received by the reception antenna. The transmission characteristic correction unit carries out correction calculation based on a transmission characteristic of a transmission space between the transmission and reception antennae based on demodulation signals demodulated by the demodulation functional units to acquire an output signal corresponding to a transmission subject signal.

20 Claims, 33 Drawing Sheets

(56) References Cited

U.S. PATENT DOCUMENTS

| | | |
|---|---|---|
| 2004/0002364 A1 | 1/2004 | Trikkonen et al. |
| 2005/0141631 A1 | 6/2005 | Takano |
| 2005/0226355 A1 | 10/2005 | Kibune et al. |
| 2007/0132521 A1 | 6/2007 | Lee et al. |
| 2009/0067402 A1 | 3/2009 | Forenza et al. |
| 2010/0020757 A1 | 1/2010 | Walton et al. |
| 2011/0064036 A1 | 3/2011 | Tsai et al. |
| 2011/0194591 A1 | 8/2011 | Agee et al. |

FOREIGN PATENT DOCUMENTS

| | | |
|---|---|---|
| JP | 2003-179516 A | 6/2003 |
| JP | 2003-244016 A | 8/2003 |
| JP | 2005-303607 A | 10/2005 |
| JP | 2007-228499 A | 9/2007 |
| JP | 2008-535272 A | 8/2008 |
| JP | 2008-252566 A | 10/2008 |
| JP | 2008-271188 A | 11/2008 |
| JP | 2008-541639 A | 11/2008 |
| JP | 2009-033588 | 2/2009 |
| JP | 2009-049632 | 3/2009 |
| JP | 2009-055228 | 3/2009 |
| JP | 2009-182894 A | 8/2009 |
| JP | 2009-246764 A | 10/2009 |
| JP | 4708241 B2 | 6/2011 |
| WO | WO-01/58018 A2 | 8/2001 |
| WO | WO-2009/017230 A1 | 2/2009 |
| WO | WO-2009/026400 A1 | 2/2009 |

OTHER PUBLICATIONS

Chinese Office Action issued Dec. 4, 2013 for corresponding Chinese Application No. 201080048039.0.

Japanese Office Action issued Oct. 22, 2013 for corresponding Japanese Application No. 2010-011360.

Japanese Office Action issued Nov. 26, 2013 for corresponding Japanese Application No. 2009-200118.

Extended European Search Report issued Mar. 16, 2012 for corresponding European Application No. 10 17 3823.

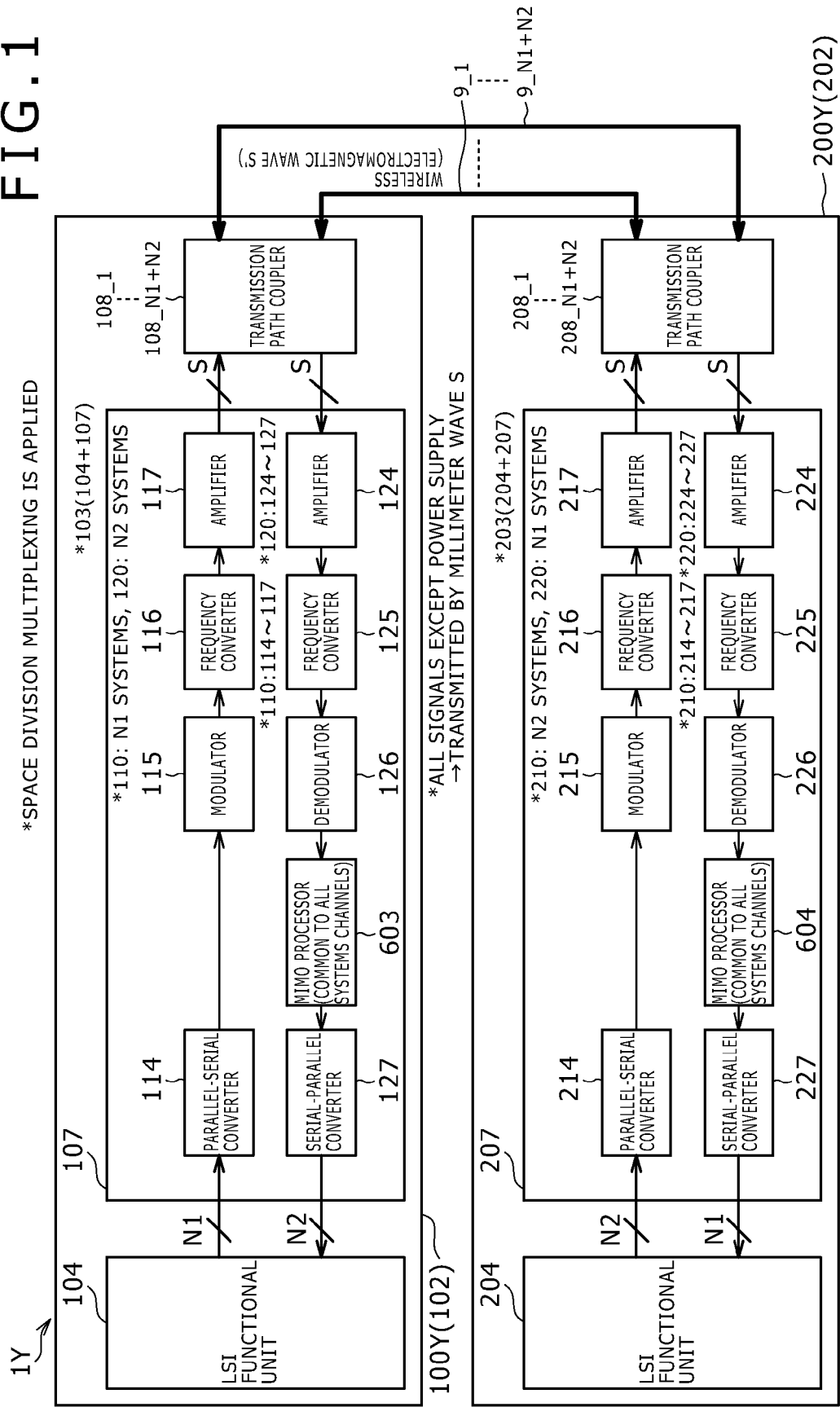

FIG. 3A
$$L \text{ [dB]} = 10 \log_{10}((4\pi d/\lambda)^2) \quad \cdots \text{(A)}$$
$$d_2/d_1 = 10^{(DU/20)} \quad \cdots \text{(B)}$$
FIG. 3B
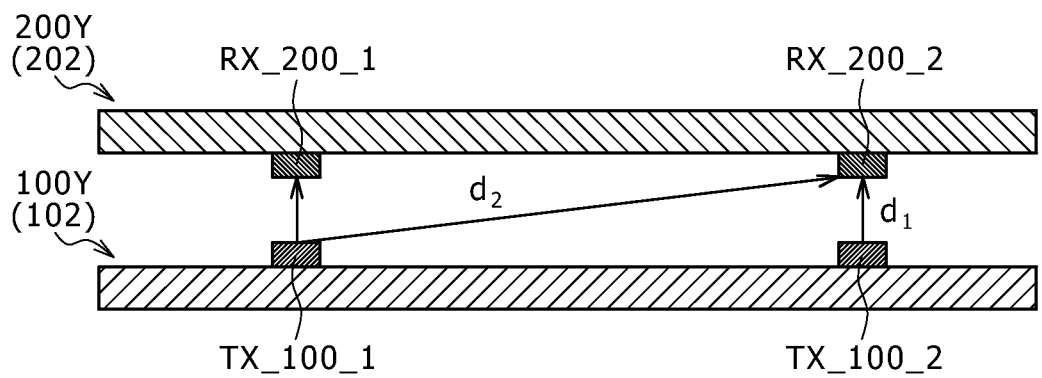
FIG. 3C
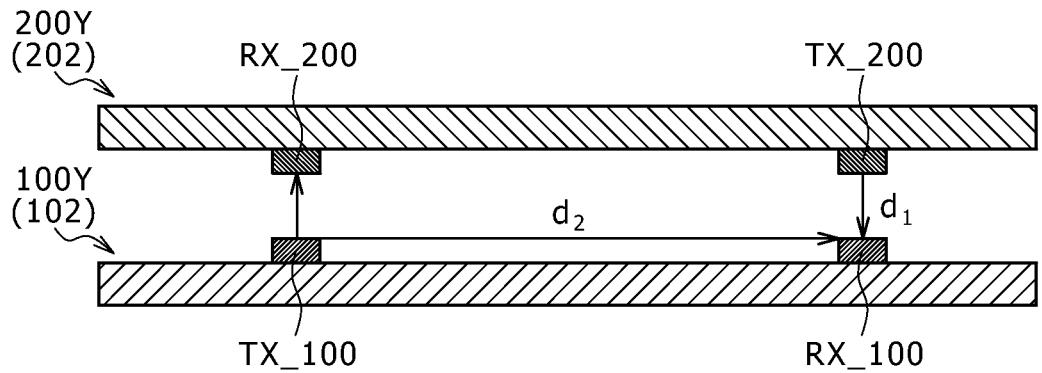

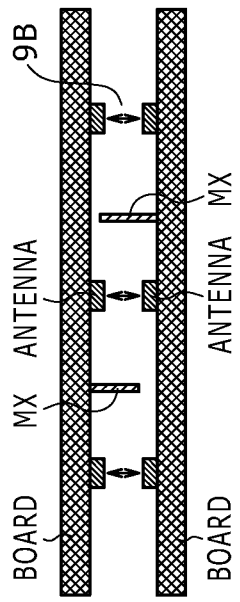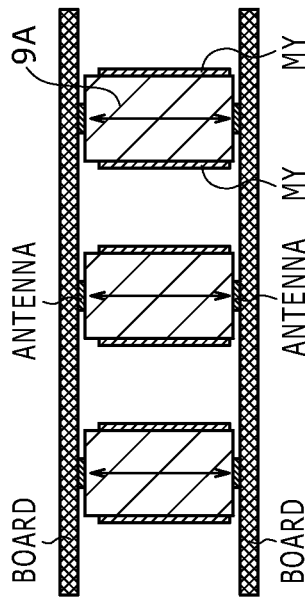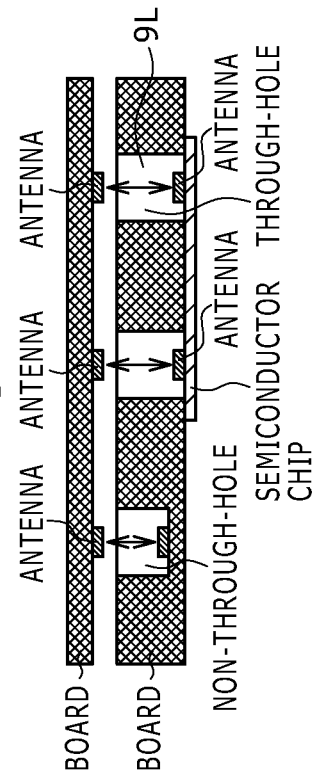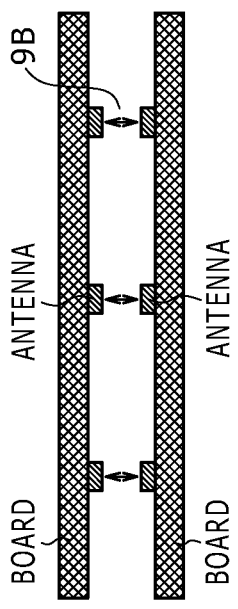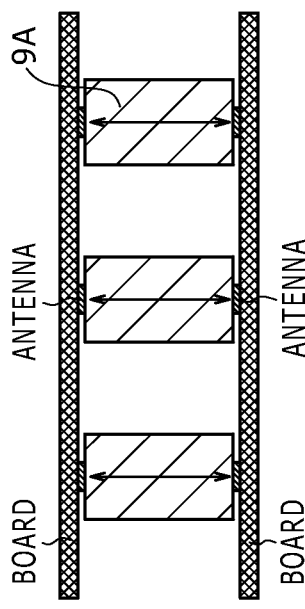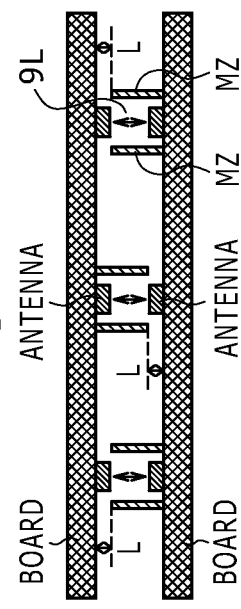

Vo : OUTPUT SIGNAL OF
RECEPTION-SIDE LOCAL
OSCILLATOR 8404
*FREE-RUNNING OUTPUT

Vout : OUTPUT SIGNAL OF
RECEPTION-SIDE LOCAL
OSCILLATOR 8404
*INJECTION-LOCKED OUTPUT Sinj : INJECTION SIGNAL $\theta - \phi$ : THE AMOUNT OF PHASE SHIFT
FOR SYNCHRONOUS DETECTION
(WHEN MODULATION AXIS AND
REFERENCE CARRIER AXIS ARE
IN PHASE)

PSK $P_{PSK} = a^2/2 \cdots$ (B-1)

ASK MODULATION INDEX 100%

$P_{ASK100\%} = ((2a)^2/2 + 0)/2 = a^2 \cdots$ (B-2)

ASK MODULATION INDEX 50%

$P_{ASK50\%} = ((3a)^2/2 + (a)^2/2)/2 = 5a^2/2 \cdots$ (B-3)

$$\hat{s} = H^{-1}r = H^{-1}Hs + H^{-1}v = s + H^{-1}v$$

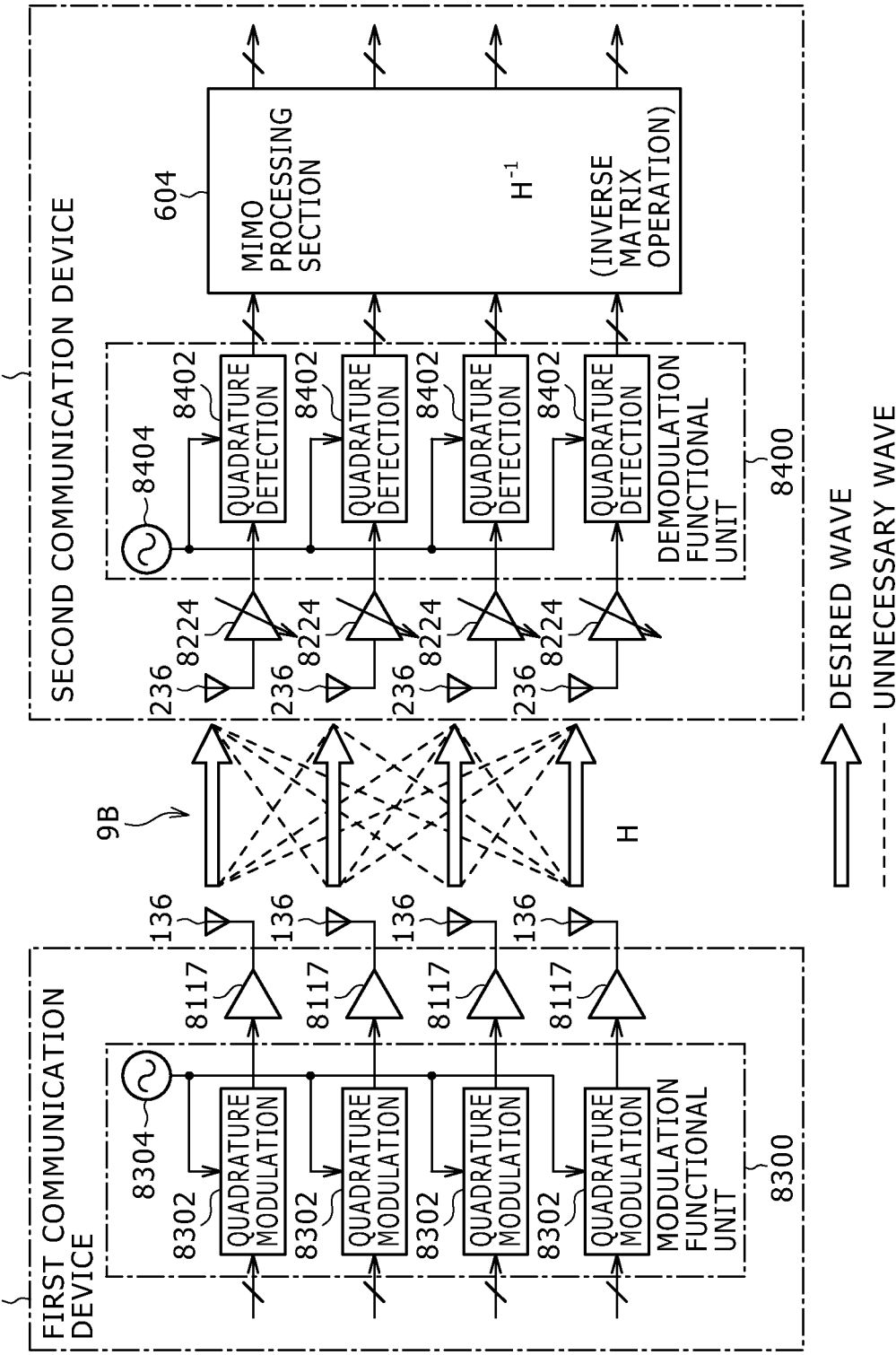

FIG.19A
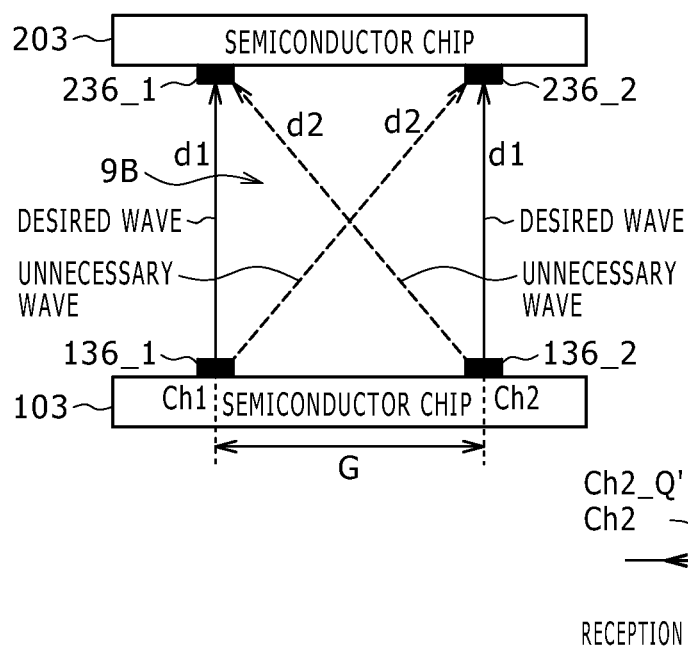
FIG.19B
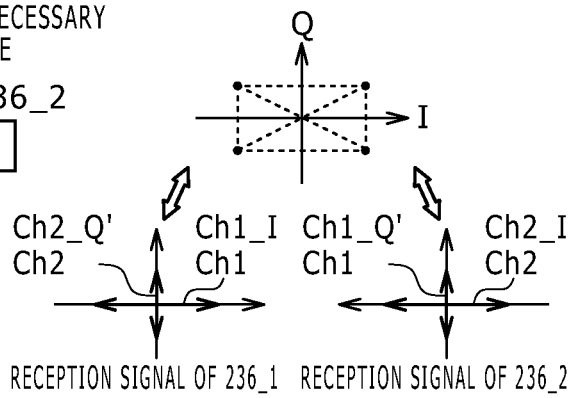
FIG.19C
FIG.19D
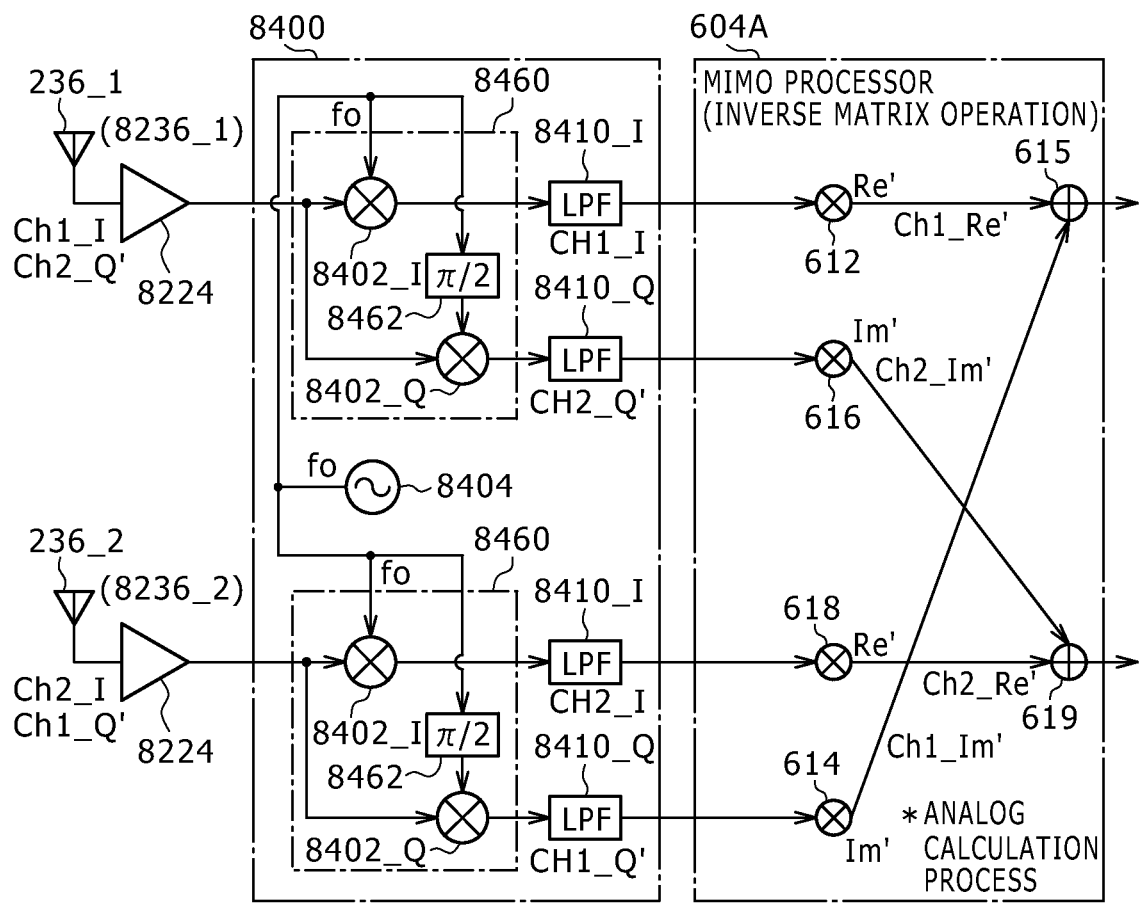

FIG.20A
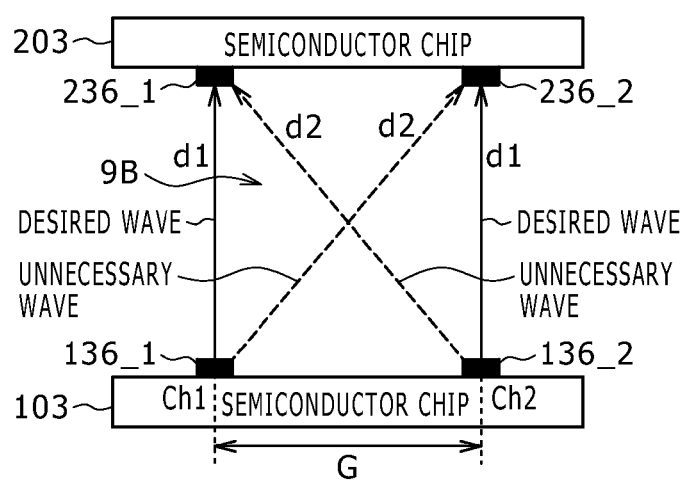
FIG.20B
$$H = \begin{pmatrix} Re & Re'' \\ Re'' & Re \end{pmatrix}$$
$$H^{-1} = \begin{pmatrix} Re' & Re''' \\ Re''' & Re' \end{pmatrix}$$
FIG.20C
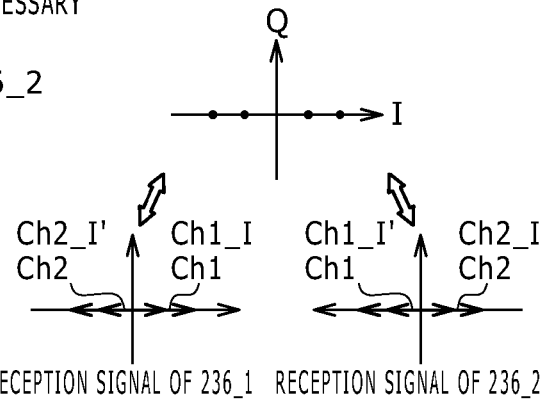
FIG.20D
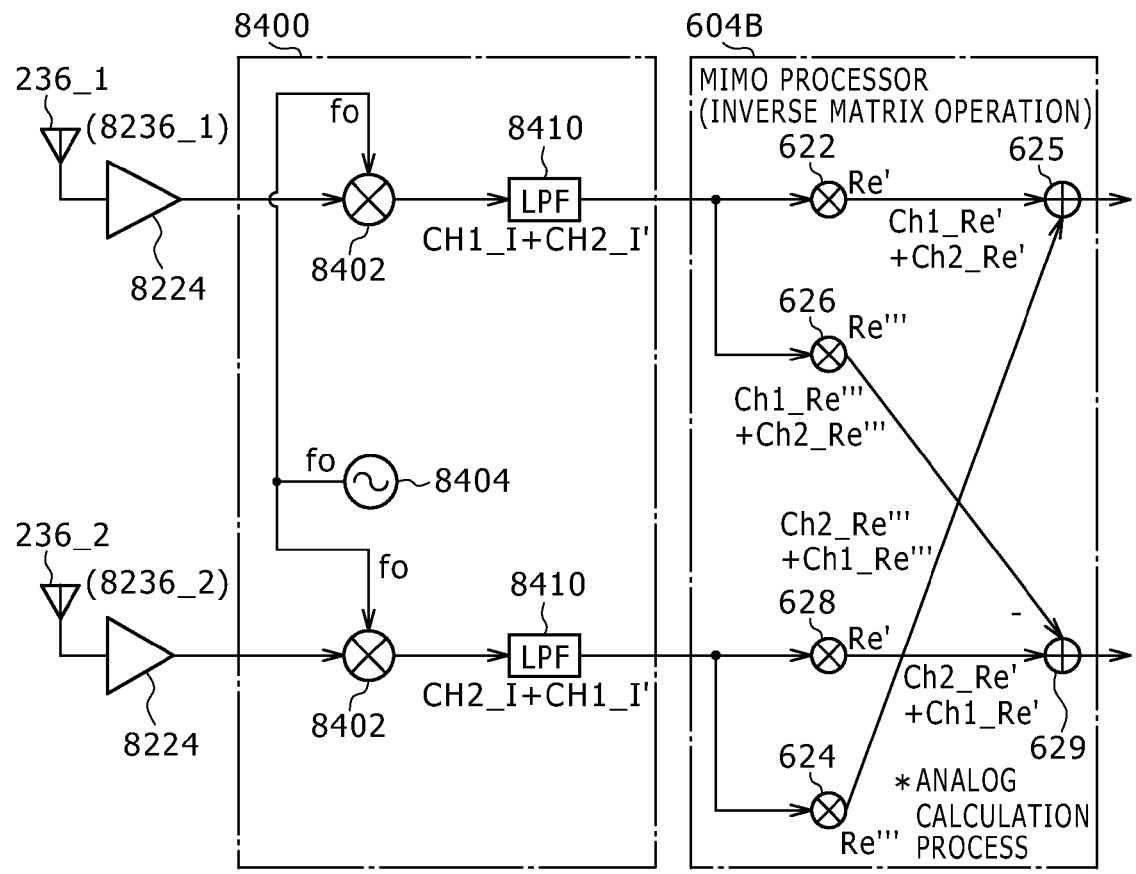

WHERE n IS ODD NUMBER

WHERE n IS EVEN NUMBER

WHERE n IS ODD NUMBER

WHERE n IS EVEN NUMBER

WIRELESS TRANSMISSION SYSTEM, WIRELESS COMMUNICATION DEVICE AND WIRELESS TRANSMISSION METHOD

CROSS REFERENCES TO RELATED APPLICATIONS

This is a Continuation Application of U.S. patent application Ser. No. 12/805,929 filed Aug. 25, 2010, now U.S. Pat. No. 8,451,720, which in turn claims priority from Japanese Application No.: 2009-223682, filed on Sep. 29, 2009, the entire contents of which are incorporated herein by reference.

This is a Continuation application of U.S. patent application Ser. No. 12/805,929 filed Aug. 25, 2010, which in turn claims priority from Japanese Application No.: 2009-223682, filed on Sep. 29, 2009, the entire contents of which are incorporated herein by reference.

BACKGROUND OF THE INVENTION

1. Field of the Invention

This invention relates to a wireless transmission system (including also a wireless communication device implemented in one housing), a wireless communication device for the reception side and a wireless communication method. More particularly, the present invention relates to a mechanism wherein space division multiplexing is applied to wirelessly transmit a plurality of transmission subject signals.

2. Description of the Related Art

As a technique for implementing a high-speed signal transmission between different electronic apparatus disposed in a comparatively short range (for example, within several centimeters to ten and several centimeters), or within an electronic apparatus, for example, a LVDS (Low Voltage Differential Signaling) is known. However, together with further increase of the amount of transmission information and further increase of the speed of transmission recently, increase of power consumption, increase of an influence of signal distortion by reflection and so forth, increase of unnecessary radiation and so forth have become problems. For example, the LVDS reaches a limit where a signal such as a video signal (including an image pickup signal), a computer image or the like is transmitted at a high speed (on the real time basis) in an apparatus.

As a countermeasure against the problem of increase of the speed of transmission data, it seems a possible idea to increase the number of wiring lines to decrease the transmission speed per one signal line by parallel transmission of signals. However, the countermeasure just described gives rise to increase of the number of input and output terminals. As a result, complication of a printed board or a cable wiring scheme, increase of the size of a semiconductor chip and so forth are required. Further, since a large amount of data is transmitted at a high speed along a wiring system, a problem of electromagnetic field interference occurs.

All of the problems involved in the LVDS or the technique of increasing the number of wiring lines are caused by transmission of a signal through an electric wiring line. Therefore, as a method for solving a problem caused by transmission of a signal along an electric wiring line, it seems a possible idea to eliminate electric wiring lines for signal transmission.

Also it seems a possible idea to apply space division multiplexing where a plurality of communication units are provided on the transmission side and the reception side to carry out duplex transmission. However, where the space division multiplexing is applied, an interference countermeasure between channels is required. It is a possible idea to apply a MIMO (Multi-Input Multi-Output) system as a technique for solving the problem described above (refer to, for example, Japanese Patent Laid-Open No. 2009-055228, Japanese Patent Laid-Open No. 2009-049632 and Japanese Patent Laid-Open No. 2009-33588, hereinafter referred as Patent Documents 1 to 3, respectively).

Patent Documents 1 to 3 are directed to wireless transmission in a comparatively long range with respect to wireless transmission within an apparatus or between different apparatus and disclose application of a MIMO process in combination with an OFDM modulation method. In other words, the MIMO process disclosed in Patent Documents 1 to 3 depends upon the OFDM modulation method.

SUMMARY OF THE INVENTION

However, where wireless transmission in a comparatively short range within an apparatus or between different apparatus is intended, it is considered that it is not always necessary to use the MIMO process together with the OFDM modulation method. Further, if the wavelength becomes short, then also an effect of directivity of an antenna is achieved. Therefore, it is considered that use of the MIMO process with the OFDM modulation method is not required after all.

Therefore, it is desirable to provide a wireless transmission system, a wireless communication device and a wireless communication method wherein a MIMO process is applied suitably for wireless signal transmission within an apparatus or between different apparatus.

In a wireless transmission system, a wireless communication apparatus and a wireless transmission method according to an embodiment of the present invention, a communication unit for transmission and a communication unit for reception are arranged in a housing of an electronic apparatus.

The communication unit for transmission frequency-converts a transmission subject signal with a carrier signal for modulation to generate a modulation signal and signals the generated modulation signal to a wireless signal transmission path. Preferably, the communication unit for transmission modulates carrier signals of the same carrier frequency. The communication unit for reception demodulates a modulation signal received through the wireless signal transmission path to acquire an output signal corresponding to the transmission subject signal. Preferably, the communication unit for reception uses the signal received through the wireless signal transmission path as an injection signal to generate a carrier signal for demodulation synchronized with the carrier signal for the modulation. Then, the communication unit for reception frequency-converts the modulation signal received through the wireless signal transmission path with the carrier signal for demodulation to acquire an output signal corresponding to the transmission subject signal.

In short, the wireless signal transmission path is configured between the communication unit for the transmission side arranged in the housing of the electronic apparatus and the communication unit on the reception side similarly arranged in the housing of an electronic apparatus, which may be same or different from the electronic apparatus in which the communication unit on the transmission side is arranged. Then, signal transmission is carried out by wireless between the two communication units.

Here, in a mechanism according to the present invention, space division multiplexing is applied to wireless transmission within an apparatus or between different apparatus. To this end, a plurality of transmission antennae are provided on a wireless communication device on the transmission side, and a plurality of reception antennae are provided also on a corresponding wireless communication device on the reception side such that the transmission antennae and the communication antennae correspond in a one-by-one corresponding relationship to each other. Between each corresponding antennae, a desired wave radiated from the transmission antenna is received as a direct wave by the reception antenna. However, between those transmission and reception antennae which do not correspond to each other, an unnecessary wave radiated from the transmission antenna is received as a direct wave by the reception antenna.

Further, the wireless communication device on the reception side includes a demodulation functional unit and a transmission characteristic correction unit. The demodulation functional unit demodulates modulation signals received by the reception antennae. For the demodulation process, at least synchronous detection is adopted. If the modulation is quadrature modulation, then quadrature detection is used for the demodulation process. The transmission characteristic correction unit carries out a correction calculation process, that is, a MIMO process, based on the transmission characteristic of a transmission space between the transmission antennae and the reception antennae based on the demodulation signals demodulated by the modulation functional unit and individually corresponding to the reception antennae to acquire an output signal corresponding to the transmission subject signal.

In short, the mechanism according to the present invention is characterized in that modulation signals of desired waves and unnecessary waves received by the reception antennae, that is, composite waves of the desired waves and the unnecessary waves, are demodulated first and then subjected to the MIMO process in the baseband region. Further, in the mechanism according to the present invention, the transmission characteristic of the transmission space is handled such that both of desired waves and unnecessary waves are defined as direct waves which are emitted from the transmission antennae and arrive at the reception antennae and, in the MIMO process on the reception side by the transmission characteristic correction unit, inverse matrix calculation based on a matrix which defines the transmission characteristic is carried out.

Here, the antenna arrangement is determined so as to be convenient for the MIMO process. As a point of view in this instance, an approach of defining a path difference which is a difference between an inter-antenna distance of a desired wave and an inter-antenna distance of an unnecessary wave, another approach of prescribing matrix elements which define transmission functions and a further approach of defining a demodulation process and the MIMO process on the reception side by the transmission characteristic correction unit.

Where a path difference is prescribed, where the wavelength of a carrier signal is represented by $\lambda c$ and the phase characteristic which relies upon the directivity of an antenna is represented by zero, the path difference is set to $(n/2+1/4)\lambda c$ as a first condition, and the path difference is set to $(n/2)\lambda c$ as a second condition. When a phase characteristic which relies upon the directivity of an antenna is found, the phase characteristic is corrected by an amount which relies upon a radiation angle of a desired wave or an unnecessary wave from a transmission antenna and an incidence angle to a corresponding reception antenna.

If the first condition described above is replaced into the approach of prescribing matrix elements, then this signifies that a path difference is set such that elements of desired waves in a matrix which prescribes a transmission characteristic are represented only by a real number term while elements of unnecessary waves are represented only by an imaginary number term. On the other hand, if the first condition is replaced into the approach of prescribing matrix elements by a demodulation process and a MIMO process on the reception side by the transmission characteristic correction unit, then demodulation of reception signals received by the reception antennae is carried out by quadrature detection. Further, in the transmission characteristic correction, for each of the channels of the reception antennae, only correction calculation regarding the real number term is carried out for the components of desired signals from among the modulation signals modulated by the quadrature detection. Meanwhile, only correction calculation regarding the imaginary number term is carried out for the components corresponding to unnecessary signals which are orthogonal to the components of the desired signals. Then, the corrected signals regarding the real number term for the desired signals and the corrected signals regarding the imaginary number term for the components of the unnecessary signals are added to acquire an output signal corresponding to the transmission subject signals.

If the second condition described above is replaced into the approach of prescribing matrix elements, then this signifies that a path difference is set such that elements of desired waves in a matrix which prescribes a transmission characteristic are represented only by a real number term while also elements of unnecessary waves are represented only by a real number term. On the other hand, if the first condition is replaced into the approach of prescribing matrix elements by a demodulation process and a MIMO process on the reception side by the transmission characteristic correction unit, then synchronous detection of reception signals received by the reception antennae is carried out first to carry out modulation without carrying out quadrature detection. Then, in the transmission characteristic correction, for each of the channels of the reception channels, correction calculation regarding the real number terms corresponding to desired signals and correction calculation regarding the real number terms corresponding to unnecessary signals are carried out for demodulation components demodulated by the synchronous detection. Then, the corrected signals regarding the real number terms corresponding to the desired signals and the corrected signals regarding the imaginary number terms corresponding to the unnecessary signals regarding the channels of the other reception antennae are added to acquire an output signal corresponding to the transmission subject signals.

If also the demodulation process on the reception side is taken into consideration, then it is preferable to adopt one of the following techniques. According to the first technique, the first condition described above is applied, and a method of modulating only the amplitude is adopted for some of the channels while a method other than the method of modulating only the amplitude is adopted for the remaining channels. On the reception side, one of a technique wherein an injection locking method is applied to each transmission subject signal and another method wherein the injection locking method is applied only to one channel to which the method of modulating only the amplitude is applied and, in the remaining channels, a demodulation process is carried out based on a carrier signal for demodulation generated by the channel which adopts the injection locking method should be adopted.

According to the second technique, the second condition described hereinabove is adopted, and the method of modulating only the amplitude is adopted for some of the channels while a method other than the method of modulating only the amplitude is adopted for the remaining channels. On the reception side, one of a technique wherein an injection locking method is applied to each transmission subject signal and another method wherein the injection locking method is applied a channel or channels to which the method of modulating only the amplitude is applied and, in the remaining channels, a demodulation process is carried out based on a carrier signal or signals for demodulation generated by the channel or channels which adopt the injection locking method should be adopted.

According to the third technique, the second condition described hereinabove is applied, and the method of modulating only the amplitude is adopted for all channels. On the reception side, one of a technique wherein an injection locking method is applied to each transmission subject signal and another method wherein the injection locking method is applied only to a number of channels which is smaller than the total number of channels and optimally is one and, in the remaining channels, a demodulation process is carried out based on a carrier signal for demodulation generated by any of those channels which adopt the injection locking method should be adopted.

Incidentally, where the injection locking method is adopted, on the reception side, a received signal is used as an injection signal to generate a carrier signal for demodulation synchronized with the carrier signal for the modulation. Then, the carrier signal for demodulation is used to carry out frequency conversion, that is, down conversion.

Although only a modulation signal obtained by frequency conversion or up conversion on the transmission side may be signaled such that the demodulation signal received by the reception side is used as an injection signal for generating a carrier signal for demodulation, preferably also a reference carrier signal used for the modulation is signaled together with the modulation signal such that, on the reception side, the injection signal is used for injection-locking into the received reference carrier signal.

In the mechanism which adopts the injection locking method, the carrier signal for modulation used for the up conversion and the carrier signal for demodulation used for the down conversion are placed into a synchronized state with each other with certainty. Therefore, even if the stability of the frequency of the carrier signal for modulation is moderated to carry out signal transmission by wireless, the transmission subject signal can be demodulated appropriately. In down conversion, synchronous detection can be applied readily. By using quadrature detection developmentally for the synchronous detection, then not only amplitude modulation but also phase modulation and frequency modulation can be applied. This signifies that the data transfer rate can be raised, for example, by orthogonalizing a modulation signal.

With the embodiment of the present invention, a mechanism suitable for wireless signal transmission between different apparatus or within an apparatus wherein the MIMO process is applied on the reception side is implemented without using the OFDM modulation method together. By applying the MIMO process to the reception side, the antenna distance can be reduced.

Since both of a desired wave and an unnecessary wave are handled as direct waves, it becomes possible to manage the path difference regarding the desired wave and the unnecessary wave and it becomes possible to determine the antenna arrangement so as to be convenient for the MIMO process on the reception side. As a result, in comparison with an alternative case wherein the present invention is not applied, the calculation scale of the MIMO process can be reduced.

Preferably, a common frequency is used for the carrier signals. If the common frequency is used, then since the influences of the carrier frequencies in the channels become equal to each other with certainty, the MIMO process in the baseband region can be carried out with certainty and efficiently. In addition, in comparison with an alternative case wherein different carrier frequencies are used for the different channels, the circuit scale for modulation and demodulation can be reduced.

The above and other features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 1 is a block diagram showing a functional configuration of a signal interface of a wireless transmission system of an embodiment of the present invention;

FIGS. 3A to 3C are schematic views illustrating an appropriate condition or application condition of space division multiplexing adopted in the embodiment;

FIGS. 4A to 4F are schematic views showing a general structure of a millimeter wave signal transmission path for applying the space division multiplexing;

FIG. 16 is a diagrammatic view illustrating a basis of a calculation method of the MIMO process applied to the reception side;

FIGS. 19A to 19D are diagrammatic views illustrating a first example of a constraint condition to antenna arrangement where two channels are involved;

FIGS. 20A to 20D are diagrammatic views illustrating a second example of the constraint condition to the antenna arrangement where two channels are involved;

DETAILED DESCRIPTION OF THE PREFERRED EMBODIMENTS

Figure 2A:
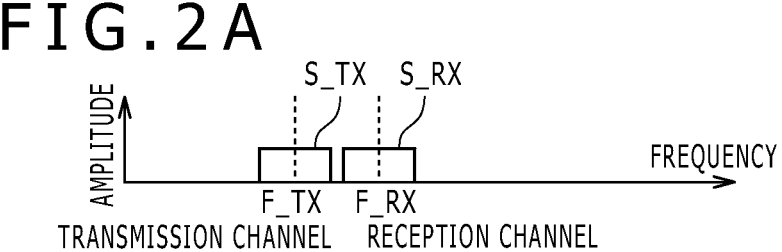
FIGS. 2A to 2E are diagrammatic views illustrating multiplexing of signals.

In the following, embodiments of the present invention are described in detail with reference to the drawings. When functional elements are distinguished among the different embodiments, reference characters of English capital letters such as A, B, C, . . . are applied to the functional elements and, when the embodiments are described without particularly distinguishing them, such reference characters are omitted. The omission of reference characters is similarly applied to the drawings.

It is to be noted that the present invention is described in the following order:

1. Communication Processing Channel: Basis (Space Division Multiplexing)
2. Application Technique of Space Division Multiplexing
3. Modulation and Demodulation: First Example (Application of Square Detection and Envelop Detection)
4. Modulation and Demodulation: Second Example (Application of Injection Locking Method)
5. Relationship between Multi-Channel Transmission and Space Division Multiplexing
6. Relationship between Multi-Channel Transmission and Injection Locking
7. Relationship between Multi-Channel Transmission and Required Transmission Power
8. Outline of MIMO Process Applied to Reception Side: Calculation Process, Relationship with Carrier Frequency, Relationship with Antenna Arrangement, Relationship with Directivity, Application to Three Channels or More, Application to Three-Dimensional Arrangement, Digital Processing
9. Reception MIMO System: First Embodiment
10. Reception MIMO System: Second Embodiment
11. Reception MIMO System: Third Embodiment First, when a wireless transmission system of the present embodiment is described, in order to facilitate understandings of the mechanism of the present embodiment, a basic general configuration is described first. Thereafter, details of a MIMO process applied to the reception side which is a characteristic portion in the wireless transmission system of the present embodiment are described.

<Communication Processing Channel: Basis>

Figure 2B:
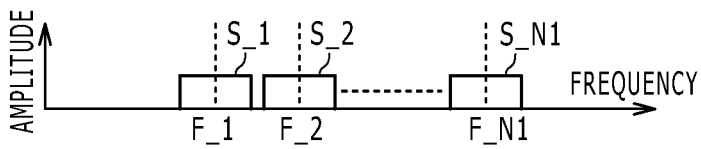
Figure 2C:
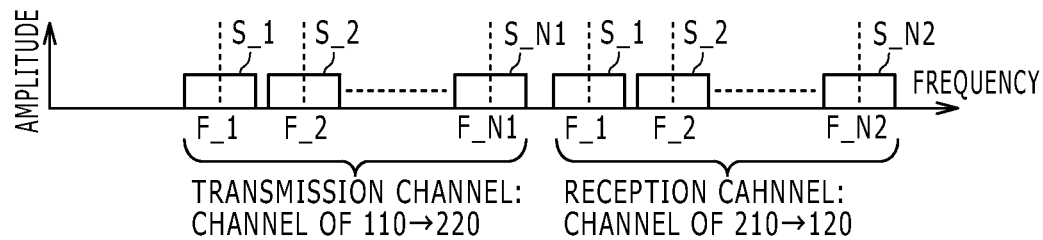
Figure 2D:
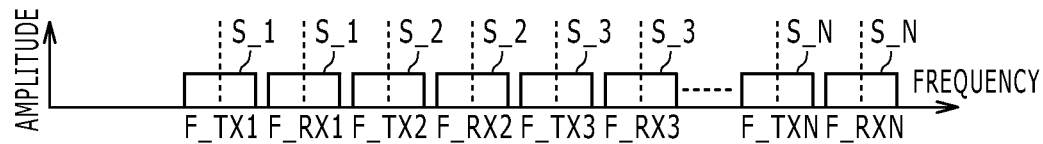
Figure 2E:
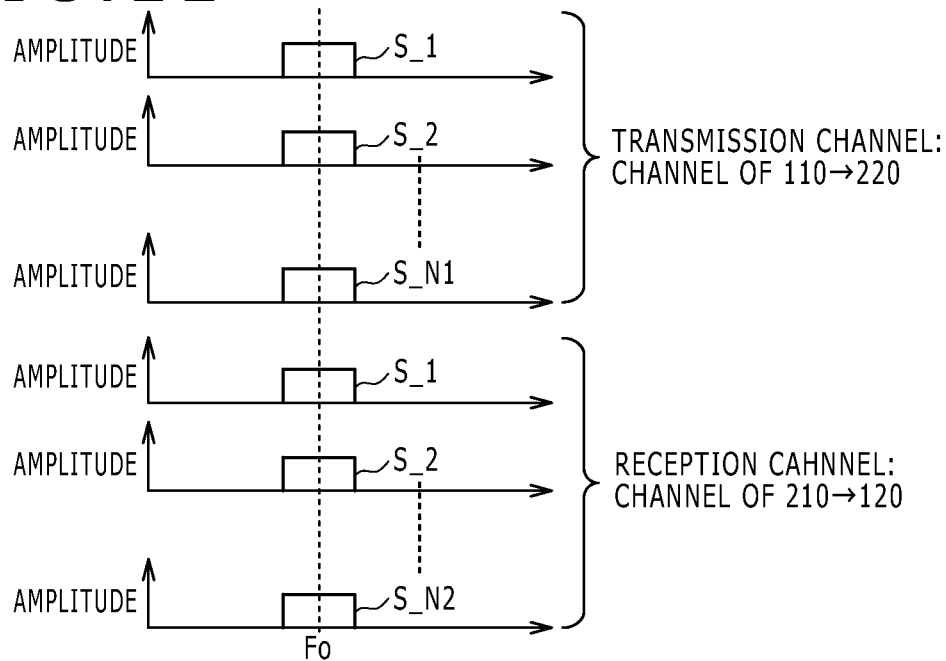

FIGS. 1 to 2E show the wireless transmission system of the present embodiment. In particular, FIG. 1 shows a signal interface of the wireless transmission system 1Y of the present embodiment from a point of view of a functional configuration. FIGS. 2A to 2E illustrates multiplexing of signals.

While a carrier frequency used for the wireless transmission system of the present embodiment described below is a frequency in the millimeter waveband, the mechanism of the present embodiment can be applied not only to a case wherein a carrier frequency of the millimeter waveband is used but also to another case wherein a carrier frequency in a shorter wavelength band such as, for example, a sub millimeter waveband is used. The wireless transmission system of the present embodiment is used, for example, for a digital recording and reproduction device, a ground wave television receiver, a portable telephone set, a game machine and a computer.

[Functional Configuration]

As shown in FIG. 1, the wireless transmission system 1Y is configured such that a first communication device 100Y which is an example of a first wireless device and a second communication device 200Y which is an example of a second wireless device are coupled to each other through a millimeter wave signal transmission path 9 and carry out signal transmission using the millimeter waveband. The millimeter wave signal transmission path 9 is an example of a wireless signal transmission path. A signal of a transmission subject is frequency-converted into a signal of the millimeter waveband suitable for wideband transmission, and the resulting signal is transmitted.

The wireless transmission system 1Y of the present embodiment is characterized in that, by using a plurality of paired transmission couplers 108 and 208, a plurality of channels of such millimeter wave signal transmission paths 9 are included. The plural channels of the millimeter wave signal transmission paths 9 are installed such that they do not interfere spatially with each other or are not influenced by interference, and can carry out communication at the same time using the same frequency along the plural channels for signal transmission.

The term "there is no spatial interference" signifies that signals of plural channels can be transmitted independently of each other. A mechanism therefor is hereinafter referred to as "space division multiplexing." When multi-channeling for a transmission channel is intended, if the space division multiplexing is not applied, then it is necessary to apply frequency division multiplexing such that different carrier frequencies are used for different channels. However, if the space division multiplexing is applied, then even if the same carrier frequency is used, transmission can be implemented without being influenced by interference.

The "space division multiplexing" may be any method of forming a plurality of channels of millimeter wave signal transmission paths 9 in a three-dimensional space in which a millimeter wave signal which is an electromagnetic wave can be transmitted. In particular, the method is not limited to configuration of plural channels of millimeter wave signal transmission paths 9 in a free space. For example, where a three-dimensional space in which a millimeter wave signal which is an electromagnetic wave can be transmitted is configured from a dielectric material which is an entity, plural channels of millimeter wave signal transmission paths 9 may be formed in the dielectric material. Further, each of the plural channels of millimeter wave signal transmission paths 9 is not limited to a free space but may have a form of a dielectric transmission path, a hollow waveguide or the like.

The wireless transmission device or system is configured from a first communication unit or first millimeter wave transmission device and a second communication unit or second millimeter wave transmission device. Further, between the first communication unit and the second communication unit which are disposed in a comparatively short range, a signal of a transmission subject converted into a millimeter wave signal is transmitted through the millimeter wave signal transmission path. The term "wireless transmission" in the present embodiment signifies transmission of a signal of a transmission subject not along an electric wiring line but by wireless, in the present example, by a millimeter wave.

The term "comparatively short range" signifies a shorter range than the distance between communication devices in a field or outdoors used for broadcasting or general wireless communication, and the transmission range may be a range which can be specified as a closed space. The term "closed space" signifies a space in a state wherein leakage of an electric wave from the inner side of the space to the outer side of the space is little and arrival or invasion of an electric wave from the outer side of the space at or into the inner side of the space is little. Typically, the term "closed space" signifies a state that the entire space is enclosed by a housing or case having a shielding effect against a radio wave.

The wireless transmission may be, for example, inter-board communication in a housing of one electronic apparatus, inter-chip communication on the same board and inter-device communication where a plurality of electronic devices are integrated as in a case wherein one electronic apparatus is mounted on the other electronic apparatus.

While the "integration" described above typically signifies a state wherein both of the electronic apparatus fully contact with each other by mounting therebetween, it may be a state wherein a transmission range between both of the electronic apparatus can be substantially specified as a closed space. Also a case is included wherein both of the electronic apparatus are disposed at determined position in a state rather spaced from each other, that is, in a comparatively short range such as, for example, within several centimeters to ten and several centimeters and it may be considered that the electronic apparatus are substantially integrated with each other. In short, the integration signifies any state in which a radio wave leaks little from the inside to the outside of a space which is configured from both electronic apparatus and in which an electric wave can propagate and conversely an electric wave from the outside of the space little arrives or invades at or into the inside of the space.

Signal transmission in a housing of one electronic apparatus is hereinafter referred to as intra-housing signal transmission and signal transmission in a state wherein a plurality of electronic apparatus are integrated (including "substantially integrated" in the following description) is hereinafter referred to as inter-apparatus signal transmission. In the case of the intra-housing signal transmission, a communication device or communication unit or transmitter on the transmission side and a communication device or communication unit or receiver on the reception side are accommodated in the same housing, and the wireless transmission system of the present embodiment wherein a wireless signal transmission path is formed between the communication units or transmitter and receiver is the electronic apparatus itself. On the other hand, in the case of the inter-apparatus signal transmission, the communication device or communication unit or transmitter on the transmission side and the communication device or communication unit or receiver on the reception side are accommodated in individual housings of electronic apparatus which are different from each other. Further, wireless signal transmission paths are formed between the communication units or transmitters and receivers in both of the electronic apparatus when both electronic are arranged and integrated at determined positions such that the wireless transmission system of the present embodiment is constructed.

In the communication devices provided across the millimeter wave signal transmission path, the transmitter and the receiver are disposed in a paired and coupled relationship with each other. Signal transmission between one communication device and the other communication device may be carried out unidirectionally, that is, in one direction, or may be carried out bidirectionally. For example, where the first communication unit functions as the device on the transmission side and the second communication unit functions as the device on the reception side, the transmitter is disposed in the first communication unit and the receiver is disposed in the second communication unit. Where the second communication unit functions as the device on the transmission side and the first communication unit functions as the device on the reception side, the transmitter is disposed in the second communication unit and the receiver is disposed in the first communication unit.

The transmitter includes, for example, a signal generator on the transmission side for carrying out a signal process for a signal of a transmission subject to generate a millimeter wave signal, that is, a signal converter for converting an electric signal of a transmission subject into a millimeter wave signal, and a signal coupler on the transmission side for coupling the millimeter wave signal generated by the signal generator on the transmission side with a transmission path or millimeter wave signal transmission path for transmitting the millimeter wave signal. Preferably, the signal generator on the transmission side is provided integrally with a functional unit for generating a signal of a transmission subject.

For example, the signal generator on the transmission side includes a modulation circuit, and the modulation circuit modulates the signal of a transmission subject. The signal generator on the transmission side carries out frequency conversion for a signal modulated by the modulation circuit to generate a millimeter wave signal. As the principle, it seems a possible idea to convert the signal of a transmission subject directly into a millimeter wave signal. The signal coupler on the transmission side supplies the millimeter wave signal generated by the signal generator on the transmission side to the millimeter wave signal transmission path.

On the other hand, the receiver includes, for example, a signal coupler on the reception side for receiving the millimeter wave signal transmitted thereto through the millimeter wave signal transmission path and a signal generator on the reception side for carrying out a signal process for the millimeter wave signal or input signal received by the signal coupler on the reception side to generate a normal electric signal which is a signal of a transmission subject, that is, a signal converter for converting the millimeter wave signal into an electric signal of a transmission subject. Preferably, the signal generator on the reception side is provided integrally with a functional unit for receiving a signal of a transmission subject. For example, the signal generator on the reception side includes a demodulation circuit and carries out frequency conversion for the millimeter wave signal to generate an output signal. Then, the demodulation circuit demodulates the output signal to generate a signal of a transmission subject. As the principle, it seems a possible idea to convert the millimeter wave signal directly into a signal of a transmission subject.

In particular, when it is tried to implement a signal interface, a signal of a transmission subject is transmitted in a contactless and cable-less manner using a millimeter wave signal, that is, not transmitted using an electric wiring line. Preferably, at least signal transmission, particularly transmission of an image signal for which high-speed and great amount data transmission is required, or of a high-speed clock signal or the like, is carried out using a millimeter wave signal. In particular, in the present embodiment, signal transmission carried out through an electric wiring line in the past is carried out using a millimeter wave signal. By carrying out signal transmission using the millimeter waveband, high-speed signal transmission on the Gbps order can be implemented and the range on which a millimeter wave signal has an influence can be easily limited, and also an effect arising from the characteristic just described is obtained.

Here, the signal couplers may be configured such that the first communication unit and the second communication unit can transmit a millimeter wave signal through the millimeter wave signal transmission path. For example, the signal couplers may individually include, for example, an antenna structure or antenna coupler or may be configured such that coupling of a signal is carried out without including an antenna structure.

While the "millimeter wave signal transmission path for transmitting a millimeter wave signal" may be configured from the air, that is, from a free space, preferably the millimeter wave signal transmission path includes a structure for transmitting a millimeter wave signal while confining the millimeter wave signal in the transmission path. If the characteristic just described is positively utilized, then layout of the millimeter wave signal transmission path can be determined arbitrarily, for example, like an electric wiring line.

While, as such a millimeter wave confining structure or wireless signal confining structure as described above, for example, a structure of a waveguide tube is considered typically, the present invention is not limited to this. For example, a structure configured from a dielectric material capable of transmitting a millimeter wave signal, hereinafter referred to as dielectric transmission path or millimeter wave dielectric transmission path, or a hollow waveguide which configures a transmission path and in which a shielding material for suppressing outside radiation of a millimeter wave signal is provided in such a manner as to surround a transmission path and the inside of the shielding material is hollow may be applied. By providing flexibility to the dielectric material or the shielding material, layout of a millimeter wave signal transmission path can be implemented.

Incidentally, in the case of the air called free space, each of the signal couplers includes an antenna structure such that signal transmission in a short range space is carried out through the antenna structure. On the other hand, where the device configured from a dielectric material is used, while an antenna structure may be applied, this is not essential.

[System Configuration Wherein Space Division Multiplexing is Applied]

FIG. 1 shows a wireless transmission system 1Y according to the present embodiment. Referring to FIG. 1, as can be recognized from the basic description regarding the space division multiplexing given hereinabove, the wireless transmission system 1Y of the present invention includes a plurality of channels of millimeter wave signal transmission paths 9 interposed between a first communication device 100Y and a second communication device 200Y.

Here, a plurality of different signals _@ (@ is 1 to N1) are transmitted from the first communication device 100Y to the second communication device 200Y, and another plurality of different signals _@ (@ is 1 to N2) are transmitted from the second communication device 200Y to the first communication device 100Y.

Although details are hereinafter described, a semiconductor chip 103 includes a transmission-side signal generating unit 110 and a reception-side signal generating unit 120, and another semiconductor chip 203 includes a transmission-side signal generating unit 210 and a reception-side signal generating unit 220. Although stopgap illustration is given in FIG. 1, the transmission-side signal generating unit 110 and the reception-side signal generating unit 220 are provided for each of N1 channels, or in other words, N1 such transmission-side signal generating units 110 and N1 such reception-side signal generating units 220 are provided, and the transmission-side signal generating unit 210 and the reception-side signal generating unit 120 are provided for each of N2 channels, or in other words, N2 such transmission-side signal generating units 210 and N2 such reception-side signal generating units 120 are provided.

Since the space division multiplexing permits use of the same frequency band at the same time, the communication speed can be raised, and the simultaneity of bidirectional communication wherein signal transmission for the N1 channels from the first communication device 100Y to the second communication device 200Y and signal transmission for the N2 channels from the second communication device 200Y to the first communication device 100Y can be secured. Particularly a millimeter wave is short in wavelength, and an attenuation effect by the distance can be expected. Further, even where the offset is small, that is, even where the spatial distance between transmission channels is short, interference is less likely to occur, and propagation channels different from each other depending upon the place can be implemented readily.

As seen in FIG. 1, the wireless transmission system 1Y of the present embodiment includes "N1+N2" channels of transmission path couplers 108 and 208 each including a millimeter wave transmission terminal, a millimeter wave transmission path, an antenna and so forth and "N1+N2" channels of millimeter wave signal transmission paths 9. Each of the reference characters has a suffix "_@" (@ is 1 to N1+N2). Thus, a full duplex transmission system wherein millimeter wave transmission is carried out independently for transmission and reception can be implemented.

First, functional elements provided in the wireless transmission system 1Y of the present embodiment are described particularly. It is to be noted that, although the following description is given of an example wherein the functional elements are formed on a semiconductor integrated circuit or chip, this is not essential.

The semiconductor chip 103 which can carry out millimeter wave communication is provided in the first communication device 100Y, and the semiconductor chip 203 which can carry out millimeter wave communication is provided also in the second communication device 200Y.

Here, only signals which are demanded to be transmitted at a high speed and in a great amount are made a subject of the communication with the millimeter waveband, and other signals which may be transmitted at a low speed and in a small amount or which can be regarded as DC current such as power supply are not made a subject of conversion into a millimeter wave signal. The signals which are not made a subject of conversion into a millimeter wave signal including power supply are connected between boards using a mechanism similar to a conventional mechanism. Original electric signals of a subject of transmission before conversion into millimeter waves are hereinafter referred to collectively as baseband signals.

[First Communication Device]

The first communication device 100Y includes a board 102, a semiconductor chip 103 mounted on the board 102 and capable of carrying out millimeter waveband communication, and a transmission path coupler 108 mounted on the board 102. The semiconductor chip 103 is a system LSI (Large Scale Integrated Circuit) wherein an LSI functional unit 104 and a signal generating unit 107 which is a millimeter wave signal generating unit are integrated. Though not shown, the LSI functional unit 104 and the signal generating unit 107 may be configured otherwise such that they are not integrated. Where the LSI functional unit 104 and the signal generating unit 107 are formed as separate units, since a problem may possibly arise from transmission of a signal by an electric wiring line for signal transmission between them, they are preferably formed as a single integrated unit. Where they are formed as separate units, the two chips of the LSI functional unit 104 and the signal generating unit 107 are preferably disposed at a short distance to minimize the wire length thereby to minimize a possible bad influence.

The signal generating unit 107 and the transmission path coupler 108 are configured so as to have bidirectionality of data. To this end, the signal generating unit 107 includes a signal generation unit on the transmission side and a signal generation unit on the reception side. Although such transmission path couplers 108 may be provided separately for the transmission side and the reception side, here the single transmission path coupler 108 is used for both of transmission and reception.

In order to implement "bidirectional communication," in the case of single-core bidirectional communication wherein one channel or core of a millimeter wave signal transmission path 9 of a millimeter wave transmission channel is used, a half duplex system wherein time division multiplexing (TDM) is applied, a frequency division multiplexing (FDM) and so forth are applied.

However, in the case of the time division multiplexing, since separation of transmission and reception is carried out time-divisionally, "simultaneity of bidirectional communication," that is, "single-core simultaneous bidirectional transmission," wherein signal transmission from the first communication device 100Y to the second communication device 200Y and signal transmission from the second communication device 200Y to the first communication device 100Y are carried out simultaneously, is not implemented. The single-core simultaneous bidirectional transmission is implemented by the frequency division multiplexing.

Since the frequency division multiplexing uses different frequencies for transmission and reception as seen from FIG. 2A, the millimeter wave signal transmission path 9 must have a comparatively great transmission bandwidth. In addition, in order to implement multiplex transmission, that is, multi-channel transmission, by the frequency division multiplexing, it is necessary to use different carrier frequencies for modulation to convert frequencies of individual signals into frequencies within different frequency bands F_@ to generate signals of millimeter waves and transmit the millimeter wave signals whose carrier frequencies are different from each other in the same direction or in the opposite directions as shown in FIG. 2B. In this instance, where different frequencies are used for transmission, in the example shown, for a channel from the transmission-side signal generating unit 110 side to the reception-side signal generating unit 220 side, and for reception, in the example shown, for another channel from the transmission-side signal generating unit 210 side to the reception-side signal generating unit 120 side, it is necessary to further increase the transmission bandwidth as seen in FIGS. 2C and 2D.

In this regard, if the space division multiplexing is applied, then not only for implementation of bidirectional communication but also for implementation of multiplex transmission, that is, for multi-channel transmission, the same frequency band can be applied to the channels. Therefore, there is an advantage that there is no restriction to the transmission bandwidth.

The semiconductor chip 103 may not be mounted directly on the board 102 but may be formed as a semiconductor package wherein the semiconductor chip 103 is mounted on an interposed board and molded using resin such as epoxy resin and mounted as such on the board 102. In particular, the interposer board is used as a chip mounting board, and the semiconductor chip 103 is provided on the interposer board. The interposer board may be formed using a sheet member having a relative permittivity within a fixed range such as a range approximately from two to ten and formed from a combination of, for example, thermally reinforced resin and copper foil.

The semiconductor chip 103 is connected to the transmission path couplers 108. Each transmission path coupler 108 is formed from an antenna structure including, for example, an antenna coupling unit, an antenna terminal, a microstrip line, an antenna and so forth. It is to be noted that also it is possible to apply a technique of forming an antenna directly on a chip such that also the transmission path couplers 108 are incorporated in the semiconductor chip 103.

The LSI functional unit 104 carries out principal application control of the first communication device 100Y and includes, for example, a circuit for processing various signals to be transmitted to the opposite party and a circuit for processing various signals received from the opposite party.

The signal generating unit 107 or electric signal conversion unit converts a signal from the LSI functional unit 104 into a millimeter wave signal and carries out signal transmission control of the millimeter wave signal through the millimeter wave signal transmission path 9.

In particular, the signal generating unit 107 includes the transmission-side signal generating unit 110 and the reception-side signal generating unit 120. The transmission-side signal generating unit 110 and the transmission path coupler 108 cooperate with each other to form a transmission unit, that is, a communication unit on the transmission side. Meanwhile, the reception-side signal generating unit 120 and the transmission path coupler 108 cooperate with each other to form a reception unit, that is, a communication unit on the reception side.

The transmission-side signal generating unit 110 includes a parallel-serial converter 114, a modulator 115, a frequency converter 116 and an amplifier 117 in order to carry out signal processing of an input signal to generate a signal of a millimeter wave. It is to be noted that the modulator 115 and the frequency converter 116 may be formed as a unit of the direct conversion type.

The reception-side signal generating unit 120 includes an amplifier 124, a frequency converter 125, a demodulator 126 and a serial-parallel converter 127 in order to carry out signal processing of an electric signal of a millimeter wave received by the transmission path coupler 108 to generate an output signal. The frequency converter 125 and the demodulator 126 may be formed as a unit of the direct conversion type.

The parallel-serial converter 114 and the serial-parallel converter 127 are provided, where the present configuration is not applied, for parallel interface specifications wherein a plurality of signals for parallel transmission are used, but are not required for serial interface specifications.

The parallel-serial converter 114 converts parallel signals into a serial data signal and supplies the serial data signal to the modulator 115. The modulator 115 modulates a transmission subject signal and supplies the modulated transmission subject signal to the frequency converter 116. The modulator 115 may basically be of the type wherein the transmission subject signal is modulated at least in one of the amplitude, frequency and phase or may be modulated in an arbitrary combination of them.

For example, in the case of analog modulation, for example, amplitude modulation (AM) and vector modulation are available. As the vector modulation, frequency modulation (FM) and phase modulation (PM) are available. In the case of digital modulation, for example, amplitude shift keying (ASK), frequency shift keying (FSK), phase shift keying (PSK) and amplitude phase shift keying (APSK) which modulates the amplitude and the phase are available. As the amplitude phase modulation, quadrature amplitude modulation (QAM) is representative.

The frequency converter 116 frequency converts a transmission subject signal after modulation by the modulator 115 to generate an electric signal of a millimeter wave and supplies the millimeter wave electric signal to the amplifier 117. The electric signal of a millimeter wave is an electric signal having a frequency substantially within a range from 30 GHz to 300 GHz. The reason why the "substantially" is used is that the frequency may be any frequency with which an effect by millimeter wave communication is obtained and the lower limit is not restricted to 30 GHz while the upper limit is not restricted to 300 GHz.

While the frequency converter 116 can assume various circuit configurations, for example, it may have a configuration including a frequency mixing circuit, that is, a mixer circuit, and a local oscillation circuit. The local oscillation circuit generates a carrier to be used for modulation, that is, a carrier signal or reference carrier. The frequency mixing circuit multiplies or modulates a carrier in the millimeter waveband generated by the local oscillation circuit by or with a signal from the parallel-serial converter 114 to generate a modulation signal in the millimeter waveband and supplies the modulation signal to the amplifier 117.

The amplifier 117 amplifies an electric signal of a millimeter wave after frequency conversion and supplies the amplified electric signal to the transmission path coupler 108. The amplifier 117 is connected to the bidirectional transmission path coupler 108 through an antenna terminal not shown.

The transmission path coupler 108 transmits a signal of a millimeter wave generated by the transmission-side signal generating unit 110 to the millimeter wave signal transmission path 9, and receives a signal of a millimeter wave from the millimeter wave signal transmission path 9 and outputs the received millimeter wave signal to the reception-side signal generating unit 120.

The transmission path coupler 108 is configured from an antenna coupling unit. The antenna coupling unit configures an example or part of the transmission path coupler 108 or signal coupling unit. The antenna coupling unit is, in a narrow sense, a block which couples an electronic circuit in a semiconductor chip and an antenna disposed inside or outside the chip, and is, in a wide sense, a block which signal-couples a semiconductor chip and the millimeter wave signal transmission path 9. For example, the antenna coupling unit includes at least an antenna structure. Further, where the time division multiplexing is applied to transmission and reception, an antenna changeover unit, that is, an antenna sharing unit, is provided in the transmission path coupler 108.

The antenna structure is a structure in the coupling unit to the millimeter wave signal transmission path 9 and may be any structure only if it couples an electric signal in the millimeter waveband to the millimeter wave signal transmission path 9, but does not signify an antenna itself. For example, the antenna structure is configured including an antenna terminal, a microstrip line and an antenna. Where the antenna changeover unit is formed in the same chip, the antenna terminal except the antenna changeover unit and the microstrip line configure the transmission path coupler 108.

The antenna on the transmission side radiates an electromagnetic wave based on a signal of a millimeter wave to the millimeter wave signal transmission path 9. Meanwhile, the antenna on the reception side receives an electromagnetic wave of a millimeter wave from the millimeter wave signal transmission path 9. The microstrip line interconnects the antenna terminal and the antenna, and transmits a signal of a millimeter wave on the transmission side from the antenna terminal to the antenna, but transmits a signal of a millimeter wave on the reception side from the antenna to the antenna terminal.

The antenna changeover unit is used where the antenna is used commonly for transmission and reception. For example, when a signal of a millimeter wave signal is to be transmitted to the second communication device 200Y side which is the opposite party, the antenna changeover unit connects the antenna to the transmission-side signal generating unit 110. On the other hand, when a signal of a millimeter wave from the second communication device 200Y which is the opposite party is to be received, the antenna changeover unit connects the antenna to the reception-side signal generating unit 120. Although the antenna changeover unit is provided separately from the semiconductor chip 103 on the board 102, the location of the antenna changeover unit is not limited to this, but the antenna changeover unit may be provided otherwise in the semiconductor chip 103. Where antennas for transmission and reception are provided separately from each other, the antenna changeover unit can be omitted.

The reception-side signal generating unit 120 is connected to the transmission path coupler 108. The reception-side signal generating unit 120 includes the amplifier 124, frequency converter 125, demodulator 126, and serial-parallel converter 127 as well as a unification processing unit 128 in order to carry out signal processing for an electric signal of a millimeter wave received by the transmission path coupler 108 to generate an output signal. It is to be noted that the frequency converter 125 and the demodulator 126 may be formed as a unit of the direct conversion type.

The amplifier 124 on the reception side is connected to the transmission path coupler 108, and amplifies an electric signal of a millimeter wave after received by the antenna and supplies the amplified electric signal to the frequency converter 125. The frequency converter 125 frequency-converts the amplified millimeter wave electric signal and supplies the frequency-converted signal to the demodulator 126. The demodulator 126 demodulates the frequency-converted signal to acquire a baseband signal and supplies the baseband signal to the serial-parallel converter 127.

The serial-parallel converter 127 converts serial reception data into parallel output data and supplies the parallel output data to the LSI functional unit 104.

Where the semiconductor chip 103 is configured in such a manner as described above, input signals are subjected to parallel to serial conversion and a resulting serial signal is transmitted to the semiconductor chip 203. Meanwhile, a reception signal from the semiconductor chip 203 side is subjected to serial to parallel conversion. Consequently, the number of signals of a millimeter wave conversion subject is reduced.

Where original signal transmission between the first communication device 100Y and the second communication device 200Y is serial transmission, the parallel-serial converter 114 and the serial-parallel converter 127 need not be provided.

One of characteristics of the wireless transmission system 1Y of the present embodiment is that, in the first communication device 100Y, a MIMO processor 603 used commonly for all of the N1 channels is provided between the demodulator 126 and the serial-parallel converter 127 in the reception-side signal generating unit 120. Similarly, in the second communication device 200Y, a MIMO processor 604 used commonly for all of the N2 channels is provided between a demodulator 226 and a serial-parallel converter 227. Details of the MIMO processors 603 and 604 are hereinafter described.

While the basic configuration is described here, this is a mere example, and the form of accommodating the transmission-side signal generating unit 110, reception-side signal generating unit 120, the transmission-side signal generating unit 210 and reception-side signal generating unit 220 in the semiconductor chips 103 and 203, respectively, is not limited to that described hereinabove with reference to FIG. 1. For example, the system may be configured using the semiconductor chip 103 including only the signal generating unit 107 which accommodates one channel of the transmission-side signal generating unit 110 and the reception-side signal generating unit 120 and the semiconductor chip 203 including only a signal generating unit 207 which accommodates one channel of the transmission-side signal generating unit 210 and the reception-side signal generating unit 220. Further, the transmission-side signal generating unit 110, reception-side signal generating unit 120, transmission-side signal generating unit 210 and reception-side signal generating unit 220 may be accommodated in the individually different semiconductor chips 103 and 203 to configure the system. Depending upon such modifications, the system may be configured so as to satisfy N1=N2=N.

The functional units which should be accommodated in the semiconductor chips 103 and 203 need not be accommodated in a paired relationship between the first communication device 100Y side and the second communication device 200Y side but may be accommodated in an arbitrary combination. For example, the first communication device 100Y may be formed such that the functional units for the N1 channels on the transmission side and the N2 channels on the reception side are accommodated in one chip while the second communication device 200Y side is configured such that the transmission-side signal generating units 210 and the reception-side signal generating units 220 are accommodated in such different semiconductor chips 203 from each other.

Incidentally, since, in the present embodiment, the MIMO processor 603 common to all channels is provided between the demodulator 126 and the serial-parallel converter 127 of the channels and the MIMO processor 604 common to all channels is provided between the demodulator 226 and the serial-parallel converter 227 of the channels, it is preferable for the reception system to use chips in which the functional units for the N1 channels and the N2 channels are accommodated individually. Although it is not excluded to use a chip for each channel in the reception system, in this instance, between the chips for the individual channels of the reception system and the chip in which the MIMO processors 603 and 604 (which may be accommodated in one of the chips of the reception system) are accommodated, wiring lines outside the chips are required in order to interpose the MIMO processors 603 and 604 between the demodulator 126 and the serial-parallel converter 127 or between the demodulator 226 and the serial-parallel converter 227.

On the other hand, as regards the transmission system, no such restriction is applicable, and therefore, it does not make a basic problem whether functional units of a plurality of channels are accommodated in one chip or in individually different chips. However, functional units of a plurality of channels are accommodated preferably in one chip in order to use a common or same frequency for carrier signals of different channels.

The carrier frequencies of the channels may be same as each other or different from each other. For example, where a dielectric transmission path or a hollow waveguide is used, since a millimeter wave is confined in the inside of them, millimeter wave interference can be prevented. Therefore, there is no problem even if the same frequency is used. On the other hand, in the case of a free space transmission path, if frequency space transmission paths are spaced from each other by a certain distance, then there is no problem if the same frequency is used. However, where frequency space transmission paths are spaced but by a small distance, different frequencies should be used. However, in order to effectively carry out MIMO processing or minimize the circuit scale of the demodulation functional unit on the reception side, preferably a common carrier frequency is used irrespective of the form of the millimeter wave signal transmission path 9, that is, even where the millimeter wave signal transmission path 9 is a free space transmission path.

For example, in order to implement bidirectional communication, time division multiplexing and frequency division multiplexing are available in addition to space division multiplexing. As a method for implementing data transmission and reception using the millimeter wave signal transmission path 9 of one channel, one of a half duplex method wherein transmission and reception are changed over by time division multiplexing and a full duplex method wherein transmission and reception are carried out simultaneously by frequency division multiplexing is adopted.

However, the time division multiplexing has a problem that transmission and reception cannot be carried out concurrently. Further, as seen from FIGS. 2A to 2C, the frequency division multiplexing has a problem that the millimeter wave signal transmission path 9 must have a great frequency bandwidth.

In contrast, in the wireless transmission system 1Y of the present embodiment to which the space division multiplexing is applied, same carrier frequency setting can be applied to a plurality of signal transmission channels, that is, to a plurality of channels. Consequently, it is facilitated to re-utilize carrier frequencies, that is, to use the same frequency for a plurality of channels. Even if the millimeter wave signal transmission path 9 does not have a great bandwidth, transmission and reception of signals can be implemented simultaneously. If a plurality of transmission channels are used in the same direction and the same frequency band is used at the same time, then increase of the communication speed can be achieved.

Where the millimeter wave signal transmission paths 9 of N channels are used for N (N=N1=N2) base band signals, in order to achieve bidirectional transmission and reception, time division multiplexing or frequency division multiplexing must be applied to transmission and reception. In contrast, in application of the space division multiplexing, the millimeter wave signal transmission paths 9 of 2N channels are used, and therefore, also as regards bidirectional transmission and reception, transmission can be carried out using the millimeter wave signal transmission paths 9 of different channels, that is, using the transmission paths which are fully independent of each other. In short, where N signals of a subject of communication in the millimeter waveband are used for transmission and reception, even if such a multiplexing process as time division multiplexing, frequency division multiplexing or code division multiplexing is not carried out, the N different signals can be transmitted through the individual millimeter wave signal transmission paths 9 of the 2N channels.

[Second Communication Device]

The second communication device 200Y includes a functional configuration generally similar to that of the first communication device 100Y. Each of the functional units of the second communication device 200Y is denoted by a reference numeral in the two hundreds, and a functional unit similar to that of the first communication device 100Y is denoted by a reference numeral including digits in the tens and the ones same as those of the first communication device 100Y. A transmission unit is formed from a transmission-side signal generating unit 210 and a transmission path coupler 208, and a reception unit is formed from a reception-side signal generating unit 220 and the transmission path coupler 208.

A LSI functional unit 204 carries out principal application control of the second communication device 200Y and includes, for example, a circuit for processing various signals to be transmitted to the opposite party and another circuit for processing various signals received from the opposite party.

[Connection and Operation]

A technique of frequency-converting and transmitting an input signal is used generally in broadcasting and wireless communication. In such applications, comparatively complicated transmitters, receivers and so forth are used which can cope with such problems as a) in what range communication can be carried out (problem of the S/N ratio regarding thermal noise), β) how to cope with reflection and multipath transmission and γ) how to suppress disturbance and interference with other channels. In contrast, the signal generating units 107 and 207 used in the present configuration are used in the millimeter waveband which is a higher frequency band than frequencies used in complicated transmitters and receivers used popularly in broadcasting and wireless communication. Thus, since the wavelength λ is low, frequencies can be re-utilized readily, and therefore, signal generators suitable for communication between many devices positioned in the neighborhood of each other are used.

With the present configuration, signal transmission is carried out using the millimeter waveband as described above so as to flexibly cope with high speed transmission and large amount data transmission, different from an existing signal interface which utilizes electric wiring lines. For example, only signals for which high speed transmission or large amount data transmission is required are made a subject of communication in the millimeter waveband. Depending upon the system configuration, the communication devices 100Y and 200Y include an interface by existing electric wiring lines, that is, an interface by a terminal and a connector, for signals for low speed transmission or small amount data transmission or for power supply.

The signal generating unit 107 carries out signal processing for input signals inputted from the LSI functional unit 104 to generate a signal of a millimeter wave. The signal generating unit 107 is connected to the transmission path coupler 108 by a transmission path such as, for example, a microstrip line, a strip line, a coplanar line or a slot line such that the generated signal of a millimeter wave is supplied to the millimeter wave signal transmission path 9 through the transmission path coupler 108.

The transmission path coupler 108 has an antenna structure and has a function of converting a signal of a millimeter wave transmitted thereto into an electromagnetic wave and signaling the electromagnetic wave. The transmission path coupler 108 is coupled to the millimeter wave signal transmission path 9 such that an electromagnetic wave converted by the transmission path coupler 108 is supplied to one end portion of the millimeter wave signal transmission path 9. To the other end of the millimeter wave signal transmission path 9, the transmission path coupler 208 on the second communication device 200Y side is coupled. Since the millimeter wave signal transmission path 9 is provided between the transmission path coupler 108 of the first communication device 100Y side and the transmission path coupler 208 of the second communication device 200Y side, an electromagnetic wave in the millimeter waveband is propagated to the millimeter wave signal transmission path 9.

The transmission path coupler 208 of the second communication device 200Y side is connected to the millimeter wave signal transmission path 9. The transmission path coupler 208 receives an electromagnetic wave transmitted to the other end of the millimeter wave signal transmission path 9, converts the electromagnetic wave into a signal of the millimeter band and supplies the signal of the millimeter band to the signal generating unit 207 which is a baseband signal generation unit. The signal generating unit 207 carries out signal processing for the converted signal of the millimeter wave to generate an output signal, that is, a baseband signal, and supplies the generated output signal to the LSI functional unit 204.

While, in the foregoing description, signal transmission is carried out from the first communication device 100Y to the second communication device 200Y, also signal transmission from the LSI functional unit 204 of the second communication device 200Y to the first communication device 100Y is carried out similarly. Thus, a signal of a millimeter wave can be transmitted bidirectionally.

Here, in comparison with the wireless transmission system 1Y of the basic configuration, a signal transmission system which carries out signal transmission through an electric wiring line has the following problems.

i) Although great amount data transmission and high speed transmission of transmission data are demanded, there is a limitation to the transmission speed and the transmission capacity of an electric wiring line.

ii) It seems a possible countermeasure to increase, in order to cope with the problem of achievement of high speed transmission of transmission data, the number of wiring lines to achieve parallel transmission of transmission data while reducing the transmission speed per one signal line. However, this countermeasure increases the number of input and output terminals. As a result, complication of a printed circuit board and a cable wiring scheme, increase in physical size of a connector unit and an electric interface and so forth are required. This complicates the shape of the elements mentioned, resulting in such problems of deterioration of the reliability of the element and increase of the cost.

iii) As the bandwidth of the frequency band of a baseband signal increases together with significant increase of the information amount of movie images or computer images, the problem of EMC (electromagnetic compatibility) becomes further tangible. For example, where an electric wiring line is used, the wiring line serves as an antenna and a signal corresponding to a tuning frequency of the antenna suffers from interference. Further, reflection or resonance caused by impedance mismatching of a wiring line makes a cause of unnecessary radiation. Since a countermeasure against such problems is taken, the configuration of an electronic apparatus is complicated.

iv) In addition to EMC, if reflection exists, then also a transmission error caused by interference between symbols on the reception side or a transmission error by jumping in of disturbance becomes a problem.

Meanwhile, the wireless transmission system 1Y of the basic configuration uses not an electric wiring line but a millimeter wave to carry out signal transmission. A signal to be transmitted from the LSI functional unit 104 to the LSI functional unit 204 is converted into a millimeter wave signal, which is transmitted through the millimeter wave signal transmission path 9 between the transmission path couplers 108 and 208.

Since the millimeter wave signal transmission is wireless transmission, there is no necessity to take care of the wiring line shape or the position of a connector, and therefore, the problem of the restriction to the layout does not occur very often. Since a wiring line and a terminal for a signal whose transmission is changed to signal transmission by a millimeter wave can be omitted, the problem of EMC is eliminated. Generally since the communication devices 100Y and 200Y do not include any other functional unit which uses a frequency of the millimeter waveband, a countermeasure against EMC can be implemented readily.

Since the transmission between the first communication device 100Y and the second communication device 200Y is wireless transmission in a state in which they are positioned closely to each other and therefore is signal transmission between fixed positions or in a known positional relationship, the following advantages are achieved.

1) It is easy to appropriately design a propagation channel or waveguide structure between the transmission side and the reception side.

2) By designing a dielectric structure of the transmission path couplers for enclosing the transmission side and the reception side together with a propagation channel, that is, the waveguide structure of the millimeter wave signal transmission path 9, good transmission of high reliability can be achieved by free space transmission.

3) Since also control of a controller for managing wireless transmission, which corresponds to the LSI functional unit 104 in the present embodiment, need not be carried out so dynamically, adaptively or frequently as is carried out by general wireless communication, the overhead by the control can be reduced from that of general wireless communication. As a result, miniaturization, reduction in power consumption and increase in speed can be anticipated.

4) If, upon production or designing, the wireless transmission environment is calibrated to grasp a dispersion and so forth of each individual product, then high quality communication can be anticipated by referring to the data of the dispersion and so forth to carry out transmission.

5) Even if reflection exists, since this is fixed reflection, an influence of the reflection can be eliminated readily by a small equalizer at the reception side. Also setting of the equalizer can be carried out by preset or static control and can be implemented readily.

Further, since wireless communication in the millimeter waveband in which the wavelength is short is used, the following advantages can be anticipated.

a) Since a wide communication bandwidth can be assured by the millimeter wave communication, it is possible to use a high data rate simply.

b) The frequency to be used for transmission can be spaced away from a frequency for a different baseband signal process, and therefore, interference in frequency between a millimeter wave and a baseband signal is less likely to occur.

c) Since wavelengths in the millimeter waveband are short, the antenna and the waveguide structure which depend upon the wavelength can be made small. In addition, since the distance attenuation is great and the diffraction is small, electromagnetic shielding can be carried out readily.

d) In ordinary outdoor wireless communication, the stability of a carrier is subject to severe restrictions in order to prevent interference and so forth. In order to implement a carrier which has such high stability, an external frequency reference part and a multiplication circuit or a PLL (phase-locked loop circuit) and so forth which have high stability are used. This makes the circuit scale great. However, a millimeter wave can be blocked readily and prevented from leaking to the outside particularly for signal transmission between fixed positions or in a known positional relationship. In order to use a small circuit on the reception side to demodulate a signal transmitted using a carrier whose stability is moderated, it is preferable to adopt an injection locking method hereinafter described in detail.

While, in the description of the present embodiment, a system which carries out communication in the millimeter waveband is described as an example of the wireless transmission system, the application range thereof is not limited to a system which uses the millimeter waveband for communication. Communication in a frequency band lower than the millimeter waveband or conversely higher than the millimeter waveband may be applied alternatively. For example, the microwave waveband may be applied. However, where a MIMO process, that is, an inverse matrix calculation process, is adopted for signal transmission within a housing or in signal transmission between different apparatus, it is considered most effective to use the millimeter waveband whose wavelength is not excessively long nor excessively short in a relationship between the size of various members and the wavelength.

<Application Technique of Space Division Multiplexing>

FIGS. 3A to 3C illustrate appropriate conditions, that is, application conditions, of the "space division multiplexing" adopted in the present embodiment. FIGS. 4A to 4F show an outline of a structure of the millimeter wave signal transmission path 9 for applying the "space division multiplexing."

[Appropriate Conditions of the Space Division Multiplexing]

FIGS. 3A to 3C particularly illustrate a manner of setting of appropriate conditions where the space division multiplexing is applied. For example, the propagation loss L of a free space can be represented by "L [dB]=$10 \log_{10}((4\pi d/\lambda)^2)$ . . . (A)" as seen in FIG. 3A where d is the distance and $\lambda$ is the wavelength.

Two kinds of space division multiplexing are considered as seen in FIGS. 3A to 3C. In FIGS. 3A to 3C, the transmitter is represented by "TX" and the receiver is represented by "RX." Reference character "_100" represents the first communication device 100Y side and "_200" represents the second communication device 200Y side. Referring to FIG. 3B, the first communication device 100Y includes two channels of transmitters TX_100_1 and TX_100_2, and the second communication device 200Y includes two channels of receivers RX_200_1 and RX_200_2. In particular, signal transmission from the first communication device 100Y side to the second communication device 200Y side is carried out between the transmitter TX_100_1 and the receiver RX_200_1 and between the transmitter TX_100_2 and the receiver RX_200_2. In other words, signal transmission from the first communication device 100Y side to the second communication device 200Y side is carried out through the two channels.

Meanwhile, referring to FIG. 3C, the first communication device 100Y includes a transmitter TX_100 and a receiver RX_100 while the second communication device 200Y includes a transmitter TX_200 and a receiver RX_200. In particular, signal transmission from the first communication device 100Y side to the second communication device 200Y side is carried out between the transmitter TX_100 and the receiver RX_200, and signal transmission from the second communication device 200Y side to the first communication device 100Y side is carried out between the transmitter TX_200 and the receiver RX_100. Different channels are used for transmission and reception, and transmission (TX) and reception (RX) of data from and to both apparatus can be carried out by full duplex transmission.

Here, the relationship between an inter-antenna distance $d_1$ and a spatial channel distance $d_2$, particularly a space distance between free space transmission paths 9B, necessary to obtain a necessary DU [dB], that is, a necessary ratio between a desired wave and an unnecessary wave, where an antenna having no directivity is given, from the expression (A), by "$d_2/d_1=10^{DU/20}$ . . . (B)."

For example, if DU=20 dB, then $d_2/d_1=10$, and the spatial channel distance $d_2$ must be as long as ten times the inter-antenna distance $d_1$. Since usually an antenna has some directivity, even in the case of the free space transmission paths 9B, the spatial channel distance $d_2$ can be set shorter.

For example, if the distance to an antenna of the opposite party of communication is short, then the transmission power for the antennas can be suppressed low. If the transmission power is sufficiently low and a pair of antennas, also called channel, can be installed at positions sufficiently spaced away from each other, then interference between the paired antennas can be suppressed sufficiently low. Particularly in millimeter wave communication, since the wavelength of a millimeter wave is short, the distance attenuation is great and also the diffraction is small, and therefore, space division multiplexing can be implemented readily. For example, even with the free space transmission paths 9B, the spatial channel distance $d_2$, that is, the space distance between the free space transmission paths 9B, can be set smaller than ten times the inter-antenna distance $d_1$.

In the case of a dielectric transmission path or a hollow waveguide having a millimeter wave confining structure, since a millimeter wave can be transmitted while it is confined in the inside, the spatial channel distance $d_2$, that is, the space distance between the free space transmission paths, can be set shorter than ten times the inter-antenna distance $d_1$. Particularly in contrast to the free space transmission paths 9B, the channel distance can be reduced further.

[Examples of the Structure of the Millimeter Wave Signal Transmission Path for the Space Division Multiplexing]

FIGS. 4A to 4F show several examples of the structure of the millimeter wave signal transmission path for the space division multiplexing. When it is intended to increase the number of transmission channels, where the space division multiplexing is not applied, it seems a possible idea, for example, to apply frequency division multiplexing to use carrier frequencies different among different channels. However, if the space division multiplexing is applied, then even if the same carrier frequency is used, simultaneous signal transmission can be carried out without being influenced by interference.

In particular, the "space division multiplexing" may be achieved using any configuration only if a plurality of channels of independent millimeter wave signal transmission paths 9 are formed in a three-dimensional space through which a millimeter wave signal or an electromagnetic wave can be transmitted. Thus, the configuration is not limited to the specific configuration wherein a plurality of channels of free space transmission paths 9B are formed in a free space such that they are spaced from each other by a distance with which interference does not occur (refer to FIG. 4A).

For example, as shown in FIG. 4B, where a plurality of channels of free space transmission paths 9B are provided in a free space, a structure for disturbing propagation of a radio wave, that is, a millimeter wave blocking body MX, may be arranged between each adjacent ones of transmission channels in order to suppress interference between the transmission channels. The millimeter wave blocking body MX may be or may not be a conductor.

Each of the plural channels of millimeter wave signal transmission paths 9 may be configured as a free space transmission path 9B such that a signal propagates, for example, in a space in a housing. However, a free space is not necessarily required, but a millimeter wave confining structure may be used instead. The millimeter wave confining structure is preferably formed from a waveguide structure of a waveguide pipe, a transmission path, a dielectric line or the inside of a dielectric member such that it has a characteristic of transmitting an electromagnetic wave in the millimeter waveband efficiently.

For example, such a dielectric transmission path 9A as shown in FIG. 4C may be adopted which is configured including a dielectric material having a relative dielectric constant within a fixed range and a dielectric loss tangent within a fixed range. For example, if a dielectric material is filled in the entire housing, then not free space transmission paths but dielectric transmission paths 9A are disposed between the transmission path coupler 108 and the transmission path coupler 208. Or, the dielectric transmission path 9A may be configured by connecting the antenna of the transmission path coupler 108 and the antenna of the transmission path coupler 208 to each other by a dielectric line which is a line member formed from a dielectric material and having a certain diameter.

The "fixed range" may be any range of the relative dielectric constant or the dielectric loss tangent within which an effect of the present configuration can be achieved, and the relative dielectric constant or the dielectric loss tangent may have a value within this range. In short, the dielectric material may be any material which can transmit a millimeter wave and has a characteristic with which the effect of the present configuration can be achieved. Since the effect of the present configuration does not rely only upon the dielectric material itself but relates also to the transmission path length or the frequency of the millimeter wave, the relative dielectric constant or the dielectric loss tangent cannot necessarily be determined definitely. However, as an example, they can be determined in the following manner.

In order to allow a signal of a millimeter wave to be transmitted at a high speed in the dielectric transmission path 9A, the relative dielectric constant of the dielectric material preferably is approximately 2 to 10, and more preferably is approximately 3 to 6, and the dielectric loss constant of the dielectric material preferably is 0.00001 to 0.01, more preferably is approximately 0.00001 to 0.001. As the dielectric material which satisfies such conditions as given above, acrylic resin-based, urethane resin-based, epoxy resin-based, silicone-based, polyimide-based and cyanoacrylate-based materials are available. Unless otherwise specified, such ranges of the relative dielectric constant and the dielectric loss constant of the dielectric material as given above are applied similarly in the present configuration.

Where the dielectric transmission path 9A is configured in a millimeter wave confining structure, a dielectric shielding member of a metal member or the like for suppressing external radiation of a millimeter wave signal, that is, a millimeter wave blocking body MY, may be provided on an outer periphery of the dielectric transmission path 9A as shown in FIG. 4D to suppress external radiation of a millimeter wave. Preferably, the millimeter wave blocking body MY is set to a fixed potential such as, for example, the ground potential, on the circuit board. Where the millimeter wave blocking body MY is formed from a conductor, a shielding performance can be assured with a higher degree of certainty than where the millimeter wave blocking body MY is not formed from a conductor.

As another example of the millimeter wave confining structure, a hollow waveguide 9L which is surrounded over an outer periphery thereof by a shielding member and has a hollow structure may be used. For example, as shown in FIG. 4E, the hollow waveguide 9L is structured such that it is surrounded over an outer periphery thereof by a conductor MZ which is an example of a shielding member and is hollow. The surrounding conductor MZ may be provided on any one of two boards disposed in an opposing relationship to each other. The propagation loss L between the surrounding conductor MZ and one of the boards, more particularly, the length of a gap from an end of the conductor MZ to the opposing board, is set to a sufficiently low value in comparison with the wavelength of the millimeter wave. Where the surrounding shielding member is formed as the conductor MZ, the shielding performance can be assured with a higher degree of certainty than where it is not formed from a conductor.

If FIGS. 4B and 4E are compared with each other, then the hollow waveguide 9L has a structure similar to the free space transmission path 9B where the millimeter wave blocking body MX is disposed in the free space transmission path 9B but is different from the free space transmission path 9B in that the conductor MZ which is an example of a millimeter wave shielding member is provided in such a manner as to surround the antenna. Since the inside of the conductor MZ is hollow, there is no necessity to use a dielectric material, and the millimeter wave signal transmission path 9 can be configured simply and readily at a low cost. Preferably, the conductor MZ is set to a fixed potential such as, for example, the ground potential on the board.

The configuration of the hollow waveguide 9L is not limited to that wherein an enclosure is formed from the conductor MZ on the board, but the hollow waveguide 9L may be configured such that a hole which may be or may not be a through-hole is formed in a rather thick board such that the wall face of the hole is utilized as the enclosure. The hole may have an arbitrary sectional shape such as a circular shape, a triangular shape or a quadrangular shape. In this instance, the board functions as a shielding member. The hole may be formed in one or both ones of a pair of boards disposed in an opposing relationship to each other. The side wall of the hole may be or may not be covered with a dielectric member. Where the hole is formed as a through-hole, an antenna should be disposed on or attached to the rear face of a semiconductor chip. Where the hole is formed not as a through-hole but as a bottomed or blind hole, an antenna should be installed on the bottom of the hole.

Since the dielectric transmission path 9A and the hollow waveguide 9L confine a millimeter wave therein by the enclosure thereof, they can achieve such advantages that a millimeter wave can be transmitted efficiently with comparatively low loss, that external radiation of a millimeter wave is suppressed and that an EMC countermeasure can be taken comparatively easily.

As a further example of the millimeter wave confining structure, where a three-dimensional space which can transmit a millimeter wave signal which is an electromagnetic signal is configured from a dielectric material which is an entity, a plurality of channels of independent millimeter wave signal transmission paths 9, particularly the dielectric transmission paths 9A (this similarly applies in this paragraph), are formed on the dielectric material. For example, it seems a possible idea to configure a printed board, on which electronic circuit parts are mounted, from a dielectric material and use the printed board as a dielectric transmission path 9A. In this instance, it seems a possible idea to form a plurality of independent dielectric transmission paths 9A in the board.

Where the space division multiplexing is applied, it may seem a possible idea to adopt a system configuration which includes various types of millimeter wave signal transmission paths 9 which are combined such that one of the millimeter wave signal transmission paths 9 is formed as the free space transmission path 9B and another one of the millimeter wave signal transmission paths 9 is formed so as to have a millimeter wave confining structure like the dielectric transmission path 9A or the hollow waveguide 9L.

Modulation and Demodulation

First Example

Figure 5A:
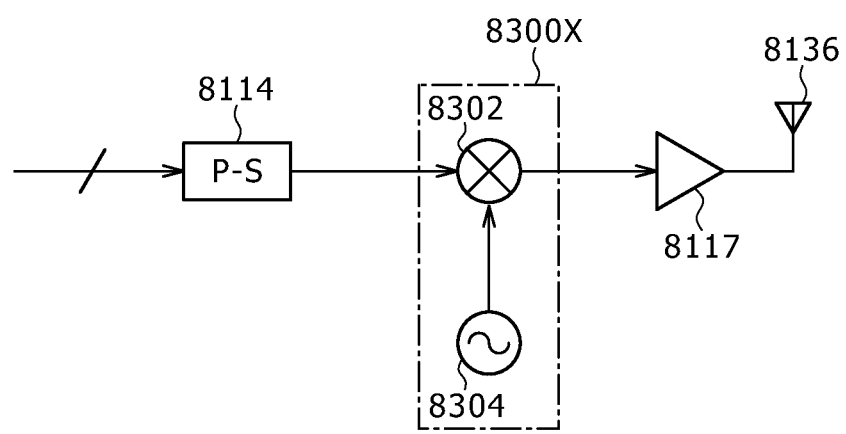
FIGS. 5A and 5B are block diagrams illustrating a first example of a modulation functional unit and a demodulation functional unit in a communication processing channel.
Figure 5B:
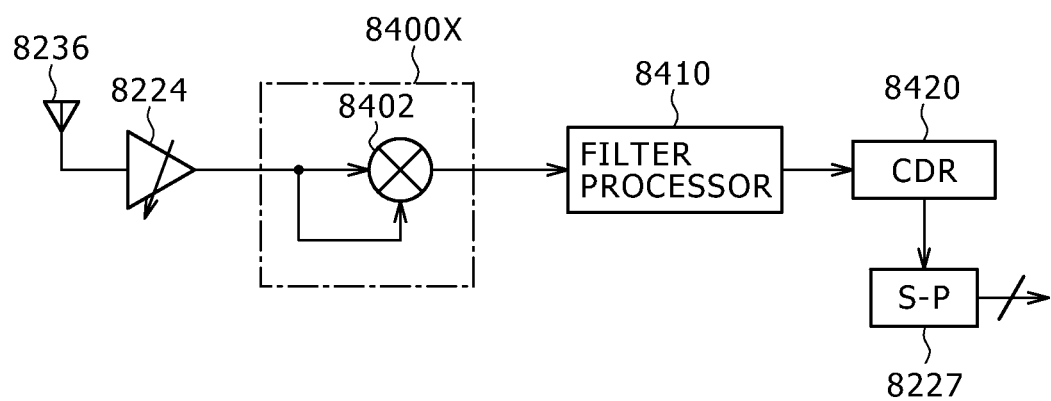

FIGS. 5A and 5B show a first example of a modulation functional unit and a demodulation functional unit in the communication processing channel.

Modulation Functional Unit

First Example

FIG. 5A shows a configuration of a modulation functional unit 8300X of a first example provided on the transmission side. A signal of a transmission subject, for example, an image signal of 12 bits, is converted by the parallel-serial converter 114 into a high-speed serial data string and supplied to the modulation functional unit 8300X.

The modulation functional unit 8300X can adopt various circuit configurations in accordance with the modulation method. However, for example, if a method of modulating the amplitude is adopted, then the modulation functional unit 8300X should be configured such that it includes a frequency mixer 8302 and a transmission side local oscillator 8304. Where a method wherein the phase is modulated in two axes, the modulation functional unit 8300X should be configured so as to be ready, for example, for quadrature modulation.

The transmission side local oscillator 8304 which serves as a first carrier signal generating unit generates a carrier signal to be used for modulation, that is, a modulation carrier signal. The frequency mixer 8302 which serves as a first frequency converter multiplies or modulates a carrier in the millimeter waveband generated by the transmission side local oscillator 8304 by or with a signal from a parallel-serial converter 8114 which corresponds to the parallel-serial converter 114 to generate a modulation signal in the millimeter waveband. The modulation signal is supplied to an amplifier 8117 which corresponds to the amplifier 117. The modulation signal is amplified by the amplifier 8117 and radiated from an antenna 8136.

Demodulation Functional Unit

First Example

FIG. 5B shows a configuration of a demodulation functional unit 8400X of the first example provided on the reception side. While the demodulation functional unit 8400X can have various circuit configurations within a range corresponding to the modulation method on the transmission side, it is assumed here that the demodulation functional unit 8400X adopts a method applied where the amplitude is modulated so as to correspond to the description of the modulation functional unit 8300X given hereinabove. Where a method wherein the phase is modulated is to be adopted, the demodulation functional unit 8400X should be configured so as to be ready for quadrature detection or synchronous detection.

The demodulation functional unit 8400X of the first example includes a frequency mixer 8402 or mixer circuit of the 2-input type as an example of an amplitude detection circuit and uses a square-law detection circuit from which a detection output which increases in proportion to the square of the amplitude of an envelope of a received millimeter wave signal can be obtained. It is to be noted that it seems a possible idea to use, as the amplitude detection circuit, a simple envelope detection circuit which does not have a square characteristic in place of the square-law detection circuit. A filter processor 8410, a clock recovering unit 8420 which is a clock data recovery (CDR) unit and a serial-parallel converter (S-P) 8127 which corresponds to the serial-parallel converter 127 are provided on the succeeding stage to the frequency mixer 8402. The filter processor 8410 includes, for example, a low-pass filter (LPF).

A millimeter wave reception signal received by an antenna 8236 is inputted to an amplifier 8224 of the variable gain type, which corresponds to the amplifier 224 and by which amplitude adjustment is carried out for the millimeter wave reception signal. An output signal of the amplifier 8224 is supplied to the demodulation functional unit 8400X. In particular, the amplitude-adjusted reception signal from the amplifier 8224 is inputted simultaneously to two input terminals of the frequency mixer 8402, by which a square signal is generated. The square signal is supplied to the filter processor 8410. The low-pass filter of the filter processor 8410 removes high frequency components from the square signal generated by the frequency mixer 8402 to generate a waveform of the input signal sent from the transmission side, that is, a baseband signal. The baseband signal is supplied to the clock recovering unit 8420.

The filter processor 8410 (CDR) recovers a sampling clock based on the baseband signal and samples the baseband signal with the recovered sampling clock to generate a reception data string. The generated reception data string is supplied to a serial-parallel converter 8227 (S-P), by which parallel signals, for example, an image signal of 12 bits, are recovered. Although various methods are available for clock recovery, for example, a symbol synchronizing method is adopted.

Problems of the First Example

Where a wireless transmission system is configured from the modulation functional unit 8300X and the demodulation functional unit 8400X of the first example, it has the following difficult points.

First, the following difficult points exist with regard to the oscillation circuits. For example, in outdoor communication, it is necessary to take multi-channel transmission into consideration. In this instance, the required specifications for the stability of a carrier on the transmission side are severe because the stability is influenced by a frequency variation component of the carrier. In transmission of data using a millimeter wave in signal transmission within a housing or signal transmission between different apparatus, if it is attempted to use an ordinary technique as is used in outdoor wireless communication on the transmission side and the reception side, then stability is required for the carrier. Thus, an oscillation circuit for a millimeter wave having such high stability that the frequency stability value is on the ppm (parts per million) order is required.

In order to implement a carrier signal having high frequency stability, it seems a possible idea, for example, to implement an oscillation circuit for a millimeter wave having high stability on a silicon integrated circuit (CMOS: Complementary Metal-Oxide Semiconductor). However, since a silicon substrate used for an ordinary CMOS device has a low insulating property, a tank circuit having a high Q value (Quality Factor) cannot be formed readily, and consequently, the implementation of a carrier signal having high frequency stability is difficult. For example, where inductance is formed on a CMOS chip as disclosed, for example, in A. Niknejad, "mm-Wave Silicon Technology 60 GHz and Beyond" (particularly 3.1.2 Inductors, pp. 70-71), ISBN 978-0-387-87558-7 (hereinafter referred to as Reference Document A), the Q value becomes approximately 30 to 40.

Therefore, in order to implement an oscillation circuit having high stability, it seems a possible idea to adopt a technique wherein a tank circuit of a high Q value is provided using a quartz oscillator or the like outside a CMOS device in which main part of the oscillation circuit is configured such that the tank circuit oscillates with a low frequency and multiply the oscillation output of the tank circuit until the frequency thereof falls within the millimeter bandwidth. However, it is not preferable to provide such an external tank circuit for all chips in order to implement a function of replacing signal transmission by a wiring line such as LVDS (Low Voltage Differential Signaling) with signal transmission by a millimeter wave.

If a method wherein the amplitude is modulated like OOK (On-Off-Keying) is used, then since only it is necessary on the reception side to carry out envelope detection, the oscillation is not required, and therefore, the number of tank circuits can be reduced. However, as the signal transmission distance becomes long, the reception amplitude decreases, and with a method which uses a square-law detection circuit is used as an envelope detection circuit, the influence of decrease of the reception amplitude becomes conspicuous and signal distortion comes to have an influence disadvantageously. In other words, the square-law detection circuit is disadvantageous in terms of the sensitivity.

As another technique for implementing a carrier signal having high frequency stability, it seems a possible idea to use, for example, a frequency multiplication circuit or a PLL circuit having high stability. However, this increases the circuit scale. For example, "A 90 nm CMOS Low-Power 60 GHz Transceiver with Integrated Baseband Circuitry," ISSCC 2009/SESSION 18/RANGING AND Gb/s COMMUNICATION/18.5, 2009 IEEE International Solid-State Circuits Conference, pp. 314-316 (hereinafter referred to as Reference Document B) discloses a technique which uses a push-push oscillation circuit while a 60 GHz oscillation circuit is eliminated to reduce the circuit scale. However, the technique still requires an oscillation circuit of 30 GHz and a frequency divider, a phase frequency detection circuit (Phase Frequency Detector: PFD), an external reference, which is, in the technique disclosed, 117 MHz, and so forth. Thus, the circuit scale is apparently great.

Since the square-law detection circuit can extract only an amplitude component from a reception signal, the modulation method which can be used is limited to a method of modulating the amplitude such as ASK like OOK, and it is difficult to adopt a method which modulates the phase or the frequency. That it is difficult to adopt the phase modulation method leads to the fact that it is impossible to convert a modulation signal into quadrature signals to raise the data transmission rate.

Further, where it is tried to use the frequency division multiplexing method to implement multi-channel transmission, use of the square-law detection circuit gives rise to the following difficult points. Although it is necessary to dispose a band-pass filter for frequency selection on the reception side at a preceding stage to the square-law detection circuit, it is not easy to implement a small steep band-pass filter. Further, where a steep band-pass filter is used, also required specifications for the stability of the carrier frequency on the transmission side become severe.

Modulation and Demodulation

Second Example

Figure 6A:
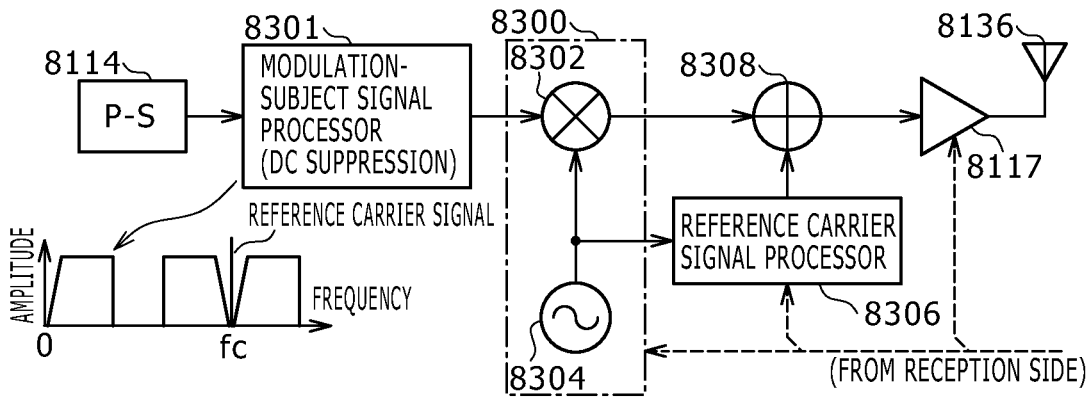
FIGS. 6A to 6D are diagrammatic views illustrating a second example of a transmission side signal generator configured from the modulation functional unit provided on the transmission side and peripheral circuits of the modulation functional unit.
Figure 6B:
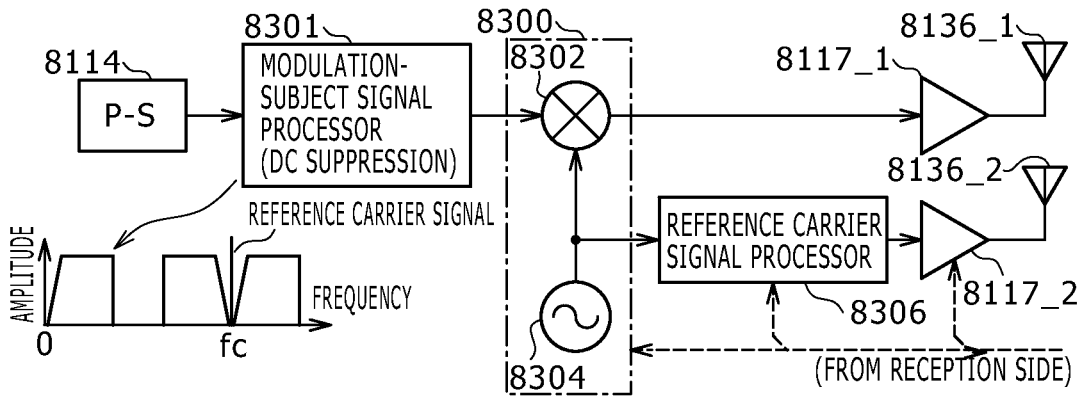
Figure 6C:
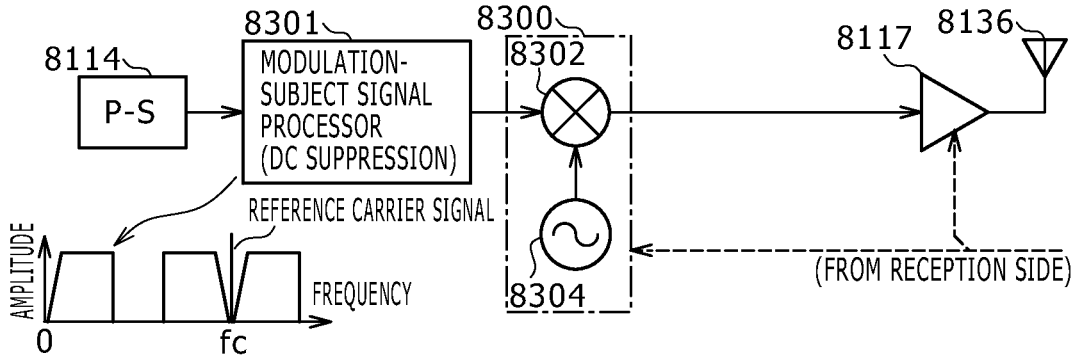
Figure 6D:
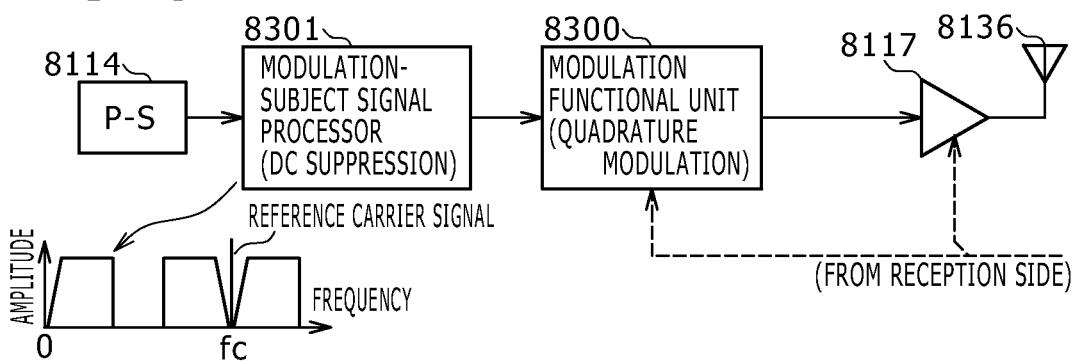
Figure 7A:
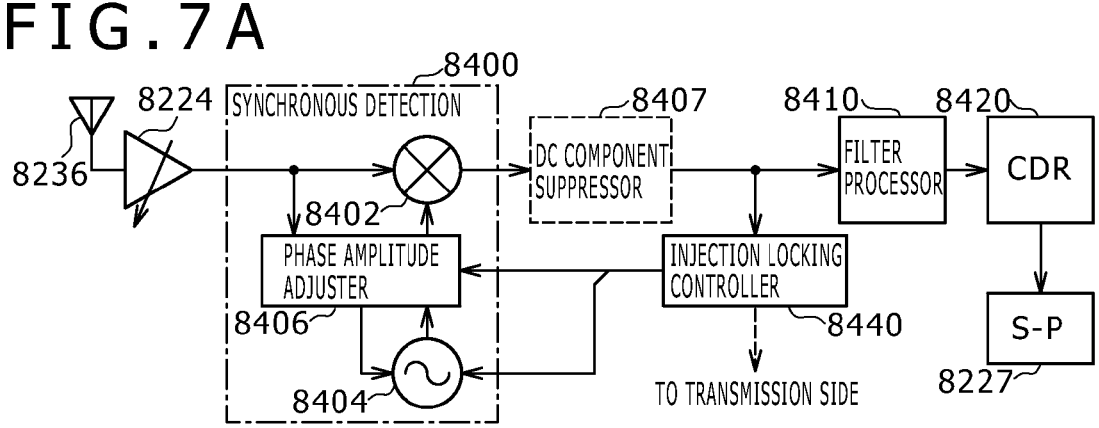
FIGS. 7A to 7D are block diagrams illustrating an example of a configuration of a reception side signal generator configured from the demodulation functional unit of the second example provided on the reception side and peripheral circuits of the demodulation functional unit.
Figure 7B:
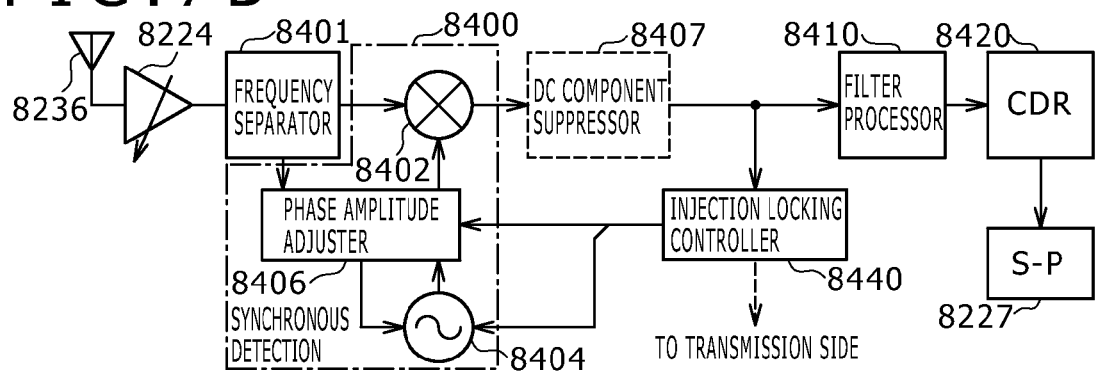
Figure 7C:
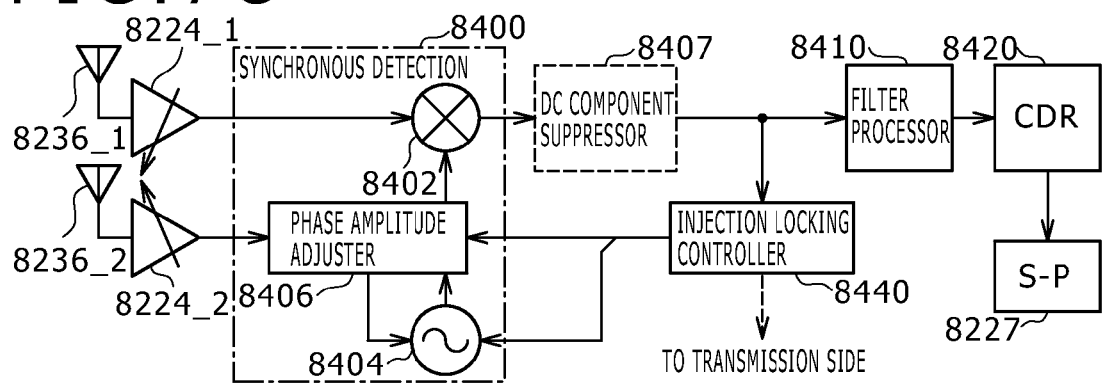
Figure 7D:
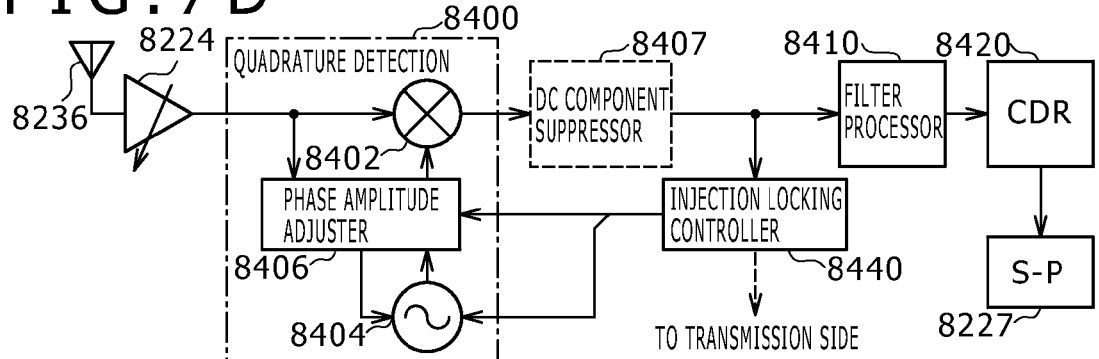
Figure 8:
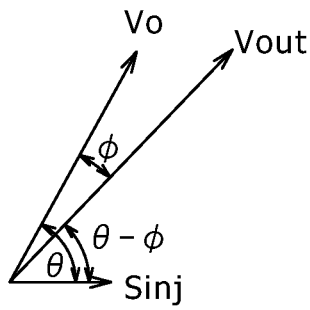
FIG. 8 is a diagrammatic view illustrating a phase relationship of injection locking.

FIGS. 6A to 8 show a second example of the modulation function and the demodulation function in the communication processing channel. In particular, FIGS. 6A to 6D show a second example of a transmission side signal generating unit 8110, which is a communication unit of the transmission side, configured from a modulation functional unit 8300 provided on the transmission side and including modulators 115 and 215 and frequency converters 116 and 216 and peripheral circuits of the modulation functional unit 8300. FIGS. 7A to 7D show an example of a configuration of a reception side signal generating unit 8220 which is a communication unit on the reception side and is configured from a demodulation functional unit 8400 of the second example which is provided on the reception side and including frequency converters 125 and 225 and demodulators 126 and 226 and peripheral circuits of the demodulation functional unit 8400. FIG. 8 illustrates a phase relationship in injection locking.

As a countermeasure against the problems of the first example described above, the demodulation functional unit 8400 of the second example adopts an injection locking method.

Where the injection locking method is adopted, preferably an appropriate correction process is carried out in advance for a modulation subject signal so as to facilitate application of injection locking on the reception side. Typically, a modulation subject signal is modulated after components thereof in the proximity of DC are suppressed. In particular, by modulating a modulation subject signal after low-frequency components thereof including a DC component are suppressed or cut, modulation signal components in the proximity of a carrier frequency fc are minimized thereby to facilitate injection locking on the reception side. In the case of the digital method, DC-free encoding is carried out in order to eliminate that a DC component is generated, for example, by successive appearances of the same code.

Preferably, also a reference carrier signal used as a reference for injection locking on the reception side corresponding to a carrier signal used for modulation is signaled together with a signal modulated in the millimeter waveband, that is, with a modulation signal. The reference carrier signal has a fixed frequency and a fixed phase, and preferably has a fixed amplitude, corresponding to those of the carrier signal outputted from the transmission side local oscillator 8304 and used for the modulation, and typically is the carrier signal itself used for the modulation. However, it is only necessary for the reference carrier signal to be at least kept in synchronism with the carrier signal, and the reference carrier signal is not limited to the signal described above. For example, a signal of a different frequency synchronized with the carrier signal used for the modulation, for example, a higher harmonic signal or a signal which has the same frequency but has a different phase such as, for example, an quadrature carrier signal orthogonal to the carrier signal used for the modulation may be used.

Depending upon the modulation method or the modulation circuit, two cases are available including a case wherein an output signal itself of the modulation circuit includes a carrier signal, for example, as in standard amplitude modulation or ASK and another case wherein the carrier is suppressed, for example, as in amplitude modulation, ASK or PSK of the carrier suppression type. Therefore, the circuit configuration to be adopted for signaling also a reference carrier signal together with a signal modulated in the millimeter waveband from the transmission side depends upon the type of the reference carrier signal, that is, depends upon whether or not the carrier signal itself used for the modulation should be used as a reference carrier signal, and also upon the modulation method or the modulation circuit.

Modulation Functional Unit

Second Example

FIGS. 6A to 6D show a configuration of the second example of the modulation functional unit 8300 and peripheral circuits. Referring to FIGS. 6A to 6D, a modulation-subject signal processor 8301 is provided on the preceding stage to the modulation functional unit 8300, particularly to the frequency mixer 8302. FIGS. 6A to 6D particularly show different configuration examples matching with the digital type. Referring to FIGS. 6A to 6D, the modulation-subject signal processor 8301 carries out DC-free encoding such as 8-9 conversion encoding (8B/9B encoding), 8-10 conversion encoding (8B/10B encoding) or a scrambling process with respect to the data supplied from the parallel-serial converter 8114 in order to eliminate appearance of a DC component caused by successive appearances of the same code. Though not shown, in analog modulation, bypass filter processing or band-pass filter processing should be applied in advance to the modulation subject signal.

In the 8-10 conversion encoding, 8-bit data is converted into a 10-bit code. For example, from among 1,024 different codes of the 10-bit codes, those codes which include a number of "1s" and a number of "0s" which are equal to each other or as near to each other as possible are adopted as data codes so that they have a DC free characteristic. Some of those 10-bit codes which are not adopted as such data codes is used, for example, as a specific code indicative of an idle state or a packet delimiter. The scrambling process is used, for example, in a wireless LAN (IEEE802.11a).

The basic configuration 1 shown in FIG. 6A includes a reference carrier signal processor 8306 and a signal combining unit 8308 and carries out combination of an output signal of the modulation circuit serving as the first frequency conversion circuit, that is, a modulation signal, and a reference carrier signal. The basic configuration can be regarded as a universal configuration which is not influenced by the type of the reference carrier signal, the modulation method or the modulation circuit. However, depending upon the phase of the reference carrier signal, the combined reference carrier signal is sometimes detected as a DC offset component upon demodulation on the reception side and has an influence on the recovery of the baseband signal. In this instance, a countermeasure for suppressing the DC component is taken on the reception side. In other words, the reference carrier signal should have a phase relationship with which a DC offset component need not be removed upon demodulation.

The reference carrier signal processor 8306 adjusts the phase and the amplitude of a modulation carrier signal supplied thereto from the transmission side local oscillator 8304 as occasion demands and supplies a resulting signal as a reference carrier signal to the signal combining unit 8308. The present basic configuration 1 is adopted, for example, where a method wherein essentially an output signal itself of the frequency mixer 8302 does not include a carrier signal whose frequency and phase are always fixed, that is, a method wherein the frequency and/or the phase are modulated, or where a harmonic signal of the carrier signal used for the modulation or an quadrature carrier signal is used as the reference carrier signal.

In this instance, the harmonic signal of the carrier signal used for the modulation or the quadrature carrier signal can be used as the reference carrier signal and the amplitude and the phase of the modulation signal and the reference carrier signal can be adjusted individually. In other words, although the amplifier 8117 carries out gain adjustment paying attention to the amplitude of the modulation signal and also the amplitude of the reference carrier signal is adjusted thereupon simultaneously, only the amplitude of the reference carrier signal can be adjusted by the reference carrier signal processor 8306 so that a preferable amplitude for injection locking may be obtained.

While the basic configuration 1 includes the signal combining unit 8308 to combine a modulation signal and a reference carrier signal, this is not essential, but a modulation signal and a reference carrier signal may be sent from different antennas 8136_1 and 8136_2 to the reception side preferably through different millimeter wave signal transmission paths 9 so that interference may not occur like a basic configuration 2 shown in FIG. 6B. In the basic configuration 2, a reference carrier signal also whose amplitude is normally fixed can be signaled to the reception side, and the basic configuration 2 can be regarded as an optimum configuration from the point of view of facilitation in injection locking.

The basic configurations 1 and 2 are advantageous in that the amplitude and the phase of a carrier signal used for the modulation, or in other words, a modulation signal to be signaled, and a reference carrier signal can be adjusted individually. Accordingly, they can be regarded suitable to make the phases of a modulation axis on which transmission subject information is to be placed and an axis of a reference carrier signal to be used for injection locking, that is, a reference carrier axis, not the same phase but different phases from each other so that a DC offset may not appear in the demodulation output.

Where an output signal itself of the frequency mixer 8302 can include a carrier signal whose frequency or phase is always fixed, a basic configuration 3 shown in FIG. 6C which does not include any of the reference carrier signal processor 8306 and the signal combining unit 8308 can be adopted. Only it is necessary to signal only a modulation signal modulated in the millimeter waveband by the frequency mixer 8302 to the reception side and handle the carrier signal included in the modulation signal as a reference carrier signal. Thus, there is no necessity to further add a reference carrier signal to an output signal of the frequency mixer 8302 and send a resulting signal to the reception side. For example, in the case of a method which modulates the amplitude such as, for example, the ASK method, this basic configuration 3 can be adopted. At this time, preferably a DC free process is carried out for the reference carrier signal.

However, also in the amplitude modulation or the ASK, the frequency mixer 8302 is formed positively as a circuit of the carrier suppression type such as, for example, a balanced modulation circuit or a double-balanced modulation circuit such that also a reference carrier signal is sent together with an output signal, that is, a modulation signal, of the circuit of the carrier suppression type as in the case of the basic configurations 1 and 2.

It is to be noted that, also in regard to a method which modulates the phase or the frequency, it seems a possible idea to signal only a modulation signal modulated (frequency-converted) into a millimeter waveband signal by the modulation functional unit 8300, which uses, for example, quadrature modulation, as in the case of a basic configuration 4 shown in FIG. 6D. However, whether or not injection locking can be established on the reception side relates also to the injection level, that is, the amplitude level, of the reference carrier signal inputted to the oscillation circuit of the injection locking type, the modulation method, the data rate, the carrier frequency and so forth. Therefore, the possible countermeasure described above is restricted in the application range.

In all of the basic configurations 1 to 4, a mechanism can be adopted which receives information based on a result of injection locking detection on the reception side and adjusts the phase of the modulation carrier frequency or the phase of a millimeter wave, which particularly is used for an injection signal on the reception side such as, for example, a reference carrier signal or a modulation signal, or of the reference carrier signal. It is not essential to carry out transmission of information from the reception side to the transmission side using a millimeter wave, but such transmission may be carried out by an arbitrary method irrespective of wired or wireless transmission.

In all of the basic configurations 1 to 4, the transmission side local oscillator 8304 is controlled to adjust the frequency of the modulation carrier signal and the reference carrier signal.

In the basic configurations 1 and 2, the reference carrier signal processor 8306 or the amplifier 8117 is controlled to adjust the amplitude or the phase of the reference carrier signal. It is to be noted that, while it seems a possible idea to adjust, in the basic configuration 1, the amplitude of the reference carrier signal by means of the amplifier 8117 which adjusts the transmission power, in this instance, there is a difficult point that also the amplitude of the modulation signal is adjusted together.

In the basic configuration 3 suitable for a method which modulates the amplitude such as analog amplitude modulation or digital ASK, either the DC component with respect to the modulation subject signal is adjusted or the modulation degree is controlled to adjust the carrier frequency component in the modulation signal, which corresponds to the amplitude of the reference carrier signal. For example, a case is studied wherein a signal which corresponds to a transmission subject signal to which a DC component is added is modulated. In this instance, where the modulation degree is fixed, the DC component is controlled to adjust the amplitude of the reference carrier signal. On the other hand, where the DC component is fixed, the modulation degree is controlled to adjust the amplitude of the reference carrier signal.

However, in this instance, the signal combining unit 8308 need not be used, but only if only a modulation signal outputted from the frequency mixer 8302 is signaled to the reception side, then it is outputted automatically as a signal in which a modulation signal obtained by modulating a carrier signal with a transmission subject signal and the carrier signal used for the modulation are mixed. The reference carrier signal is placed inevitably on an axis same as the modulation axis on which the transmission subject signal of the modulation signal is placed. In other words, the reference carrier signal is transmitted in phase with the modulation axis. On the reception side, the carrier frequency component in the modulation signal is used as the reference carrier signal for injection locking. Although details are hereinafter described, when viewed on a phase plane, the modulation axis on which the transmission subject information is placed and the axis of the carrier frequency component, that is, a reference carrier signal, to be used for injection locking, have the same phase, and a DC offset arising from the carrier frequency component or reference carrier signal appears in the demodulation output.

Modulation Functional Section

Second Example

FIGS. 7A to 7D shows a configuration of the second example of the demodulation functional unit 8400 and peripheral circuits. Referring to FIGS. 7A to 7D, the demodulation functional unit 8400 of the second example includes a reception side local oscillator 8404, to which an injection signal is supplied to acquire an output signal corresponding to the carrier signal used for the modulation on the transmission side. Typically, an oscillation output signal synchronized with the carrier signal used on the transmission side is acquired. Then, a received millimeter wave modulation signal and a carrier signal for demodulation, which is a demodulation carrier signal and is hereinafter referred to as recovered carrier signal, based on the output signal of the reception side local oscillator 8404 are multiplied or synchronously detected by the frequency mixer 8402 to acquire a synchronous detection signal. This synchronous detection signal is subjected to removal of high frequency components thereof by the filter processor 8410 to obtain a waveform or a baseband signal of the input signal sent from the transmission side.

Where the frequency mixer 8402 carries out frequency conversion, that is, down conversion or demodulation, through synchronous detection, for example, such advantages can be achieved that a superior bit error characteristic is obtained and that, if the synchronous detection is expanded to quadrature detection, then phase modulation or frequency modulation can be applied.

When a recovered carrier signal based on an output signal of the reception side local oscillator 8404 is to be supplied to and demodulated by the frequency mixer 8402, it is necessary to take phase displacement into consideration, and it is essential to provide a phase adjustment circuit in the synchronous detection system. This is because a received modulation signal and an oscillation output signal to be outputted from the reception side local oscillator 8404 by injection locking have a phase difference therebetween as disclosed, for example, in L. J. Paciorek, "Injection Lock of Oscillators," Proceeding of the IEEE, Vol. 55, No. 11, November 1965, pp. 1723-1728 (hereinafter referred to as Reference Document C).

In the present example, a phase amplitude adjuster 8406 which has not only a function of the phase adjustment circuit but also a function of adjusting the injection amplitude is provided in the demodulation functional unit 8400. The phase adjustment circuit may be provided for any of the injection signal to the reception side local oscillator 8404 and the output signal of the reception side local oscillator 8404 or may be applied to both of them. The reception side local oscillator 8404 and the phase amplitude adjuster 8406 cooperate to configure a carrier signal generating unit on the demodulation side, that is, a second carrier signal generating unit, which generates a demodulation carrier signal synchronized with the modulation carrier signal and supplies the demodulation carrier signal to the frequency mixer 8402.

As indicated by broken lines in FIGS. 7A to 7D, a DC component suppressor 8407 is provided at the succeeding stage to the frequency mixer 8402. The DC component suppressor 8407 removes a DC offset component which may possibly be included in the synchronous detection signal in response to the phase of the reference carrier signal combined into the modulation signal, in particular, when the modulation signal and the phase carrier signal are in an in-phase state.

Here, if, based on the Reference Document C, the free-running oscillation frequency of the reception side local oscillator 8404 is represented by fo ($\omega$o), the center frequency of the injection signal (in the case of the reference carrier signal, the frequency of the same) by fi ($\omega$i), the injection voltage to the reception side local oscillator 8404 by Vi, the free-running oscillation voltage of the reception side local oscillator 8404 by Vo and the Q value, that is, the quality factor, by Q, then where the lock range is indicated by a maximum pull-in frequency range $\Delta$fomax, this is defined by the following expression (A):

$$\Delta fo\max = fo/(2*Q)*(Vi/Vo)*1/sqrt(1-(Vi/Vo)2) \quad\quad (A)$$

From the expression (A), it can be recognized that the Q value has an influence on the lock range, and as the Q value decreases, the lock range expands.

From the expression (A), it can be recognized that, although the reception side local oscillator 8404 which acquires an oscillation output signal by injection locking can be locked or synchronized with a component in the maximum pull-in frequency range $\Delta$fomax in the injection signal, it cannot be locked with any other component than the maximum pull-in frequency range $\Delta$fomax and has a band-pass effect. For example, where a modulation signal having a frequency band is supplied to the reception side local oscillator 8404 so as to obtain an oscillation output signal from the reception side local oscillator 8404 through injection locking, an oscillation output signal synchronized with an average frequency of the modulation signal, that is, with the frequency of the carrier signal, is obtained while any other component than the maximum pull-in frequency range Δfomax is removed.

Here, when an injection signal is to be supplied to the reception side local oscillator 8404, it seems a possible idea to supply a received millimeter wave signal as an injection signal to the reception side local oscillator 8404 as in the case of the basic configuration 1 described hereinabove with reference to FIG. 7A. In this instance, presence of many frequency components of the modulation signal in the maximum pull-in frequency range Δfomax is not preferable, but it is preferable that fewer frequency components exist. The reason why the representation that it is preferable that fewer frequency components exist is based on the fact that, even if some frequency components exist, if the signal input level or frequency is adjusted, then injection locking is possible. In short, since also frequency components unnecessary for injection locking may possibly be supplied to the reception side local oscillator 8404, it is concerned about that it is difficult to establish injection locking. However, if the transmission side modulates a modulation subject signal after it suppresses low-frequency components of a modulation subject signal in advance by DC free encoding or the like so that no modulation signal component exists in the proximity of the carrier frequency, then the basic configuration 1 may be used.

Further, it seems a possible idea to provide a frequency separator 8401 such that a modulation signal and a reference carrier signal are frequency-separated from a received millimeter wave signal and supply the separated reference carrier signal component as an injection signal to the reception side local oscillator 8404 as in the case of the basic configuration 2 described hereinabove with reference to FIG. 5B. Since the injection signal is supplied after frequency components unnecessary for injection locking are suppressed in advance, injection locking can be established readily.

The basic configuration 3 shown in FIG. 7C corresponds to a configuration where the transmission side adopts the basic configuration 2 shown in FIG. 6B. In the basic configuration 3, a modulation signal and a reference carrier signal are received through different antennas 8236_1 and 8236_2, preferably by different millimeter wave signal transmission paths 9 so that interference may not occur. In the basic configuration 3 of the reception side, a reference carrier signal also whose amplitude is fixed can be supplied to the reception side local oscillator 8404, and therefore, the basic configuration 3 of the reception side is considered as an optimum system from the point of view of facilitation in establishment of injection locking.

The basic configuration 4 shown in FIG. 7D corresponds to a case wherein the transmission side adopts the basic configuration 4 described hereinabove with reference to FIG. 6D where the transmission side is configured so as to modulate the phase or the frequency. Although the basic configuration 4 of the reception side is similar in configuration to the basic configuration 1, the configuration of the demodulation functional unit 8400 actually is a demodulation circuit which is ready for phase modulation or frequency modulation such as an quadrature detection circuit.

A millimeter signal received by the antenna 8236 is supplied to the frequency mixer 8402 and the reception side local oscillator 8404 through a distributor or branching filter not shown. The reception side local oscillator 8404 outputs, since injection locking functions, a recovered carrier signal synchronized with the carrier signal used for the modulation on the transmission side.

Here, whether or not injection locking can be established on the transmission side, that is, whether or not a recovered carrier signal synchronized with the carrier signal used for the modulation on the transmission side can be acquired, depends also upon the injection level, that is, upon the amplitude level of the reference carrier signal to be inputted to the oscillation circuit of the injection locking type, the modulation method, the data rate, the carrier frequency and so forth. Further, it is essential to reduce the number of injection-lockable components in the band from the modulation signal. To this end, the modulation signal is preferably converted into a DC-free code on the transmission side so that the center or average frequency of the modulation signal is substantially equal to the carrier frequency and the center or average phase is substantially equal to zero, that is, to the origin on the phase plane.

For example, P. Edmonson et al., "Injection Locking Techniques for a 1-GHz Digital Receiver Using Acoustic-Wave Devices," IEEE transactions on Ultrasonics, Ferroelectrics, and Frequency Control, Vol. 39, No. 5, September 1992, pp. 631-637 (hereinafter referred to as Reference Document D) discloses an example wherein a modulation signal itself modulated by the BPSK (Binary Phase Shift Keying) method is used as an injection signal. In the BPSK method, an injection signal to the reception side local oscillator 8404 undergoes a phase variation by 180 degrees in response to symbol time T of an input signal. In such a case, to establish injection locking by the reception side local oscillator 8404, where the maximum pull-in frequency range of the reception side local oscillator 8404 is represented by Δfomax, it is necessary for the symbol time T to satisfy T<1/(2Δfomax). Although this signifies that the symbol time T must be set short with a margin, that it is better for the symbol time T to be short in this manner signifies that it is better to raise the date rate, and this is convenient to an application which is directed to high speed data transfer.

Meanwhile, Tarar M. A.; Zhizhang Chen, "A Direct Down-Conversion Receiver for Coherent Extraction of Digital Baseband Signals Using the Injection Locked Oscillators," Radio and Wireless Symposium, 2008 IEEE, Volume, Issue, 22-24, January 2008, pp. 57-60 (hereinafter referred to as Reference Document E) discloses an example wherein a modulation signal itself modulated by the 8PSK (8-Phase Shift Keying) method is used as an injection signal. Also in the Reference Document E, it is described that, if the conditions of the injection voltage and the carrier frequency are same, then a higher data rate facilitates injection locking. This likewise is convenient to an application directed to high speed data transfer.

In any of the basic configurations 1 to 4, the lock range can be controlled by controlling the injection voltage Vi or the free-running oscillation frequency fo based on the expression (A). In other words, it is essential to adjust the injection voltage Vi or the free-running oscillation frequency fo so that injection locking can be established. For example, an injection locking controller 8440 is provided at the succeeding stage to the frequency mixer 8402, in the example shown in FIGS. 7A to 7D, at the succeeding stage to the DC component suppressor 8407, such that the state of injection locking is decided based on a synchronous detection signal, which is a baseband signal, acquired by the frequency mixer 8402 and a component of the subject of adjustment is controlled based on a result of the decision so that injection locking can be established.

Thereupon, one or both of techniques including a technique of coping with the control on the reception side and a technique of coping with the control on the transmission side by supplying information necessary for the control, which includes not only the control information but also detection signals from which the control information is derived and so forth, to the transmission side. The technique of coping with the control on the reception side has a difficult point in terms of the power consumption and the interference resisting property because, if a millimeter signal, particularly a reference carrier signal component thereof, is not transmitted with a certain degree of strength, then injection locking cannot be established on the reception side. However, the technique is advantageous in that only the reception side can cope with the control.

In contrast, although the technique of coping with the control on the transmission side requires transmission of information from the reception side to the transmission side, it has such advantages that a millimeter wave signal can be transmitted with the lowest power with which injection locking can be established on the reception side and the power consumption can be reduced and that the interference resisting property is improved.

Where the injection locking method is applied to signal transmission within a housing or to signal transmission between different apparatus, the following advantages can be achieved. For the transmission side local oscillator 8304, the required specification for the stability of the frequency of a carrier signal to be used for modulation can be moderated. As apparent from the expression (A) given hereinabove, it is necessary for the reception side local oscillator 8404 on the side on which injection locking is carried out to have such a low Q value that the reception side local oscillator 8404 can follow up a frequency variation on the transmission side.

This is convenient where the entire reception side local oscillator 8404 including a tank circuit which has an inductance component and a capacitance component is formed on a CMOS device. While the reception side local oscillator 8404 on the reception side may have a low Q value, this similarly applies also to the transmission side local oscillator 8304 on the transmission side. In particular, the transmission side local oscillator 8304 may have low frequency stability and a low Q value.

It is estimated that refinement of CMOS devices further advances in the future and the operation frequency of them further increases. In order to implement a small-sized transmission system in a higher frequency band, it is demanded to use a high carrier frequency. Since the injection locking method of the present example can moderate required specifications for the oscillation frequency stability, a carrier signal of a higher frequency can be used readily.

That the frequency stability may be low, or in other words, that the Q value may be low although the frequency is high, signifies that, in order to implement a carrier signal whose frequency is high and also whose stability is high, it is not necessary to use a frequency multiplication circuit of high stability, a PLL circuit for carrier synchronization or a like circuit. Thus, even if the frequency is higher, a communication function can be implemented simply and readily with a small circuit scale.

Since the reception side local oscillator 8404 acquires a recovered carrier signal synchronized with the carrier signal used on the transmission side and supplies the recovered carrier signal to the frequency mixer 8402 to carry out synchronous detection, a band-pass filter for wavelength selection need not be provided at the preceding stage to the frequency mixer 8402. The selection operation of a reception frequency is in fact to carry out control to cause the local oscillation circuits for transmission and reception to be fully synchronized with each other, that is, to make it possible to establish injection locking. Therefore, selection of a reception frequency is easy. Where a millimeter waveband signal is used, also the time required for injection locking may be shorter than that where a lower frequency is used. Thus, a selection operation of a reception frequency can be completed in short time.

Since the local oscillation circuits for transmission and reception are fully synchronized with each other, a variation component of the carrier frequency on the transmission side is cancelled, and consequently, various modulation methods such as phase modulation can be applied readily. For example, in digital modulation, phase modulation such as QPSK (Quadrature Phase Shift Keying) modulation and 16QAM (Quadrature Amplitude Modulation) modulation is known widely. The phase modulation methods involve quadrature modulation between a baseband signal and a carrier. In the quadrature modulation, input data are converted into baseband signals of the I phase and the Q phase, to which quadrature modulation is applied. In particular, carrier signals on the I axis and the Q axis are modulated individually with an I phase signal and a Q phase signal, respectively. Injection locking can be applied not only to such 8PSK modulation as disclosed in the Reference Document E but also to such quadrature modulation methods as QPSK or 16QAM, and a modulation signal can be converted into quadrature signals to raise the data transmission rate.

If the injection locking is applied, then where synchronous detection is used together, the influence of the problem of interference is less likely to be had even where a plurality of transmission and reception pairs carry out independent transmission at the same time as in a case wherein multi-channel transmission or full duplex bidirectional transmission is to be carried out even if a band-pass filter for wavelength selection is not used on the reception side.

[Relationship Between Injection Signal and Oscillation Output Signal]

FIG. 8 illustrates a phase relationship of signals in injection locking. In particular, FIG. 8 illustrates a basic phase relationship where an injection signal (here a reference carrier signal) is in phase with a carrier signal used for the modulation.

The reception side local oscillator 8404 can operate in two modes including an injection locking mode and an amplifier mode. Where the injection locking method is adopted, the injection locking mode is adopted as a basic operation mode, but in a special case, the amplifier mode is used. The special case is a case wherein, where a reference carrier signal is used as the injection signal, the carrier signal used for the modulation and the reference carrier signal have different phases from each other (typically have phases quadrature to each other).

When the reception side local oscillator 8404 operates in the injection locking mode while it is in a free-running state and is outputting a free-running oscillation output signal Vo, a received reference carrier signal Sinj and an oscillation output signal Vout outputted from the reception side local oscillator 8404 by injection locking have a phase difference therebetween. In order for the frequency mixer 8402 to orthogonally detect the reference carrier signal Sinj, it is necessary to correct the phase difference. As can be seen from FIG. 8, the phase shift amount by which the phase amplitude adjuster 8406 carries out phase adjustment so that the oscillation output signal Vout of the reception side local oscillator

8404 may be brought into an in-phase state with a modulation signal SI is "θ−φ" as seen from FIG. 8.

In other words, the phase amplitude adjuster 8406 should carry out phase shifting so that the phase difference "θ−φ" between the phase of the oscillation output signal Vout of the reception side local oscillator 8404 when the reception side local oscillator 8404 operates in the injection locking mode and the phase of the oscillation output signal Vout when the reference carrier signal Sinj is used for injection locking of the reception side local oscillator 8404 may be canceled. Incidentally, the phase difference between the reference carrier signal Sinj to the reception side local oscillator 8404 and the free-running oscillation output signal Vo of the reception side local oscillator 8404 is θ, and the phase difference between the oscillation output signal Vout of the reception side local oscillator 8404 and the free-running oscillation output signal Vo of the reception side local oscillator 8404 when injection locking is applied is φ.

<Relationship Between Multi-Channel Transmission and Space Division Multiplexing>

FIGS. 9A to 10D illustrate a relationship between multi-channel transmission and space division multiplexing and a basic principle of an interference countermeasure. In particular, FIGS. 9A to 9D illustrate a relationship between multi-channel transmission and space division multiplexing. Meanwhile, FIGS. 10A to 10D illustrate a basic mechanism for achieving moderation of an interference countermeasure in the relationship between multi-channel transmission and space division multiplexing.

Figure 9A:
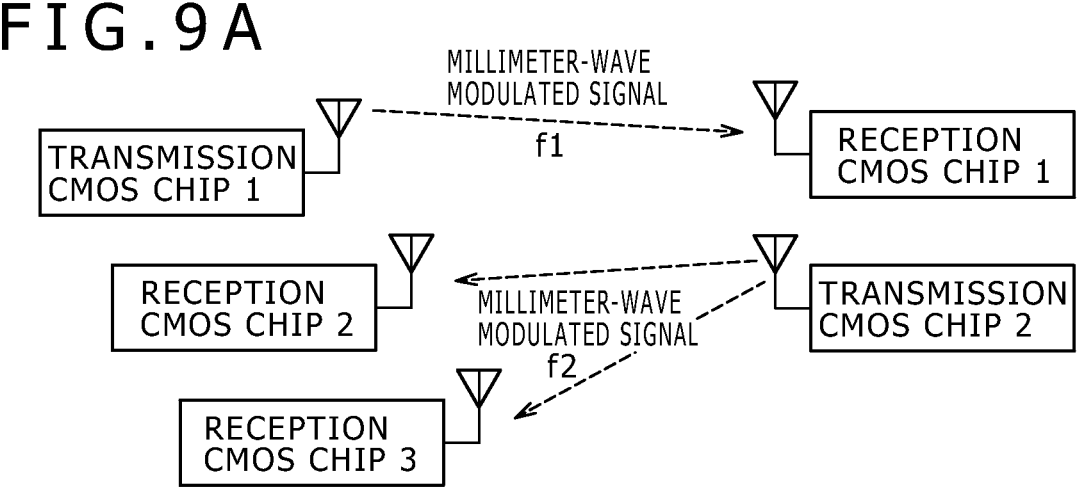
FIGS. 9A to 9D are diagrammatic views illustrating a relationship between multi-channeling and space division multiplexing.

As one of techniques for achieving multi-channel transmission, it seems a possible idea to apply space division multiplexing as described hereinabove with reference to FIGS. 1 to 4F. However, also it seems a possible idea, as shown in FIG. 9A, to use different carrier frequencies between communication transmission and reception pairs. That is, multi-channel transmission can be implemented by a frequency division multiplexing.

Also full duplex bidirectional transmission can be implemented readily if different carrier frequencies are used, and also it is possible to implement a situation in which a plurality of semiconductor chips (such as a set of the transmission-side signal generating unit 110 and the reception-side signal generating unit 220 and a set of the transmission side signal generation unit 210 and the reception-side signal generating unit 120) communicate independently with each other within a housing of an electronic apparatus.

[Problems]

Figure 9B:
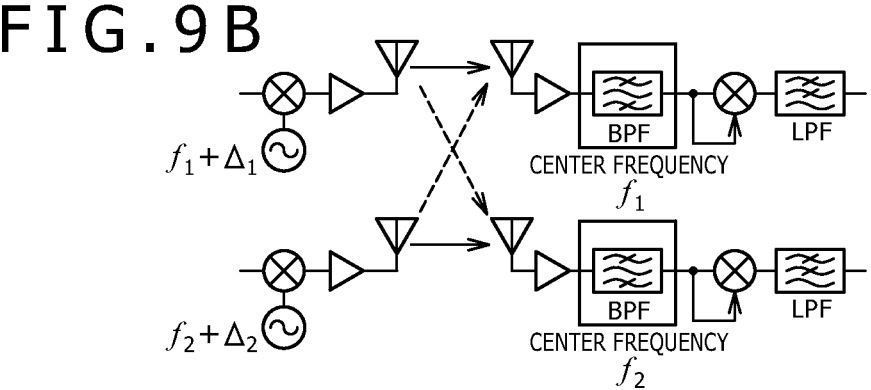
Figure 9C:
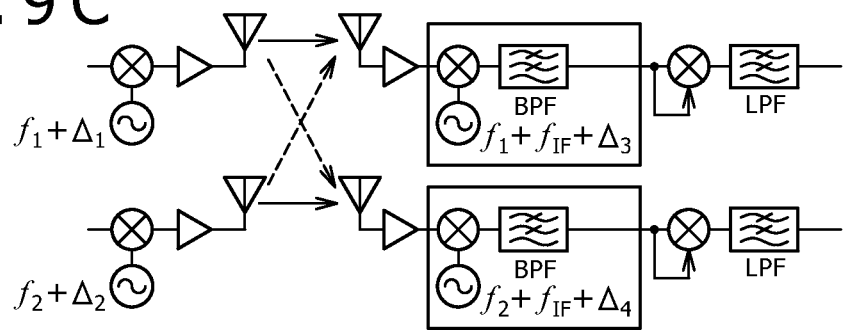
Figure 9D:
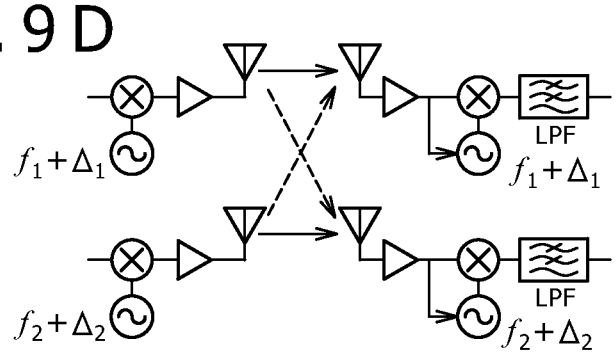

Here, it is assumed that two transmission and reception pairs are communicating simultaneously with and independently of each other as seen in FIGS. 9B to 9D. In FIGS. 9B to 9D, Δ1, Δ2, Δ3 and Δ4 denote frequency components which fluctuate in time.

Here, if a square detection method is applied as seen in FIG. 9B, a band-pass filter (BPF) for the frequency selection on the reception side is required in order to achieve multi-channel transmission in the frequency multiplexing method as described hereinabove. However, it is not easy to implement a steep band-pass filter in a small size, and a variable band-pass filter is required in order to change the selected frequency. Since the square detection method can extract only amplitude information, the applicable modulation method is restricted to ASK, OOK and so forth, and also it is difficult to render a modulation signal to be in quadrature to raise the data transmission rate.

Where a PLL for carrier synchronization is not provided on the reception side for miniaturization, for example, it seems a possible idea to apply down conversion into an intermediate frequency (IF) to carry out square detection as seen in FIG. 9C. In this instance, a signal to be received can be selected without a band-pass filter of the RF band by additionally providing a block for the frequency conversion into a sufficiently high intermediate frequency. However, this requires a circuit for the frequency conversion into the IF band, a band-pass filter for the IF band and so forth, and the circuitry is completed by those circuits. Not only the frequency variation component Δ on the transmission side but also a frequency component (a frequency variation component Δ) which varies in time in the down conversion on the reception side, has an influence. Therefore, only a modulation method which extracts amplitude information (such as, for example, ASK or OOK) can be applied so that the influence of the frequency variation component Δ can be ignored.

In contrast, if the injection locking method is applied as seen in FIG. 9D, then since the transmission side local oscillator 8304 and the reception side local oscillator 8404 are synchronized fully with each other, various modulation methods can be implemented readily. Also a PLL for carrier synchronization is unnecessary and the circuit scale may be small, and also selection of a reception frequency is facilitated. In addition, since an oscillation circuit for a millimeter waveband can be implemented using a tank circuit having a time constant lower than that where a lower frequency is applied, also the time required for injection locking can be made shorter than that where a lower frequency is applied. Thus, the oscillation circuit for a millimeter waveband can be suited to a high transmission. In this manner, by applying the injection locking method, the transmission speed can be raised readily and the number of input/output terminals can be reduced in comparison with those of ordinary signal transmission between chips by a baseband signal. Also it is possible to configure a small antenna for a millimeter wave on a chip, and furthermore, it is possible to provide a very high degree of freedom to the method of extraction of a signal from a chip. Furthermore, since the frequency variation component Δ on the transmission side is canceled by injection locking, various modulation methods such as phase modulation (such as, for example, quadrature modulation) can be applied.

Also where multi-channel transmission by frequency division multiplexing is implemented, if the reception side recovers a signal synchronized with a carrier signal used for the modulation on the transmission side and carries out frequency conversion by synchronous detection, then even if the carrier signal suffers from a frequency variation A, the transmission signal can be recovered without being influenced by the frequency variation Δ (that is, by interference). As seen from FIG. 9D, a band-pass filter as a frequency selection filter does not have to be placed at the preceding stage to the frequency conversion circuits (down converters).

However, if a multi-channel configuration is adopted based on frequency division multiplexing in this manner, then as can be recognized from the description of frequency multiplexing given hereinabove with reference to FIGS. 2A to 2E, there is the necessity to assure a considerably great use band for the entire millimeter wave signal transmission path 9. This makes a problem to a transmission path whose bandwidth is limited like the dielectric transmission path 9A although the free space transmission path 9B can satisfy this requirement.

Meanwhile, the space division multiplexing can be applied readily to wireless communication within an apparatus or between different apparatus, and since the same carrier frequency can be used among different channels, there is an advantage that the restriction to the transmission bandwidth is eliminated. However, with the space division multiplexing, such an interference countermeasure as described hereinabove with reference to FIGS. 4A to 4F is required. For example, with such a free space transmission path 9B as described hereinabove with reference to FIG. 4A, it is essential to assure a sufficient distance between transmission (reception) antennas. However, this signifies that there is a restriction to the distance between channels, and makes a problem where there is the necessity to dispose a large number of antenna pairs (transmission channels) within a limited space.

As another technique for an interference countermeasure, it seems a possible idea to adopt such a structure as to prevent propagation of radio waves between the transmission (reception) antennas as shown, for example, in FIG. 4B. Alto it seems a possible idea to adopt such a confining structure as the dielectric transmission path 9A or the hollow waveguide 9L as described hereinabove with reference to FIGS. 4C to 4F to reduce the distance between channels. However, those techniques have a difficult point that a higher cost is required than that of the free space transmission path 9B.

[Principle of the Countermeasure Against the Problems]

Therefore, the wireless transmission system 1 of the present embodiment is proposed as a system which can moderate the degree of the requirement for an interference countermeasure even where the millimeter wave signal transmission path 9 is formed as the free space transmission path 9B in order to implement multiplexing transmission by space division multiplexing. "To moderate the degree of the requirement for an interference countermeasure" signifies that it is made possible to reduce the distance between channels without the millimeter wave blocking body MX or that the interference countermeasure can be moderated.

A basic concept is to make it possible to reduce the distance between channels by providing the MIMO processors 603 and 604 on the reception side to take an interference countermeasure from the aspect of baseband signal processing.

The MIMO processors 603 and 604 are an example of transmission characteristic correction units which carry out correction calculation based on a transmission characteristic of the millimeter wave signal transmission path 9 (transmission space) between the antenna 136 and the antenna 236 (reception antennas) for each of a plurality of transmission-subject signals corresponding to the plural antennas 136 (transmission antennas). The transmission characteristic is represented by a channel matrix, and as the correction calculation, inverse matrix calculation is carried out for the transmission-subject signals of the channels.

The significance of the correction calculation (inverse matrix calculation) is to make it possible to acquire a transmission-subject signal from which an influence of a transmission characteristic is eliminated as a processed signal by correcting a transmission characteristic of a demodulation signal. Where the modulation methods for the channels are same as each other, demodulation components based on unnecessary waves received by the antennas 236 are canceled fully. Where the modulation methods for the channels are different from each other, although components of unnecessary waves are not cancelled fully, an influence of the unnecessary wave components can be prevented by treatment of a demodulation process.

Here, the MIMO process of the MIMO processors 603 and 604 in the present embodiment is characterized in that it is a MIMO process which is intended only for direct waves between transmission and reception of each antenna. This is much different from an ordinary MIMO process for wireless transmission which may be carried out between different apparatus or within a housing in that the ordinary MIMO process becomes a signal process which handles a plurality of reception signals. This is because, as a countermeasure for multipath transmission that a radio wave transmitted from the transmission side is reflected or diffracted by parts, walls and so forth in a housing and consequently the same radio wave arrives at the reception side from a plurality of different routes, one reception antenna handles a plurality of reception signals including also reflection waves transmitted along different routes which are different from a route along which a direct wave emitted from the same transmission antenna is transmitted.

This is because, where a millimeter wave or (microwave) having a comparatively short wavelength is used in wireless signal transmission within an apparatus or between different apparatus, it is possible to substantially eliminate an obstacle to the wireless transmission in a space in which the millimeter wave signal transmission path 9 to which the space division multiplexing is applied is formed, and in this instance, there is little necessity to take an influence of reflected waves into consideration.

If a radio wave from a plurality of paths is received on the reception side in a multipath environment, then since the paths are different in distance therebetween, the time required for the radio wave from the transmission side to arrive at the reception side differs between the different paths. Therefore, a plurality of radio waves having phases displaced from each other are received by the reception side. As a result, the waveform of the reception signal is distorted, resulting in the possibility that the signal may not be received. As a countermeasure against this, it seems a possible idea to apply a MIMO process. In this instance, also an approach to the channel matrix becomes conforming to the multipath countermeasure.

However, the MIMO process in the present embodiment is different from such a MIMO process for a multipath countermeasure as just described, and also the approach to the channel matrix is different from that for a multipath countermeasure.

However, although it is easy to solve an inverse matrix to a channel matrix in an environment in which reflected waves exist abundantly, there is the possibility that it may be difficult to obtain an inverse matrix to a channel matrix in a real environment in which direct waves only exist without reflected waves. In the present embodiment, the antenna arrangement is restricted so as to prevent it from becoming difficult to obtain an inverse matrix to a channel matrix.

Thereupon, although details are hereinafter described, in the present embodiment, the antenna arrangement (the distance between the antennas on the transmission side and the reception side) is set to a predetermined distance so that the number of multipliers (components of amplifiers) and adders required in a MIMO process can be reduced, and the MIMO process on the reception side is set in conformity with the setting. In other words, the antenna arrangement is determined so that the number of MIMO processes can be reduced, and MIMO processing on the reception side is carried out only for direct waves in conformity with the antenna arrangement.

The relationships described have an influence on whether or not quadrature detection is required in the demodulation functional unit 8400. If quadrature detection is not required, then the demodulation functional unit 8400 can be simplified in configuration.

Anyway, by applying MIMO processing to the reception side, the demand for an interference countermeasure where the free space transmission path 9B is applied is moderated. Further, by commonly using a carrier frequency among different channels, it is made possible to carry out MIMO processing in a baseband on the reception side, and by restricting the antenna arrangement, the MIMO processing amount (inverse matrix calculation amount) is reduced.

While, in embodiments hereinafter described, a carrier frequency common to each channel is used, this is not essential, but at least it is necessary for the carrier frequencies of each channel to be in a mutually synchronized relationship. A basic approach to the space division multiplexing normally is to make carrier frequencies in different channels common (or equal) to each other. If a common frequency is applied to carrier signals on the transmission side, then since the influence of the carrier frequency is equal among each channel with certainty, MIMO processing in the baseband region can be carried out efficiently with certainty. Where the carrier frequencies are different among the different channels, such a countermeasure as to provide a demodulator or a frequency selection filter corresponding to each carrier frequency for each channel is required on the reception side, resulting in increase of the system scale. In those regards, use of a common carrier frequency among each channel exhibits significant advantages.

The MIMO process generally requires complex number processing (or corresponding processing) and increases the circuit scale. In contrast, by restricting the antenna arrangement paying attention to the fact that only direct waves are determined as a subject of processing and carrying out signal processing in conformity with the antenna arrangement, the MIMO calculation amount (inverse matrix calculation amount) can be reduced.

Where the configuration of the first example is adopted, since the reception side has a one-chip configuration, it is not essential for the demodulation functional unit 8400 in the reception-side signal generating unit 220 to include the reception side local oscillators 8404 for the individual channel, and this is convenient to application of a mechanism similar to that in the case of a countermeasure for reduction of the number of injection locking circuits hereinafter described. In particular, the reception side local oscillator 8404 is provided only for one channel, and in the other channels, a recovered carrier signal generated by the reception side local oscillator 8404 is used to carry out frequency conversion (demodulation and synchronization detection).

Figure 10A:
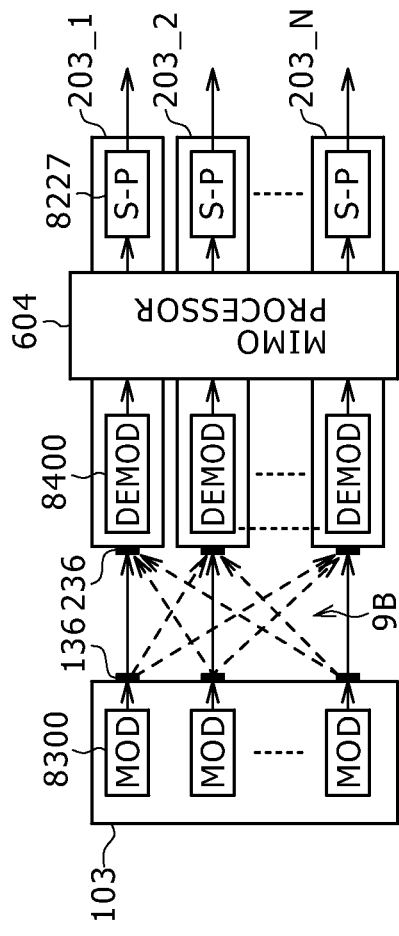
FIGS. 10A to 10D are block diagrams illustrating a basic mechanism for achieving moderation of an interference countermeasure in the relationship between multi-channeling and space division multiplexing.

While, in the first example shown in FIG. 10A, the reception side has a one-chip configuration for the N channels while the transmission side has a configuration wherein the semiconductor chip 103 which accommodates the modulation functional unit 8300 (MOD) therein is used for each of the channels. Thus, the first example shown in FIG. 10A has an N:1 configuration. However, this is not an essential requirement where the MIMO processing is applied to the reception side.

Figure 10B:
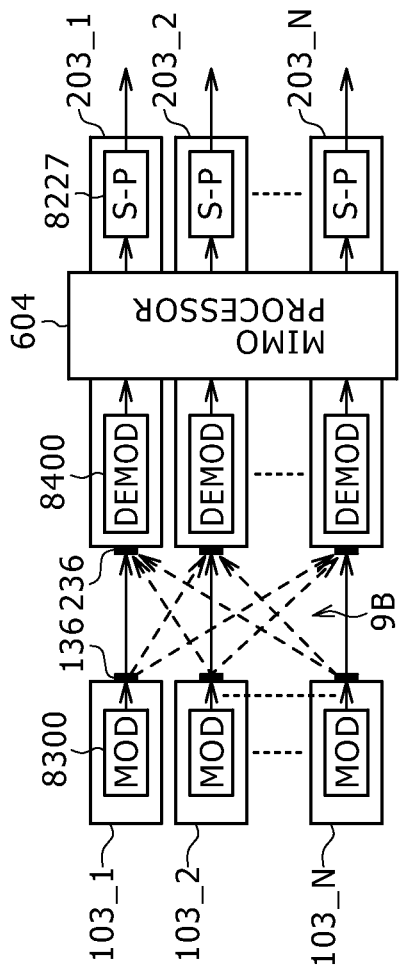

For example, a second example shown in FIG. 10B has a 1:1 configuration wherein the reception side has a one-chip configuration and also the transmission side has a one-chip configuration. Where the configuration of the second example is adopted, since the transmission side has a one-chip configuration, it is not essential for the modulation functional unit 8300 in the transmission-side signal generating unit 110 to include the transmission side local oscillator 8304 for each of the channels. This is convenient to application of a mechanism similar to that in the case of a reduction countermeasure of the number of injection locking circuits hereinafter described. In particular, the transmission side local oscillator 8304 should be provided for only one channel, and in the remaining channels, a carrier signal itself generated by the transmission side local oscillator 8304 should be used to carry out frequency conversion (modulation).

Figure 10C:
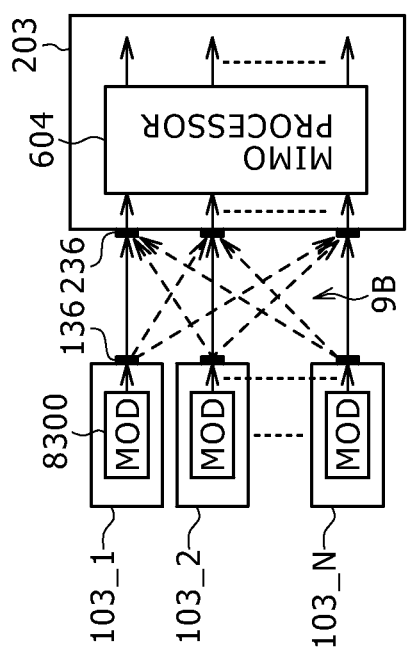
Figure 10D:
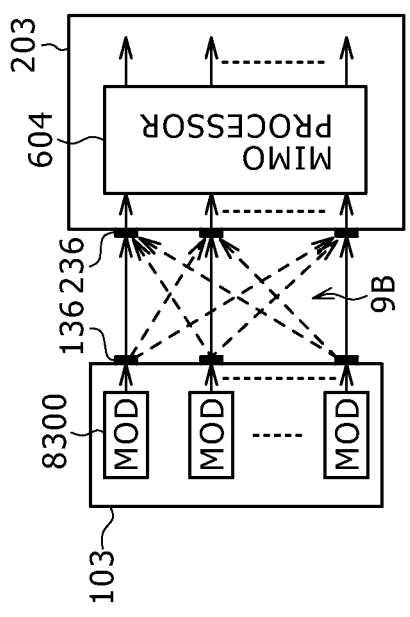

A third example shown in FIG. 10C had a 1:N configuration wherein the transmission side has a one-chip configuration and the reception side has a configuration which uses a chip for each of the channels. A fourth example shown in FIG. 10D has an N:N configuration wherein the transmission side uses a chip for each of the channels and also the reception side uses a chip for each of the channels. In the third or fourth example, the MIMO processor 604 used commonly by all of the channels is provided between the demodulation functional units 8400 (DEMOD) of the individual channels and the serial-parallel converter 8227.

<Relationship Between Multi-Channel Transmission and Injection Locking>

Figure 11A:
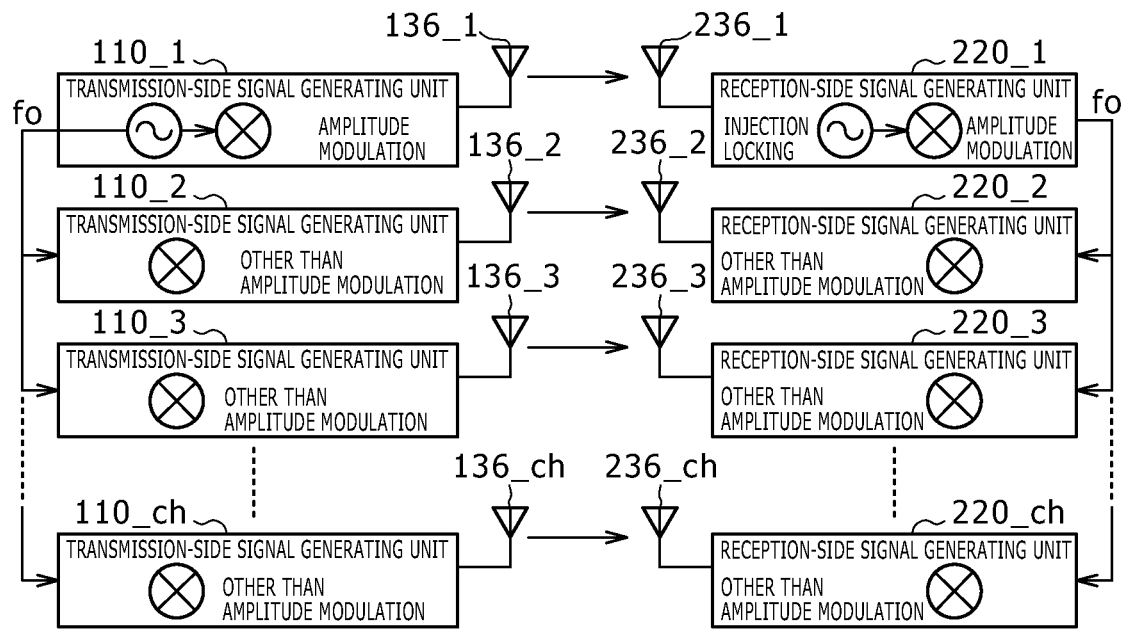
FIGS. 11A and 11B are block diagrams illustrating a basic mechanism for achieving reduction of the circuit scale in the relationship between multi-channeling and space division multiplexing.
Figure 11B:
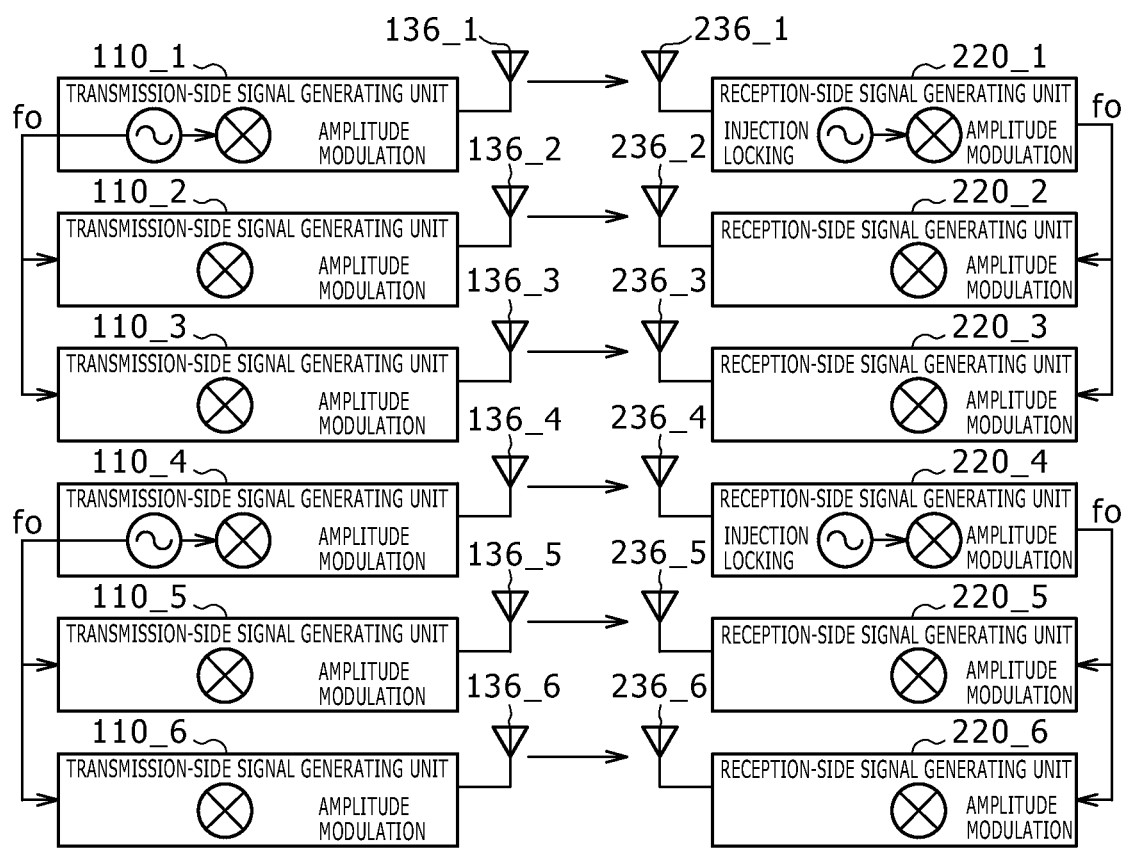

FIGS. 11A and 11B illustrate a basic mechanism for achieving circuit scale reduction in a relationship between multi-channel transmission and injection locking.

When it is intended to implement multiplexing transmission (multi-channel transmission) as a further problem, there is a difficult point that, for example, when the injection locking method is adopted to achieve multi-channel transmission, if no countermeasure is taken, then the reception side must prepare an injection locking circuit for each of the channels.

Therefore, in the wireless transmission system 1 of the present embodiment, together with application of the MIMO process, also it is taken into consideration that, where the reception side includes a plurality of channels preferably where the injection locking method is adopted, the channel should have no trouble even if an injection locking circuit is not prepared for each channel. As a basic approach to the technique just described, in order to achieve reduction of the number of injection locking circuits on the reception side, not all of the channels adopt the injection locking method but at least one channel does not adopt the injection locking method as seen in FIG. 11A. In each channel which does not adopt the injection locking method, carrier signals generated by the local oscillators 8304 and 8404 and synchronized with the carrier signal are used to carry out modulation and demodulation (or carry out, on the reception side, synchronous detection).

Although the transmission-side signal generating units 110 on the transmission side have a one-chip configuration wherein they are accommodated in the same chip, this is not essential. Similarly, although the reception-side signal generating units 220 on the reception side have a one-chip configuration wherein they are accommodated in the same chip, this is not essential either. However, where the wiring line length for the free-running oscillation frequency fo is considered, both of the transmission side and the reception side preferably have a one-chip configuration.

FIG. 11B shows a modification to the system shown in FIG. 11A. This modification is characterized in that, "although an injection locking circuit is not prepared for each of the channels of the reception side, the injection locking circuit is provided not for one channel but for a plurality of channels." In FIG. 11A, where the reception side includes a plurality of channels, only one channel is ready for injection locking, and in all of the other channels, synchronous detection is carried out for each channel based on a recovered carrier signal acquired by the injection locking by the one channel but it is not essential.

In short, only it is necessary for the number of channels for which an injection locking circuit is prepared to be smaller than the number of channels on the reception side, and the other channels for which the injection locking circuit is not prepared should be configured such that they carry out synchronous detection based on a recovered carrier signal acquired by the injection locking. In short, where the number of channels on the reception side is represented by P and the number of those channels for which an injection locking circuit is prepared is represented by Q, the system should be configured so as to satisfy a relationship of P>Q. Further, for the remaining "P−Q" channels, synchronous detection should be carried out based on a recovered carrier signal acquired by the injection locking. Also in this instance, the system is configured such that, "where the injection locking method is adopted, if the reception side has a plurality of channels, the injection locking circuit is not prepared for each channel."

For example, in the configuration shown in FIG. 11B, six channels are divided into two groups of 3 channels, and from among the first to third channels (from among channels having reference characters _1 to _3), only one channel (the channel of the reference character _1) is ready for injection locking. On the other hand, from among the fourth to sixth channels (from among channels having reference characters _4 to _6), only one channel (the channel of the reference character _4) is ready for injecting locking.

In the present example, preferably the transmission-side signal generating units 110 of the first to third channels have a one-chip configuration wherein they are accommodated in the same chip, and preferably the transmission-side signal generating units 110 of the fourth to sixth channels have a one-chip configuration wherein they are accommodated in the same chip. Also on the corresponding reception side, preferably the reception-side signal generating units 220 of the first to third channels have a one-chip configuration wherein they are accommodated in the same chip, and preferably the reception-side signal generating units 220 of the fourth to sixth channels have a one-chip configuration wherein they are accommodated in the same chip. Naturally, such configurations are not essential.

In order to make the number of channels which have an injection locking circuit smaller than the total number of channels to make the system configuration compact, it is an optimum configuration that only one of the channels has an injection locking circuit. However, where the wiring line length for a recovered carrier signal for carrying out injection locking based on a recovered carrier signal acquired by injection locking in another channel is taken into account, the configuration that only one channel has an injection locking circuit may not possibly be appropriate in terms of the layout. In such an instance, the configuration shown in FIG. 11B is effective.

<Relationship Between Multi-Channel Transmission and Required Transmission Power>

Figure 12A:
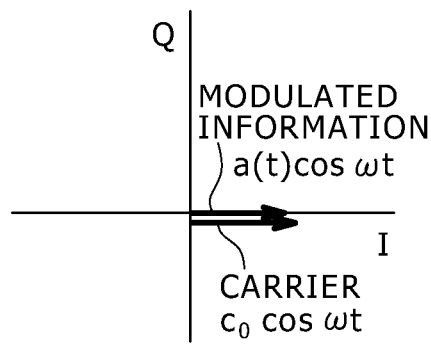
FIGS. 12A to 12E are diagrammatic views illustrating an amplitude modulation signal where both of a carrier signal and a reference carrier signal in the ASK method have a same frequency and a same phase.
Figure 12E:
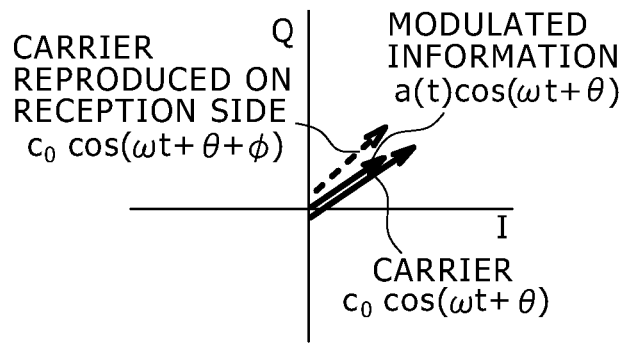
Figure 12B:
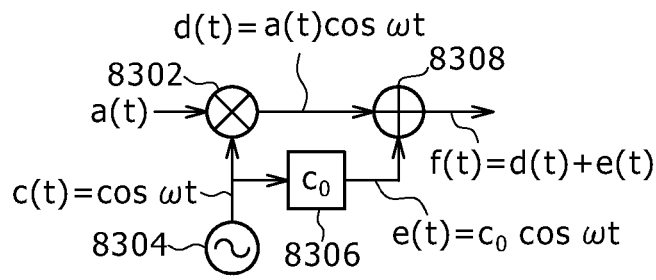
Figure 12C:
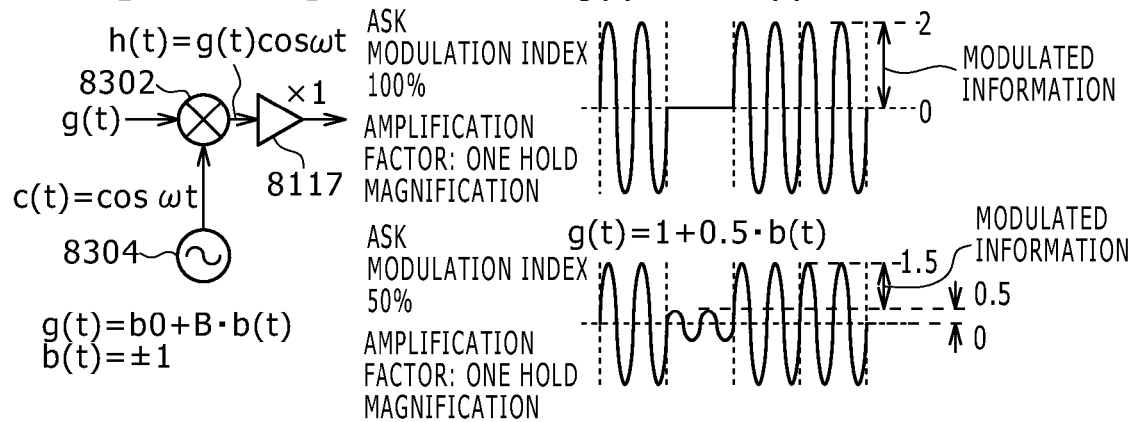
Figure 12D:
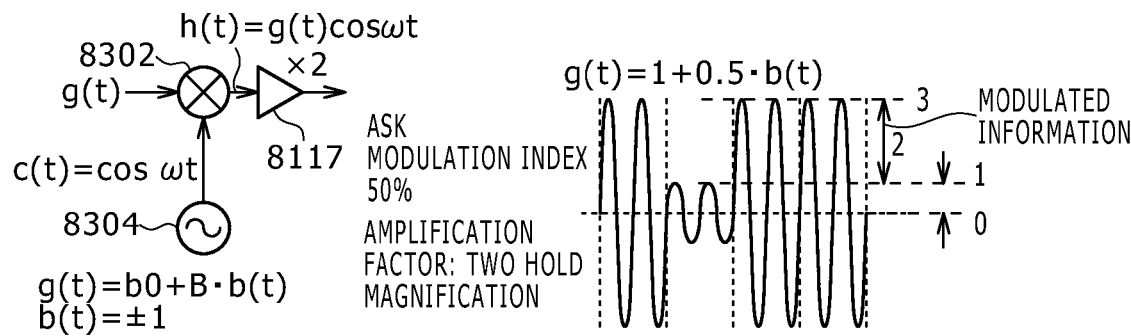
Figure 13A:
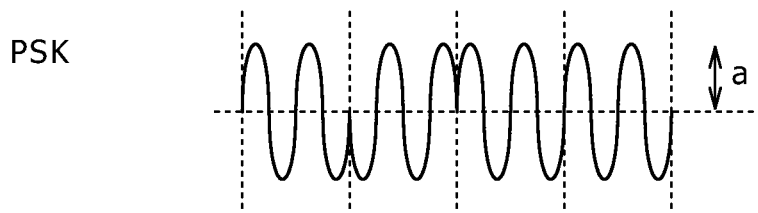
FIGS. 13A to 13C are diagrammatic views illustrating a relationship in transmission power between the ASK method and the PSK method.
Figure 13B:
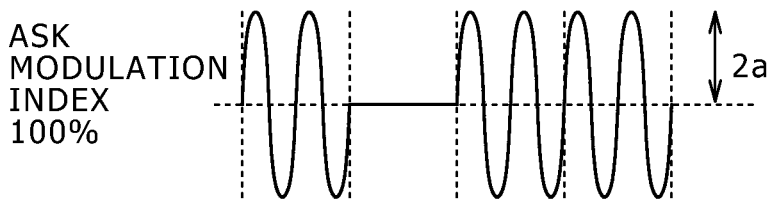
Figure 13C:
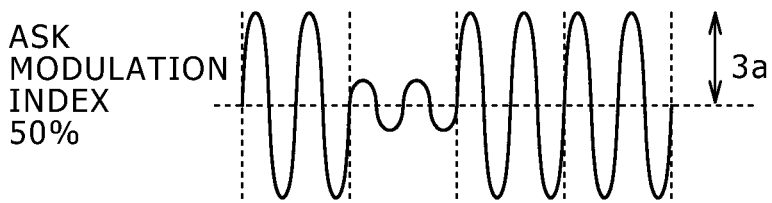
Figure 14A:
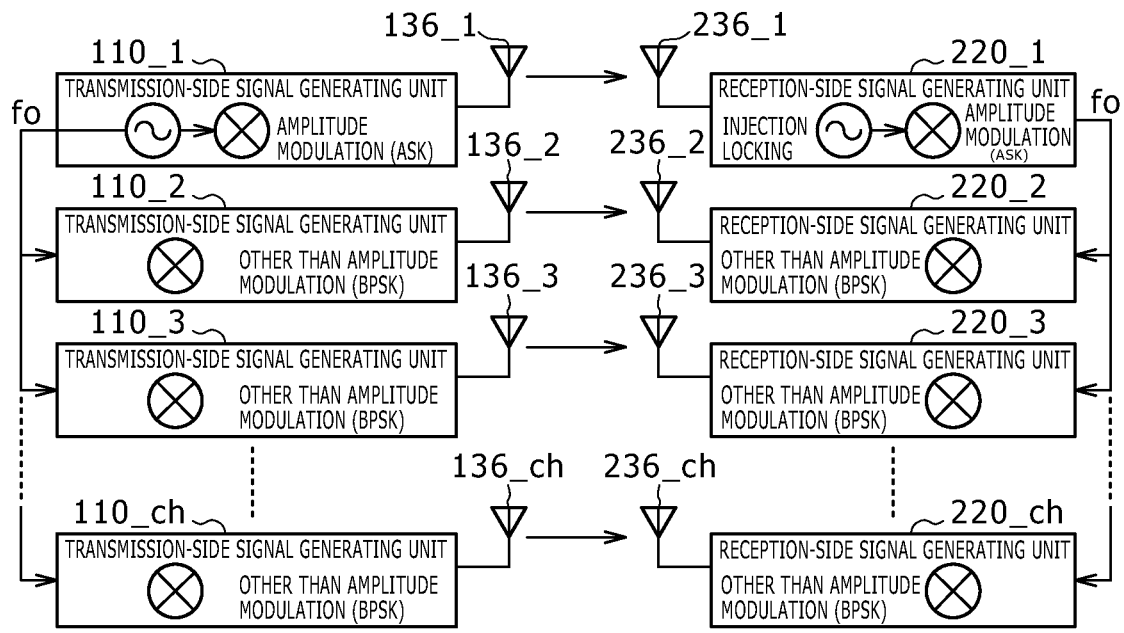
FIGS. 14A and 14B are block diagrams showing a basic mechanism for achieving reduction of the transmission power where duplex transmission is carried out.
Figure 14B:
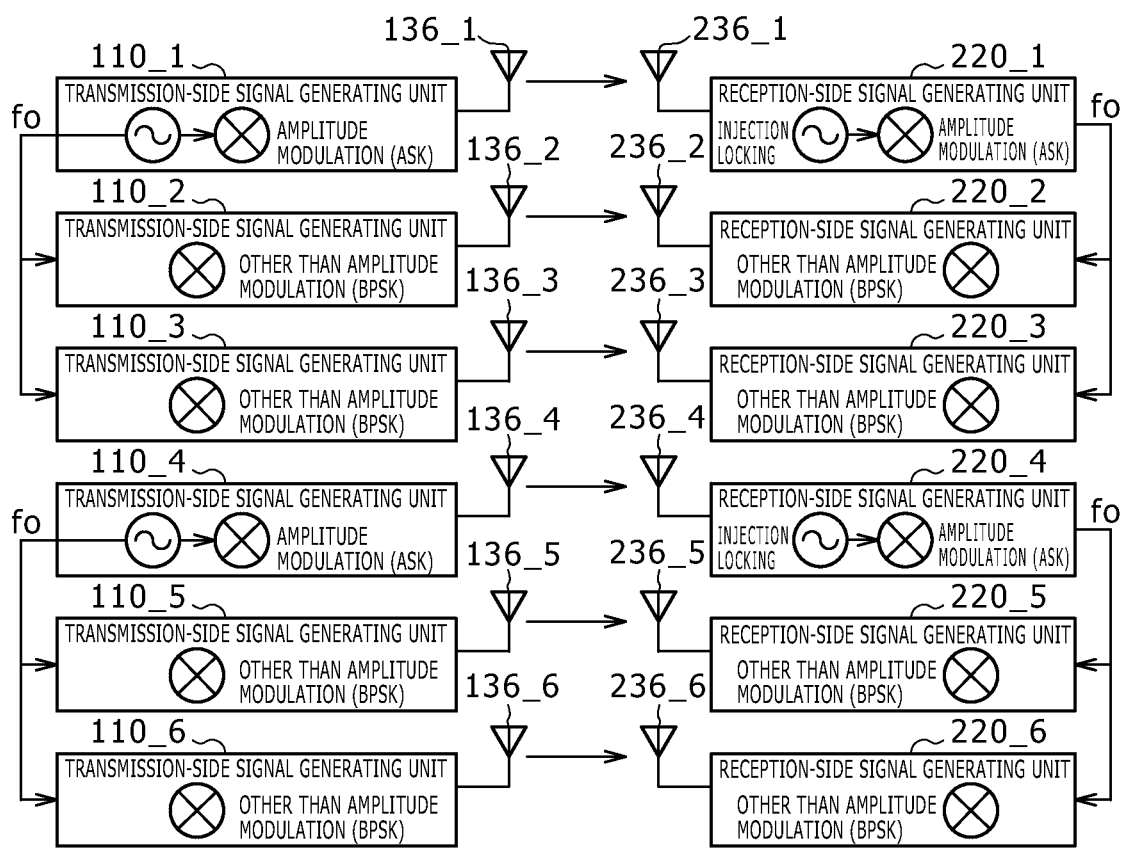

FIGS. 12A to 14B illustrate a relationship between multi-channel transmission and required transmission power. In particular, FIGS. 12A to 12E illustrate an amplitude modulation signal where a carrier signal and a reference carrier signal have the same frequency and the same phase in the ASK method. FIGS. 13A to 13C illustrates a relationship in transmission power between the ASK method and the PSK method. FIGS. 14A and 14B illustrate a basic mechanism for achieving transmission power reduction where multiplexing transmission is carried out.

Where it is attempted to implement multiplexing transmission (multi-channel transmission), there is a yet further problem of increase of the required transmission power. For example, as can be recognized from the foregoing description regarding injection locking, injection locking is effective to wireless signal transmission within an apparatus or between difference apparatus. Further, where the injection locking method is adopted, a method of modulating the amplitude like the ASK method is suitable as the modulation method from a point of view of easiness in establishment on the reception side. For example, if the ASK method is used for injection locking, then there are such advantages that the configuration of the reception circuit is simplified in that a filter is not required and that the reception characteristic is less likely to be degraded. However, the method of modulating the amplitude (which includes the ASK method) exhibits higher transmission power than the other modulation methods. This is described below with reference to FIGS. 12A to 14B.

[Amplitude Modulation Signal]

With the ASK method, the amplitude of a carrier signal is modulated with a transmission-subject signal. It should be considered that one of an I-phase signal and a Q-phase signal is used on a phase plane represented by an I axis and a Q axis and the signal amplitude of a modulation signal is given within a range from 0 to +F. Modulation with two values of 0 and +F is the simplest modulation, and where the modulation degree is 100%, the modulation becomes the OOK. It is considered that normalization of "F" becomes "1," and ASK of binary values is implemented.

Here, a case is examined wherein a signal having a same frequency and a same phase as those of a carrier signal used for the modulation is used as a reference carrier signal. For example, as shown in FIG. 12A, when it is intended to transmit information placed on the I axis, also the reference carrier signal is placed in the same phase (on the I axis).

Incidentally, where the phases of the carrier signal used for the modulation and the reference carrier signal are made the same phase, for example, the following technique can be adopted.

The first example shown in FIG. 12B is an example of a technique for applying the basic configuration 1 shown in FIG. 6A. To the frequency mixer 8302, a transmission-subject signal $a(t)$ and a transmission signal $c(t)=\cos\omega$ are supplied. The frequency mixer 8302 uses a balanced modulation circuit or a double balanced modulation circuit to carry out suppressed-carrier amplitude modulation to generate the carrier signal $d(t)=a(t)\cos\omega t$ and supplies the carrier signal $d(t)=a(t)\cos\omega t$ to the signal combining unit 8308. The transmission-subject signal $a(t)$ is a binary signal of 0 and +1. The reference carrier signal processor 8306 controls the amplitude of the carrier signal $c(t)=a(t)\cos\omega t$ outputted from the transmission side local oscillator 8304 to Co (within a range from 0 to 1) to generate a reference carrier signal $e(t)=Co\cos\omega t$ and supplies the reference carrier signal $e(t)$ to the signal combining unit 8308. The signal combining unit 8308 carries out signal combination of $d(t)+e(t)$ to generate a transmission signal $f(t)$. $Co=0$ is equivalent to 100% modulation.

A second example shown in FIG. 12C and a third example shown in FIG. 12D are examples of a technique of applying the basic configuration 3 shown in FIG. 6C. The frequency mixer 8302 has a circuit configuration wherein suppressed-carrier amplitude modulation is not applied and carries out amplitude modulation with a signal $g(t)$ obtained by adding a DC component $b0$ to a transmission-subject signal $b(t)$ to generate a signal $h(t)=g(t)\cos\omega t$. The transmission-subject signal $b(t)$ can assume two values of −1 and +1.

As regards the modulation degree (percentage modulation), two approaches are available including an approach that it is handled with a value $Ma=Vs/Vc$ where $Vc$ is the amplitude of the carrier signal and $Vs$ is the amplitude of the transmission-subject signal and another approach that it is handled with a value $M=(x-y)/(x+y)$ where $x$ and $y$ are a maximum value and a minimum value, respectively, of a result of the amplitude modulation (amplitude modulation wave). In the present specification, the former is adopted, and therefore, the amplitude B of the transmission-subject signal b(t) corresponds to the modulation degree (percentage modulation).

Here, in the second example shown in FIG. 12C, while the DC component b0 is fixed to 1, the modulation degree B is controlled within the range from 0 to 1 to adjust the amplitude of the reference carrier signal (the amplitude within a period within which b(t)=−1). The amplification factor adjusted by the amplifier 8117 is one fold.

The third example shown in FIG. 12D is a case wherein, in regard to the state in 50% modulation in the second example shown in FIG. 12C, the amplification factor is adjusted by the amplifier 8117 to obtain signal quality same as that upon 100% modulation. In the second example, the difference between the amplitude within a period of b(t)=−1 and the amplitude within a period of b(t)=+1 is modulation information, and upon 100% modulation, the modulation information is 2.0, but upon 50% modulation, the modulation information is 1.0. Therefore, if no countermeasure is taken, then the signal quality upon 50% modulation deteriorates from that upon 100% modulation. In order to improve the signal quality upon 50% modulation to a level same as that upon 100% modulation, the amplification factor should be increased to twice by the amplifier 8117. In this instance, the amplitude within the period of b(t)=−1 becomes 1.0, and the amplitude within the period of b(t)=+1 becomes 3.0.

It is to be noted that, even where the amplification factor of the amplifier 8117 in the second example or the third example is one fold, the waveform state of the third example shown in FIG. 12D can be generated also by controlling the modulation degree B to "1" and controlling the DC component b0 within the range from 1 to 2 (in this instance, to "2,") to adjust the amplitude of the reference carrier signal (that is, the amplitude within the period within which b(t)=−1). In this mode, according to the manner of handling of the modulation degree described hereinabove, it can be regarded that the modulation degree is 100%.

In all of the first to third examples, when it is tried to transmit information placed only on one axis, also the reference carrier signal has the same phase, that is, the I axis. In this example, as can be recognized from FIG. 12E, a DC offset component appears on the reception side.

For example, if it is assumed that the I axis represents a real number component and the Q axis represents an imaginary number component and, in the first example, the amplitude of the transmission-subject signal a(t) varies between 0 and +1, then a reception signal point comes to 0 and +1 on the I axis. If also the reference carrier wave is placed on the I axis, then the signal point becomes "0+Co" and "+1+Co." Consequently, a DC component corresponding to +Co is placed.

If, in the second example or the third example, the transmission-subject signal b(t) assumes −1 and +1, then the reception signal point comes to −1 and +1 on the I axis. If also the reference carrier wave is placed on the I axis similarly, then the signal point comes to "−1+Co" and "+1+Co." Consequently, a DC component corresponding to +Co is placed. This is an approach wherein, where the BPSK is applied, also the modulation-subject signal is modulated after it is worked by signal processing in advance so that also the reference carrier wave is placed on the I axis in order to make the BPSK equivalent to the ASK.

In order to solve this problem, it seems a possible idea to provide the DC component suppressor 8407 for suppressing a DC offset component on the reception side. However, this idea is disadvantageous in that the dispersion differs among different apparatus and individual adjustment in accordance with the magnitude of the DC offset is required and that such suppression of a DC offset component is influenced by a temperature drift.

As a method of solving this problem without providing the DC component suppressor 8407 on the reception side, it seems a possible idea to place a reference carrier signal on a phase axis different from the phase axis on which transmission information is placed, that is, different from the phase axis of the modulation signal, preferably on a phase spaced apart most.

For example, in the case of the ASK mode wherein transmission information is placed only on one of the I axis and the Q axis, it seems a possible idea to make, on the transmission side, the reference carrier signal and the modulation information orthogonal to each other. In other words, in place of carrying out biaxial modulation of an I phase signal and a Q phase signal, only one of the I axis and the Q axis is used for signal transmission while the other remains in a non-modulated state and the non-modulated signal is used as the reference carrier signal.

The relationship between the transmission information or modulation information and the reference carrier signal and between the I axis and the Q axis described above may be reversed. For example, on the transmission side, the transmission information is placed on the I axis side while the reference carrier signal is placed on the Q axis side. On the contrary, the transmission information may be set to the Q axis side while the reference carrier signal is set to the I axis side.

[Transmission Power]

On the other hand, the method of modulating the amplitude irrespective of whichever relationship the modulation axis of a signal and the axis of the reference carrier signal have has a difficult point that the transmission power is higher than that of any other modulation method. Where it is intended to achieve multi-channel transmission or multiplexing transmission, increase of the required transmission power appears conspicuously. Thus, a solution to this problem is demanded.

For example, FIGS. 13A to 13C illustrate examples of modulation signals of the ASK method (100% modulation and 50% modulation) and the BPSK method, and a relationship of the required transmission power.

Where the amplitude of the BPSK is represented by a, the transmission power necessary to obtain the same signal point distance (same ber) is represented by the expression (B-1) as seen in FIG. 13A. In contrast, in order to obtain signal quality same as that by the BPSK, according to the ASK method (100% modulation), the maximum amplitude is 2 a and the required transmission power is represented by the expression (B-2) as seen in FIG. 13B. Accordingly, in the ASK method (100% modulation), transmission power as high as two times that of the BPSK method is required.

Similarly, in the ASK method (50% modulation), the carrier wave amount becomes a where the maximum amplitude is 3 a, and the required transmission power is represented by the expression (B-3) as seen in FIG. 13C. Accordingly, in the ASK method (50% modulation), transmission power as high as five times that of the BPSK method is required.

As can be recognized from this, in order to obtain the same signal quality, the ASK requires higher transmission power than the BPSK method irrespective of the modulation degree. This makes a more significant problem as the number of channels for multiplexing transmission increases.

If all signals are transmitted by multiplexing transmission by the ASK to increase the channel number, then the difference in required transmission power increases in comparison with that in an alternative case wherein all signals are transmitted by multiplexing transmission by the BPSK to increase the number of channels. Particularly if the modulation rate is low, then the power difference appears conspicuously.

While comparison between the ASK (100% and 50%) and the BPSK is made here, in a relationship not only with the BPSK but also with any other PSK such as QPSK or 8PSK or with an amplitude phase modulation method such as QAM, in order to achieve the same quality, the amplitude modulation such as the ASK requires high transmission power. In contrast, not only with a method which modulates the phase but also with a method which modulates the frequency, the method of modulating only the amplitude exhibits high transmission power.

Therefore, in the present embodiment, it is intended to achieve reduction of the required transmission power upon multiplexing transmission. According to simple supposition from the foregoing description, in order to obtain the same signal quality, since a method which modulates only the amplitude requires higher transmission power than that required by any other method than the method which modulates only the amplitude, it seems a first possible idea to use any other method than the method which modulates only the amplitude to form all channels. However, only in terms of the facilitation in establishment of injection locking, the method which modulates only the amplitude is more advantageous, and it is not preferable to use any other method than the method which modulates only the amplitude to form all channels.

Therefore, in the present embodiment, not all channels are formed using any other method than the method which modulates only the amplitude but the method which modulates only the amplitude and some other method are used in a mixed state and besides a method by which the transmission power may be lower than that by the method which modulates only the amplitude is adopted while the "same signal quality is obtained." As a criterion for the signal quality, a known criterion such as an error rate may be adopted.

As a method other than the method which modulates only the amplitude, a method which modulates only the phase, another method which modulates both of the amplitude and the phase, a further method which modulates only the frequency and so forth are available. However, from the point of view of simplicity and easiness in circuit configuration, the priority degree for adoption should be determined in the order of the method which modulates only the phase, the method which modulates both of the amplitude and the phase, and the method which modulates only the frequency. For example, when digital modulation is intended, it is preferable to adopt the PSK or the QAM.

For example, where the injection locking method is adopted, upon multiplexing transmission, a method which modulates only the amplitude and by which injection locking can be established readily, typically the ASK, is adopted for one channel, and for the other channels, any other modulation method than the method which modulates only the amplitude is adopted as seen in FIG. 14A. As a typical example, the ASK is used for transmission by one channel while the BPSK which requires low transmission power is used for transmission by the other channels. Consequently, where multiplexing transmission is carried out by space division multiplexing, frequency division multiplexing or the like, increase of the required transmission power can be suppressed while the injection locking method remains utilized.

Preferably, in order to achieve reduction of the number of injection locking circuits, injection locking is applied to one channel or to a number of channels smaller than the number of channels of the reception side while carrier signals synchronized with the injection locking are used to carry out modulation and demodulation. In this instance, in space division multiplexing, in an extreme case, the carrier signals may have the same frequency. Naturally, it is not essential to use a combination with a mechanism for achieving reduction of the number of injection locking circuits, but all channels of the reception side may individually adopt the injection locking method.

Incidentally, where it is intended only to reduce the required transmission power, it seems a possible idea to apply any other method than the method which modulates only the amplitude to all channels. However, where use together with the injection locking method is intended, the method which adopts only the amplitude should be applied to at least one channel because it can easily establish injection locking.

FIG. 14B illustrates a modification corresponding to FIG. 14A. This modification is characterized in that, upon multiplexing transmission, "although amplitude modulation is not applied to all channels, not one but a plurality of channels adopt amplitude modulation." While, in FIG. 14A, upon multiplexing transmission, only one channel adopts the amplitude modulation method and all of the remaining channels adopt any other than the amplitude modulation method, this is not essential.

In short, only it is necessary for the number of channels which adopt the amplitude modulation method to be smaller than the total number of channels upon multiplexing transmission, and those channels which do not adopt the amplitude modulation method may adopt a phase modulation method such as, for example, the PSK or an amplitude phase modulation method such as, for example, the QAM other than the amplitude modulation method. In particular, where the total number of channels is represented by S and the number of those channels which adopt the amplitude modulation method by T, a system configuration which satisfies the relationship of S>T should be adopted, and for the remaining "S–T" channels, any other modulation method than the amplitude modulation method should be adopted. Also in this instance, the system has the configuration wherein, "upon multiplexing transmission, not all channels adopt the amplitude modulation but some channel adopts a modulation method whose required transmission power is lower than that of the amplitude modulation method such as phase modulation or amplitude phase modulation."

For example, in the configuration shown in FIG. 14B, six channels are divided into two groups of 3 channels, and from among the first to third channels, that is, from among channels having reference characters _1 to _3, only one channel, that is, the channel of the reference character _1, is ready for the ASK method and injection locking. On the other hand, from among the fourth to sixth channels, that is, from among channels having reference characters _4 to _6, only one channel, that is, the channel of the reference character _4, is ready for the ASK method and injecting locking. The remaining channels which do not adopt the ASK method adopt the BPSK method which requires lower required transmission power than that of the ASK method.

In the present example, preferably the transmission-side signal generating units 110 of the first to third channels on the transmission side have a one-chip configuration wherein they are accommodated in the same chip, and preferably the transmission-side signal generating units 110 of the fourth to sixth channels have a one-chip configuration wherein they are accommodated in the same chip. Also on the corresponding reception side, preferably the reception-side signal generating units 220 of the first to third channels have a one-chip configuration wherein they are accommodated in the same chip, and preferably the reception-side signal generating units 220 of the fourth to sixth channels have a one-chip configuration wherein they are accommodated in the same chip. Naturally, such configurations are not essential.

In order to make the number of those channels which adopt an amplitude modulation method such as, for example, the ASK which requires high required transmission power smaller than the total number of channels to reduce the total required transmission power upon multiplexing transmission, it is an optimum configuration that only one of the channels has the amplitude modulation method. However, for example, where use together with the injection locking method is considered, if the wiring line length for a recovered carrier signal for carrying out simultaneous detection based on a recovered carrier signal acquired by injection locking in another channel is taken into account, the configuration that only one channel uses the ASK method and has an injection locking circuit may not possibly be appropriate in terms of the layout. In such a case, the configuration shown in FIG. 14B is effective.

In the following, the wireless transmission system 1 of the present embodiment which carries out a MIMO process is described particularly paying attention to the MIMO process. It is to be noted that, unless otherwise specified, unidirectional communication from the first communication device 100 to the second communication device 200 is described for simplified description. Further, it is assumed that the transmission system has a chip configuration as an optimum form wherein the first communication devices 100 of M channels each accommodating the modulation functional unit 8300 are accommodated in one semiconductor chip 103. Also the reception system has a chip configuration as an optimum form wherein all of the reception-side signal generating units 220 of M channels each accommodating the demodulation functional unit 8400 are accommodated in one semiconductor chip 203. In short, communication is carried out from the first communication device 100 which incorporates one semiconductor chip 103 which accommodates the transmission-side signal generating units 110 of M channels to the second communication device 200 which incorporates one semiconductor chip 203 which accommodates the reception-side signal generating units 220 of M channels.

<Outline of the MIMO Process Applied to Reception Side>

Figure 15A:
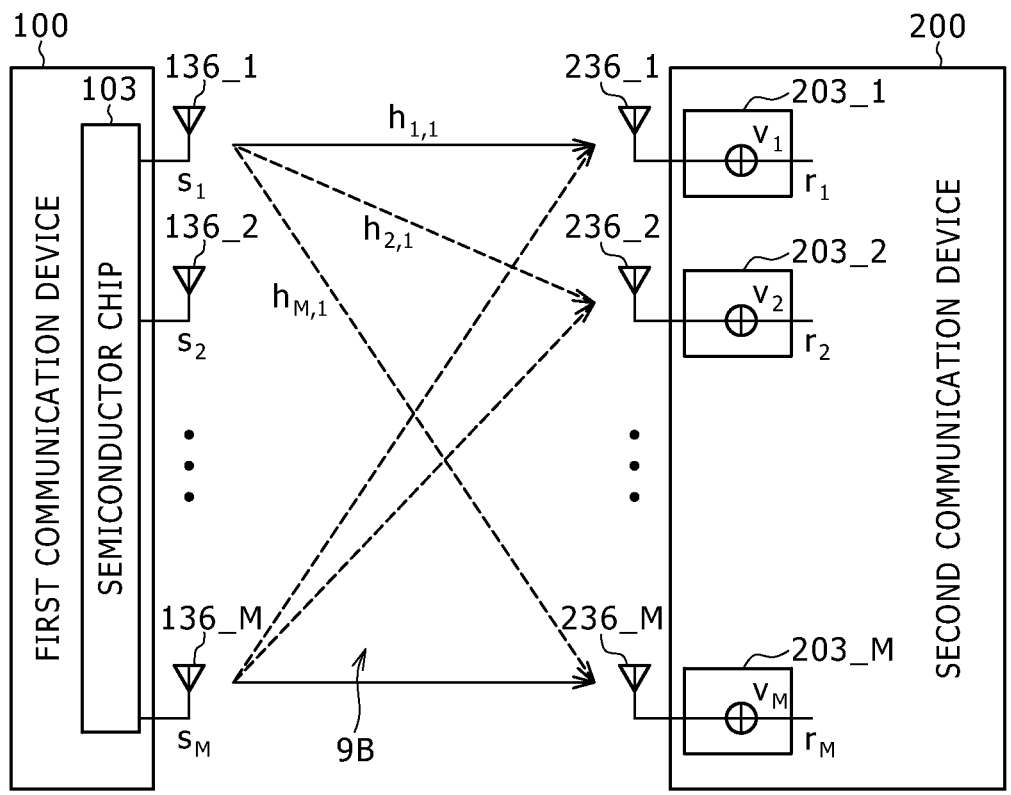
FIGS. 15A and 15B are diagrammatic views illustrating calculation of a MIMO process applied to the reception side.
Figure 15B:
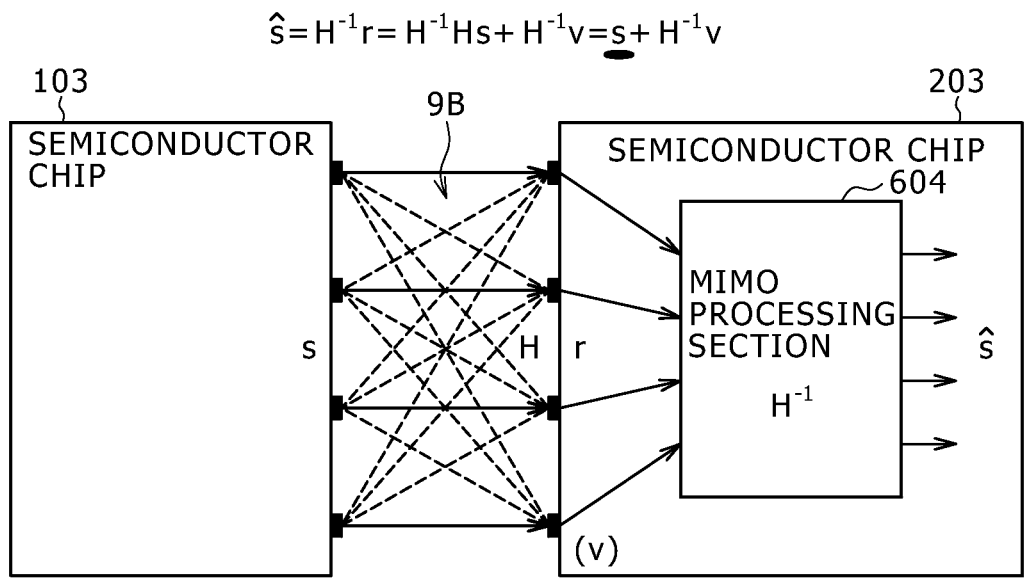
Figure 17A:
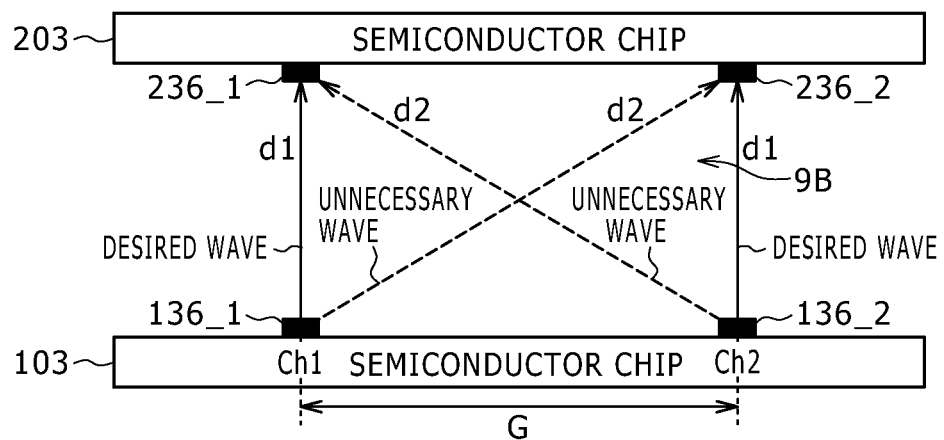
FIGS. 17A and 17B are a schematic view and a diagrammatic view, respectively, illustrating a basis of the MIMO process on the reception side where two channels are involved.
Figure 17B:
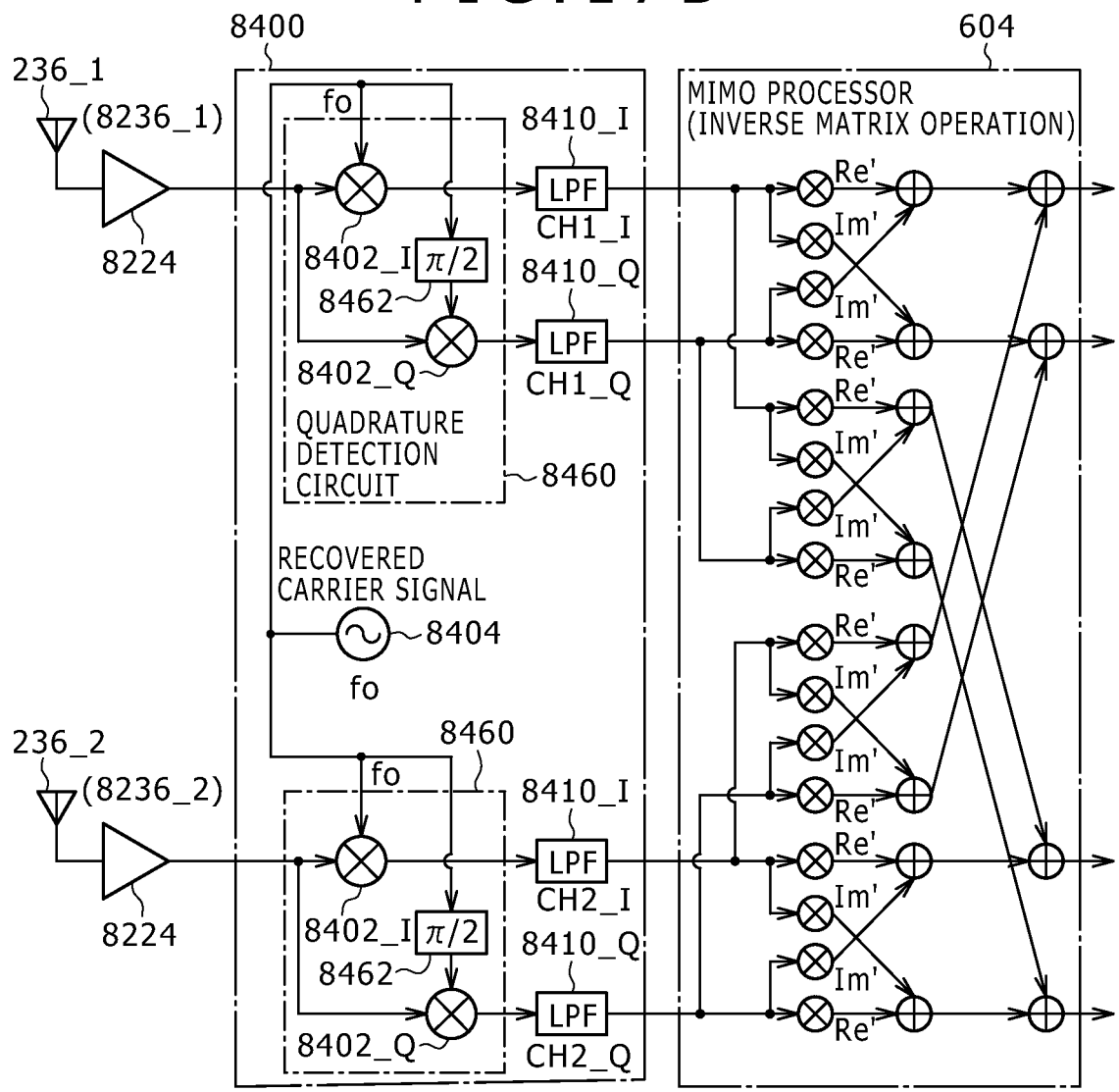
Figure 18A:
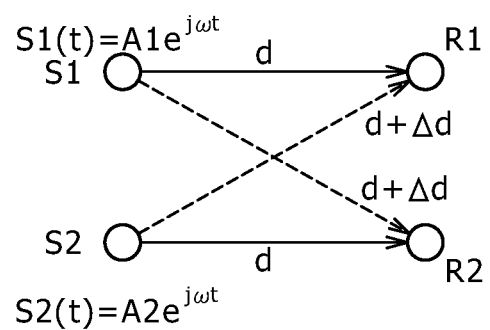
FIGS. 18A to 18C are diagrammatic views illustrating a relationship between a path difference and a channel matrix where two channels are involved.
Figure 18B:
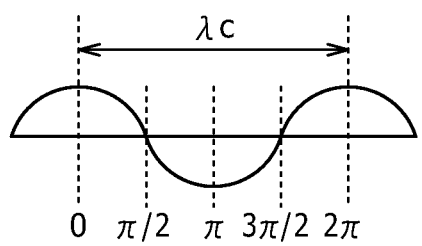
Figure 18C:
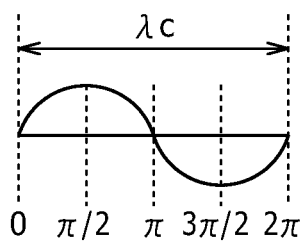
Figure 21:
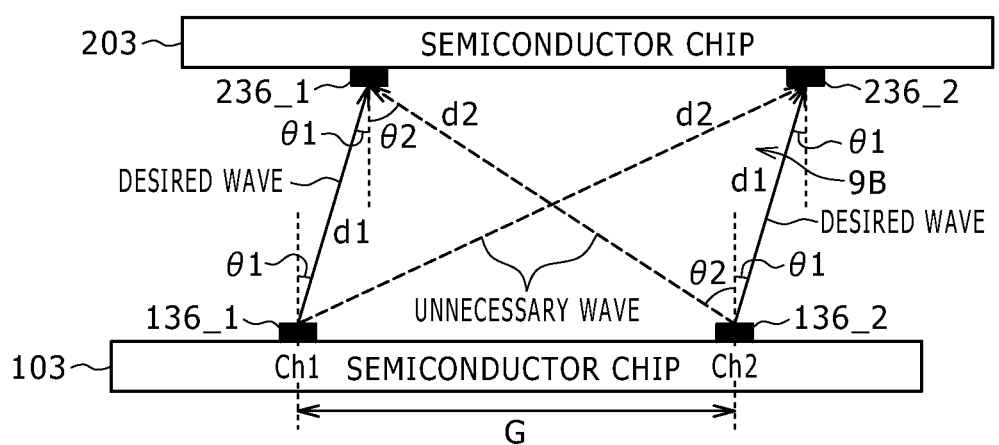
FIG. 21 is a schematic view illustrating an adjustment method of a path difference where an antenna has a phase characteristic which relies upon directivity.
Figure 22:
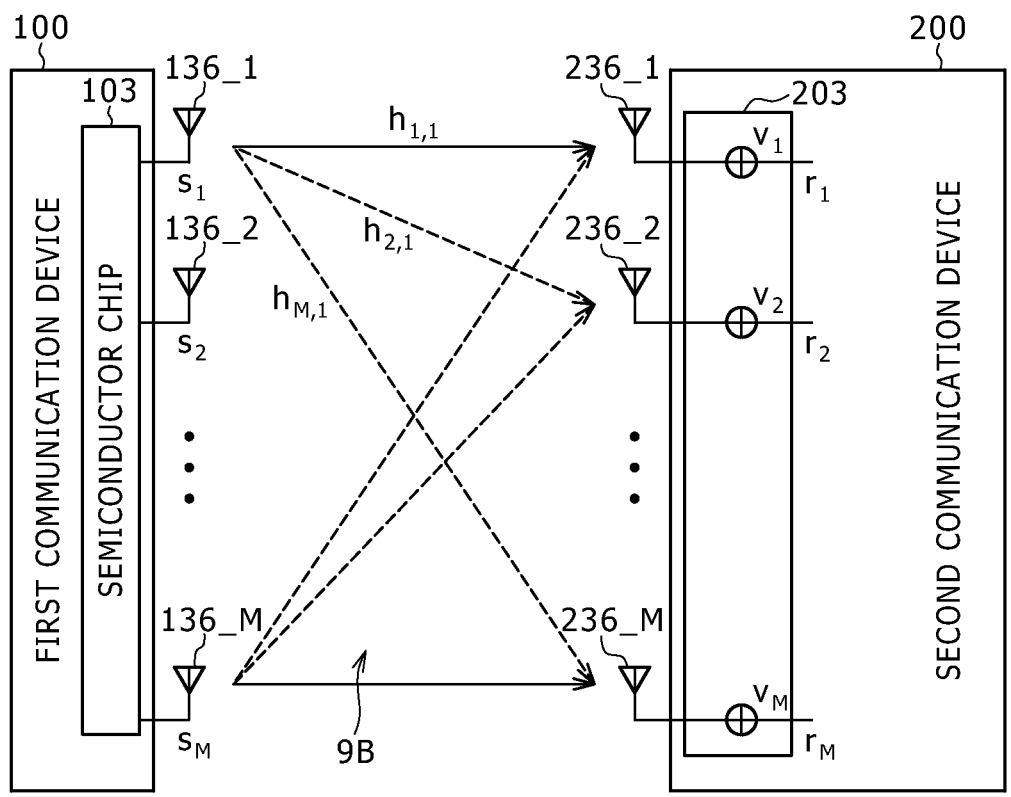
FIGS. 22 and 23 are diagrammatic views illustrating an application method of the MIMO process to a case wherein three or more antenna pairs are involved.
Figure 23:
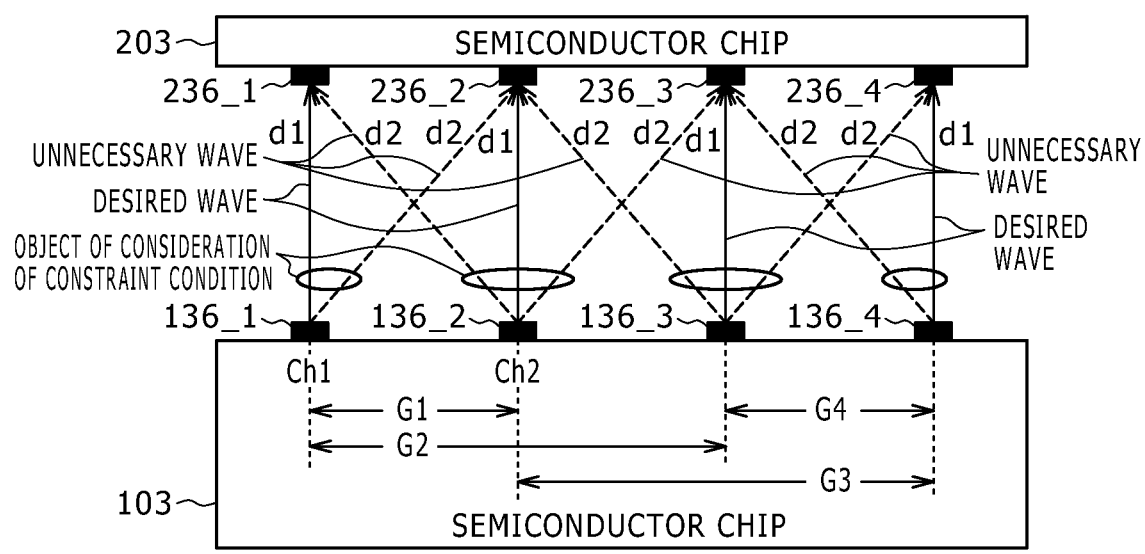
Figure 24A:
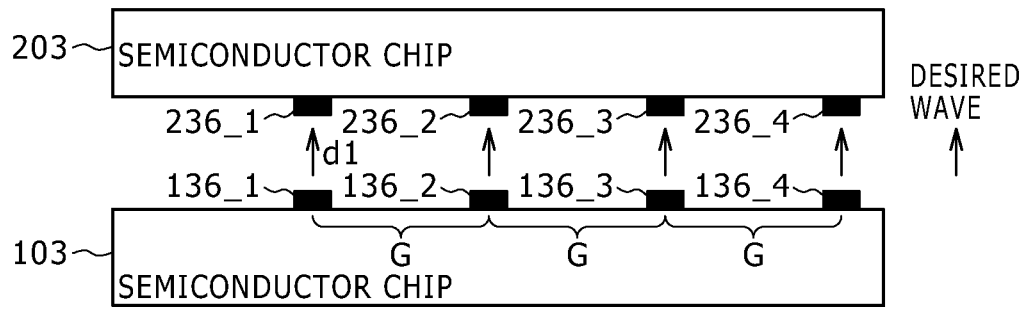
FIGS. 24A and 24B are schematic views illustrating an application method to a case wherein transmission and reception antennae are arranged three-dimensionally.
Figure 24B:
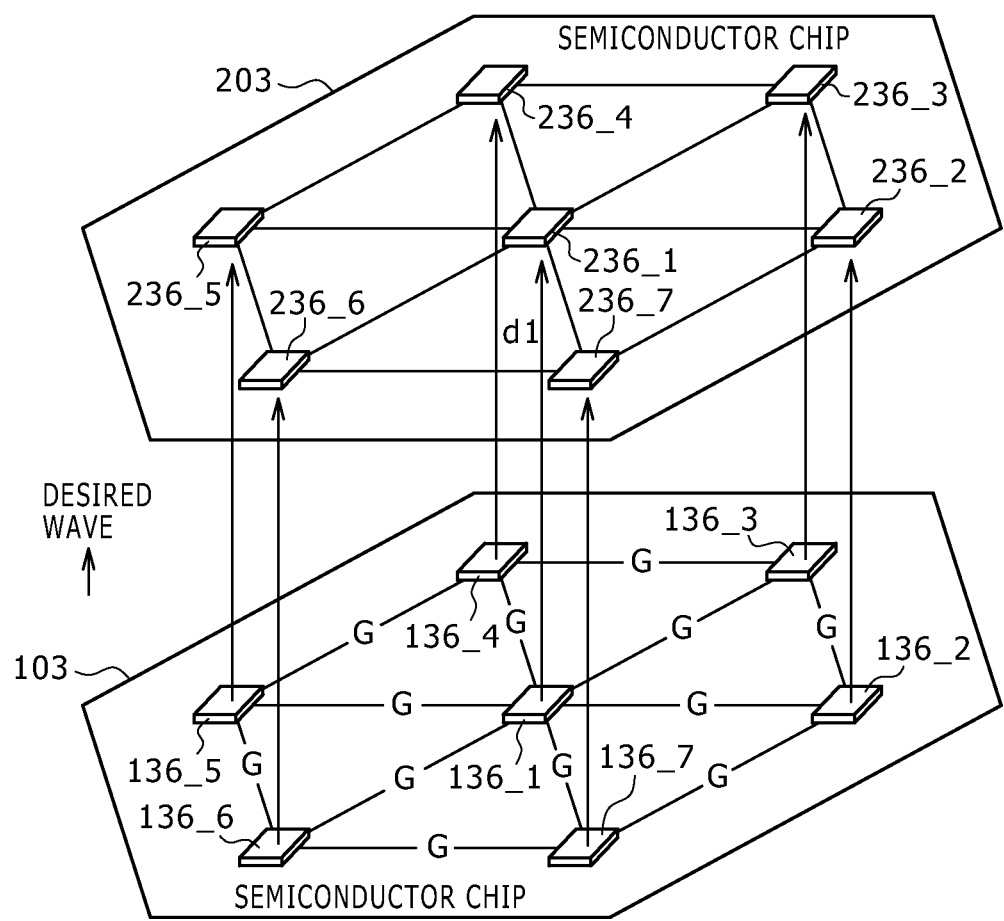
Figure 25A:
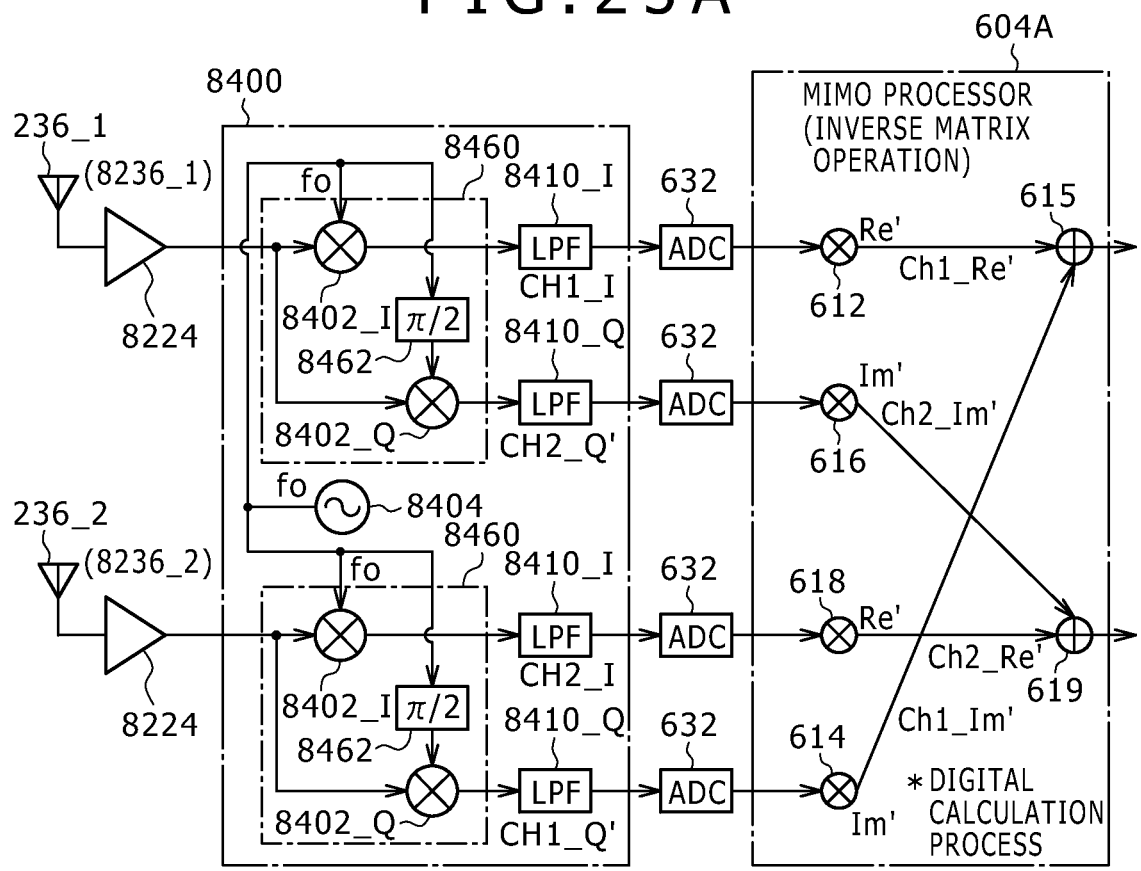
FIGS. 25A and 25B are block diagrams showing a basic configuration where the MIMO process on the reception side is carried out by digital processing.
Figure 25B:
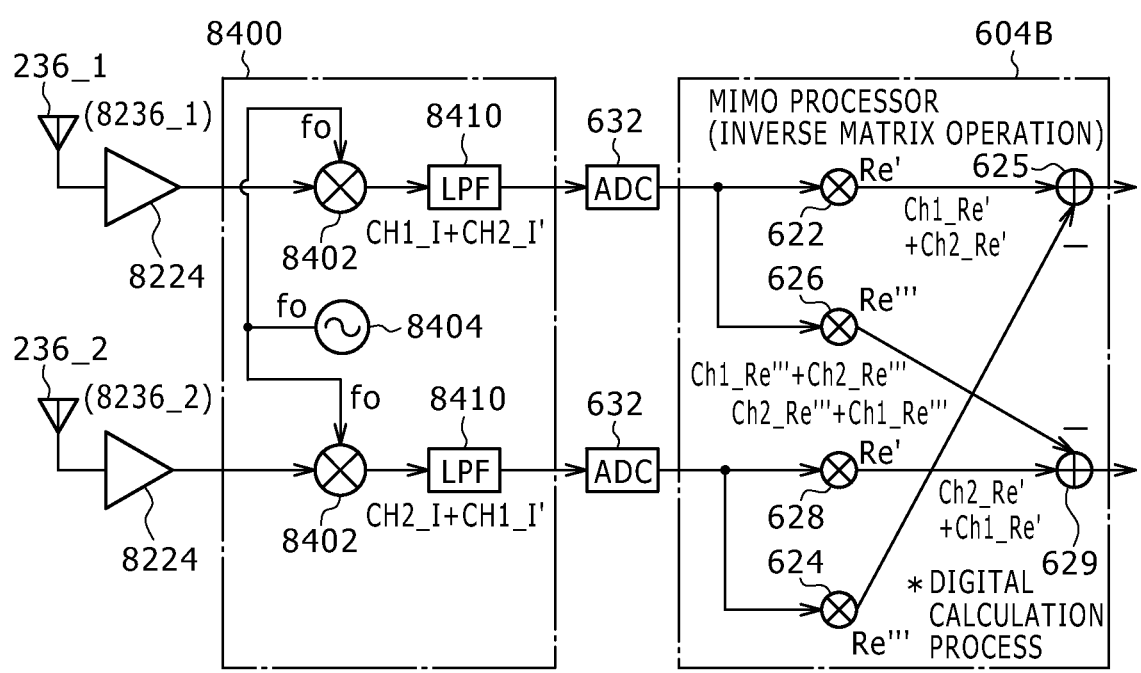

FIGS. 15A to 25B illustrate an outline of a MIMO process applied to the reception side. In particular, FIGS. 15A and 15B illustrate calculation of the MIMO process applied to the reception side. FIG. 16 illustrates a basis of a calculation technique of the MIMO process applied to the reception side. FIGS. 17A and 17B illustrate a basis of the MIMO process on the reception side where two channels are used. FIGS. 18A to 18C illustrate a relationship between a path difference and a channel matrix where two channels are used. FIGS. 19A to 19D and FIGS. 20A to 20D illustrate first and second examples of constraint conditions for antenna arrangement where two channels are used, respectively. FIG. 21 illustrates an adjustment or correction method of a path difference where an antenna has a phase characteristic which relies upon directivity. FIGS. 22 and 23 illustrate application techniques of the MIMO process where three or more antenna pairs are used. FIGS. 24A and 24B illustrate an application technique of the MIMO process to a case wherein antennas for transmission and reception are arranged three-dimensionally. FIGS. 25A and 25B illustrate basic configurations where a MIMO process on the reception side is carried out by digital processing.

[Calculation of the MIMO Process]

FIGS. 15A and 15B illustrate an approach to a calculation method of the MIMO process applied in the present embodiment. In FIGS. 15A and 15B, in order to use M transmission channels in space division multiplexing, M antennas 136 and 236 are used. From each of the antennas 136 on the transmission side, a millimeter wave signal is transmitted to the antennas 236 on the reception side which are disposed in an opposing relationship to the antennas 136.

Referring to FIGS. 15A and 15B, a solid line indicates a desired wave transmitted from the antenna 136_1 directly to the antenna 236_1 disposed in an opposing relationship to the antenna 136_1. Meanwhile, a broken line indicates an unnecessary wave or interference wave transmitted from the antenna 136_1 to another antenna 236_2 which is not disposed in an opposing relationship to the antenna 136_1. Both of the desired wave and the unnecessary wave are direct waves transmitted directly from the antenna 136_1 to the antennas 236_1 and 236_2, respectively.

Here, a channel matrix H applied to calculation of the MIMO process is represented by an expression (1-1) given below. In the channel matrix H of M rows and M columns, an element of i=j from among matrix elements hi,j is an element relating to a desired wave, and an element of i≠j is an element relating to an unnecessary wave. Further, a reception signal r at this time is represented by an expression (1-2) given below. In the expression (1-2), s denotes a transmission signal and v denotes noise.

$$H = \begin{pmatrix} h_{1,1} & h_{1,2} & \ldots & h_{1,M} \\ h_{2,1} & h_{2,2} & \ldots & h_{2,M} \\ & & \ddots & \\ h_{M,1} & h_{M,2} & \ldots & h_{M,M} \end{pmatrix}_{M \times M} \quad \ldots (1\text{-}1)$$

$$\begin{pmatrix} r_1 \\ r_2 \\ \vdots \\ r_M \end{pmatrix} = \begin{pmatrix} h_{1,1} & h_{1,2} & \ldots & h_{1,M} \\ h_{2,1} & h_{2,2} & \ldots & h_{2,M} \\ \vdots & \vdots & \ddots & \\ h_{M,1} & h_{M,2} & \ldots & h_{M,M} \end{pmatrix} \begin{pmatrix} s_1 \\ s_2 \\ \vdots \\ s_M \end{pmatrix} + \begin{pmatrix} v_1 \\ v_2 \\ \vdots \\ v_M \end{pmatrix} \quad \ldots (1\text{-}2)$$

$$r = Hs + v$$

$$\tag{1}$$

As seen from FIG. 15B, in the MIMO process on the reception side by the MIMO processor 604, an inverse matrix $H^{-1}$ (also called reception signal weight matrix) to the channel matrix H is multiplied by the reception signal r. As a result, on the reception side, a transmission-subject signal s (+noise component $H^{-1} \cdot v$) is obtained. The transmission-subject signal s is a baseband signal before the modulation.

As can be recognized from this, if the MIMO process is applied in the baseband region after the demodulation on the reception side, then the transmission-subject signal s which is free from an influence of an interference wave can be acquired. As a result, where it is intended to implement multiplexing transmission by space division multiplexing, even where the millimeter wave signal transmission path 9 is formed as the free space transmission path 9B, the degree of requirement for an interference countermeasure can be moderated, and the interference countermeasure can be eliminated. Alternatively, the interference countermeasure can be moderated.

The inverse matrix calculation by the MIMO processor 604 based on the inverse matrix $H^{-1}$ is a process of superposing inverse components in a baseband region to components based on unnecessary waves received by the antenna 236 on the reception side on demodulation outputs of the reception signals of desired waves and unnecessary waves so that the components based on the unnecessary waves may be canceled.

[Relationship Between MIMO Process Applied to Reception Side and Carrier Frequency]

FIG. 16 illustrates a relationship between the MIMO process applied to the reception side and the carrier frequency. Referring to FIG. 16, the first communication device 100 includes a modulation functional unit 8300 which in turn includes a plurality of frequency mixers 8302 for individual channels. Although, in the example shown, the frequency mixer 8302 for each channel shown carries out quadrature modulation, this is not essential. The modulation functional unit 8300 further includes a single transmission side local oscillator 8304 used commonly to all channels. A carrier signal itself generated by the transmission side local oscillator 8304 is used by the frequency mixers 8302 of the channels to carry out modulation. This configuration is convenient because the semiconductor chip 103 on the transmission side has a one-chip configuration.

The second communication device 200 includes a demodulation functional unit 8400 which in turn includes a plurality of frequency mixers 8402 for individual channels. The demodulation functional unit 8400 further includes a single reception side local oscillator 8404 used commonly to all channels. The reception side local oscillator 8404 recovers a carrier signal synchronized with the frequency of the carrier signal used on the transmission side. This configuration is convenient because the semiconductor chip 203 on the reception side has a one-chip configuration. It is to be noted that, in principle, the reception side local oscillator 8404 may be provided for each of the channels, and this signifies that the semiconductor chip 203 on the reception side may be provided for each of the channels.

In the present example, the frequency mixer 8402 is configured so as to carry out quadrature detection in a corresponding relationship to the quadrature modulation on the transmission side. In principle, if the transmission side does not use quadrature modulation, then the frequency mixer 8402 may not carry out quadrature detection. However, in the present embodiment, where the reception side is configured so as to carry out a MIMO process in the baseband region, even if the transmission side does not use quadrature modulation, the frequency mixer 8402 is sometimes configured so as to carry out quadrature detection depending upon a preset value of the distance between antennas for a desired wave and an unnecessary wave. The frequency mixer 8402 applies at least synchronous detection to carry out demodulation.

If the single transmission side local oscillator 8304 used commonly to all channels is provided and the carrier signal generated by the transmission side local oscillator 8304 is used by the frequency mixers 8302 of the channels to carry out modulation, then the influence of the carrier signal is equal among the different channels. By using a carrier frequency commonly to all channels in order to make the most of the basic advantage of the space division multiplexing, the influence of the carrier frequency becomes equal among the different symbols, and consequently, a MIMO process can be carried out in the baseband region on the reception side.

[Relationship Between Constraint to Antenna Arrangement and MIMO Processing Amount]

FIGS. 17A to 20D illustrate a relationship between a constraint to the antenna arrangement and the MIMO processing amount, that is, the inverse matrix calculation amount.

For example, FIGS. 17A and 17B show the simplest configuration ready for two channels including two antenna pairs. Referring first to FIG. 17A, the semiconductor chip 103 on the transmission side includes antennas 136_1 and 136_2 disposed in a spaced relationship by a distance G from each other, and an antenna 236_1 is provided on a semiconductor chip 203_1 in a facing relationship to the antenna 136_1 while another antenna 236_2 is provided on another semiconductor chip 203_2 in a facing relationship to the antenna 136_2. Also the antennas 236_1 and 236_2 are disposed in a spaced relationship by the distance G from each other. It is to be noted that the antennas 136 are equivalent to the antennas 8136 while the antennas 236 are equivalent to the antennas 8236. This similarly applies also to the following description.

The term "facing" signifies that paired antennas are disposed such that they do not have a phase characteristic which relies upon directivity. In other words, the "facing" signifies that the radiation angle of a desired wave from an antenna 136 and the incidence angle of the desired wave to a corresponding antenna 236 are zero. Details of this "facing," a phase characteristic which relies upon the directivity of an antenna and so forth are hereinafter described. In the following description, unless otherwise specified, it is assumed that paired antennas are disposed in the "facing" state.

The distance between antennas relating to a desired wave is represented by d1. In particular, the facing distance between the antenna 136_1 of the semiconductor chip 103 and the antenna 236_1 of the semiconductor chip 203 is d1. Similarly, also the facing distance between the antenna 136_2 of the semiconductor chip 103 and the antenna 236_2 of the semiconductor chip 203 is d1. On the other hand, the distance between antennas relating to an unnecessary wave is d2. In particular the distance between the antenna 136_1 of the semiconductor chip 103 and the antenna 236_2 of the semiconductor chip 203 is d2. Similarly, also the distance between the antenna 136_2 of the semiconductor chip 103 and the antenna 236_1 of the semiconductor chip 203 is d2.

A desired wave transmitted from the antenna 136_1 is received directly by the antenna 236_1. A desired wave transmitted from the antenna 136_2 is received directly by the antenna 236_2. An unnecessary wave transmitted from the antenna 136_1 is received directly by the antenna 236_2. An unnecessary wave transmitted from the antenna 136_2 is received directly by the antenna 236_1.

Since the distance d1<distance d2, even if the transmission levels of the antennas 136_1 and 136_2 are equal, the reception level of the desired wave received by the antenna 236_1 or 236_2 is higher than the reception level of the unnecessary wave received by the antenna 236_2 or 236_1 due to distance attenuation. This makes also a factor of the fact that an inverse matrix to a channel matrix exists without exception.

A MIMO process generally requires complex number calculation or a process corresponding to such complex number calculation, and this increases the circuit scale. For example, in such a case wherein two antenna pairs are provided as seen in FIG. 17A, such a circuit configuration intended for universal use as shown in FIG. 17B is adopted. Where biaxial modulation, that is, modulation of an I component and a Q component, is carried out as in the QPSK, if path condition setting hereinafter described is not carried out, then real number multiplication is required by 16 ($=2 \cdot 2 \cdot 2^2$) times and addition is required by 12 times. If three channels are used, then real number multiplication is required by $2 \cdot 2 \cdot 3^2$ times, and generally if M channels are used, then real number multiplication is required by $2 \cdot 2 \cdot M^2$ times. In the case of uniaxial modulation as in the ASK method or the BPSK method, where M channels are used, real number multiplication is required by $2 \cdot M^2$ times.

FIGS. 18A to 18C illustrate basic matters of a relationship between a distance difference Δd (=d2−d1: hereinafter referred to as path difference Δd) between the inter-antenna distance d1 of a desired wave and the inter-antenna distance d2 of an unnecessary wave where two channels, that is, two antenna pairs, are used and a channel matrix.

FIG. 18A illustrates a relationship between desired waves and unnecessary waves at the two antennas 236_1 and 236_2 on the reception side from the two antennas 136_1 and 136_2 on the transmission side, and a solid line indicates a desired wave while a broken line indicates an unnecessary wave. FIG. 18B illustrates a situation of the real number term (cos term) of elements of a channel matrix H and an inverse matrix $H^{-1}$ to the channel matrix H in a relation to the phase. FIG. 18C illustrates a situation of the imaginary number term (sin term) of the elements of the channel matrix H and an inverse matrix $H^{-1}$ to the channel matrix H in a relation to the phase.

Two transmission signals are represented by $S1(t)=A1\cdot\exp(jwt)$ and $S2(t)=A2\cdot\exp(jwt)$. A distance attenuation factor of an unnecessary wave with respect to a desired wave is represented by α where 0≤α<1. The frequency of a carrier signal is represented by fo, and the wavelength of the carrier signal is represented by λc. The transmission and reception antenna distance d1 of a desired wave is represented by "d," and the transmission and reception spatial channel distance $d_2$ of an unnecessary wave is represented by "d+λd." "λd" is a range difference or path difference between the desired wave and the unnecessary wave, and this is converted into time and represented by λt.

A reception signal R1(t) of the antenna 236_1 on the reception side is a combination of the desired wave from the opposing antenna 136_1 and the unnecessary wave from the antenna 136_2 which does not oppose to the antenna 236_1, and is represented by an expression (2-1) given below. A reception signal R2(t) of the antenna 236_2 is a combination of the desired wave from the opposing antenna 136_2 and the unnecessary wave from the antenna 136_1 which does not oppose to the antenna 236_2, and is represented by an expression (2-2) given below.

$$\left.\begin{aligned}R1(t) &= S1(t) + \alpha \cdot S2(t - \Delta t) \\ &= S1(t) + \alpha \cdot A2 e^{j\omega(\Delta t)} \\ &= S1(t) + \alpha \cdot S2(t) \cdot e^{-j\omega\Delta t}\end{aligned}\right\}(2\text{-}1) \quad (2)$$

$$\left.\begin{aligned}R2(t) &= \alpha \cdot S1(t - \Delta t) + S2(t) \\ &= \alpha \cdot A1 e^{j\omega(t-\Delta t)} + S2(t) \\ &= \alpha \cdot S1(t) + e^{-j\omega\Delta t} + S2(t)\end{aligned}\right\}(2\text{-}2)$$

If e(−jωΔt) in the expressions (2-1) and (2-2) is replaced with "D" (=cos ωΔt−j sin ωΔt), then expressions (3-1) and (3-2) given below are obtained, respectively.

$$\left.\begin{aligned}R1 &= S1 + \alpha \cdot D \cdot S2 \\ R2 &= \alpha \cdot D \cdot S2 + S1\end{aligned}\right\}(3\text{-}1) \quad (3)$$

$$\begin{pmatrix}R1\\R2\end{pmatrix} = \begin{pmatrix}1 & \alpha\cdot D\\ \alpha\cdot D & 1\end{pmatrix}\cdot\begin{pmatrix}S1\\S2\end{pmatrix}\bigg\}(3\text{-}2)$$

Then, from the expression (3-2), a channel matrix H represented by an expression (4-1) and an inverse matrix $H^{-1}$ represented by an expression (4-2) are obtained. In the expression (4-2), $\det H = 1-(\alpha\cdot D)^2$.

$$\left.\begin{aligned}H &= \begin{pmatrix}1 & \alpha\cdot D\\ \alpha\cdot D & 1\end{pmatrix}\ldots(4\text{-}1)\\ H^{-1} &= \frac{1}{\det H}\begin{pmatrix}1 & -\alpha\cdot D\\ -\alpha\cdot D & 1\end{pmatrix}\ldots(4\text{-}2)\\ \det H &= 1-\alpha^2\cdot D^2\end{aligned}\right\} \quad (4)$$

In this instance, if a fixed condition is set for the path difference Δd, then each element of the channel matrix H includes only a real number term (cos term) or an imaginary number term (sin term). Further, due to the presence of the distance attenuation element α, the inverse matrix $H^{-1}$ to the channel matrix H is determined without fail, and also each element of the inverse matrix $H^{-1}$ includes only a real number term (cos term) or an imaginary number term (sin term).

For example, where a channel matrix H where two channels are used is normalized, an element of a desired wave (in the first row of the first column or the second row of the second column) is a real number term (=1) irrespective of the path difference Δd. In contrast, an element of an unnecessary wave (in the first row of the second column or the second row of the first column) is one of a real number term only, an imaginary number term only and a "real number term+imaginary number term" depending upon the path difference Δd.

For example, where "Δd=(n/2+1/4)λc (n is 0 or a positive integer equal to or higher than 1)" is satisfied (hereinafter referred to as path condition 1), the path difference Δd has a relationship that it is equal to an odd-number of times of π/2 in phase, and since the real number term (cos term) becomes equal to zero, the path difference Δd has only the imaginary number term (sin term). If the path difference Δd is displaced from the relationship of the path condition 1, then the element comes to be represented by the "real number term and imaginary number term." However, if the path difference Δd is proximate to the relationship of the path condition 1, then the real number term component with respect to the imaginary number term component is much smaller and therefore may be treated substantially as including only the imaginary number term. In other words, although it is optimum to fully satisfy Δd=(n/2+1/4)λc, there is no problem even if the path difference Δd is displaced a little from the relationship of the path condition 1. In the present specification, the term "only the imaginary number term" is intended to include such a case that the path difference Δd has some displacement from the relationship of the path condition 1.

Here, particularly where n is 0 or an even number, the imaginary number term becomes "+1," and therefore, an unnecessary wave rotates by π/2 in phase with respect to a desired wave because of a path difference. At this time, since "detH=1−(α·D)²=1−(α·−j)²>1," the inverse matrix $H^{-1}$ to the channel matrix H can exist. Since "−α−D=−j·α" in the MIMO process on the transmission side, an unnecessary component is made to have a phase of "−π/2" with respect to a desired component.

On the other hand, where n is an odd number, since the imaginary number term becomes "−1," an unnecessary wave rotates by −π/2 in phase with respect to a desired wave because of a path difference. At this time, since "detH=1−(α·D)²=1−(α·j)²>1," the inverse matrix $H^{-1}$ to the channel matrix H can exist. Since "−α·D=j·α" in the MIMO process on the transmission side, an unnecessary component is made to have a phase of "π/2" with respect to a desired component.

On the other hand, where "Δd=(n/2)λC (n is a positive integer equal to or greater than 1) is satisfied (hereinafter referred to as path condition 2), the path difference Δd has a phase equal to an integral number of times of $\pi$, and since the imaginary number term (sin term) becomes zero, only the real number term remains. If the path difference $\Delta d$ is displaced from the relationship of the path condition 2, then the element comes to be represented by the "real number term and imaginary number term." However, if the path difference $\Delta d$ is proximate to the relationship of the path condition 2, then the imaginary number term component with respect to the real number term component is much smaller and therefore may be treated substantially as including only the real number term. In other words, although it is optimum to fully satisfy $\Delta d=(n/2)\lambda c$, there is no problem even if the path difference $\Delta d$ is displaced a little from the relationship of the path condition 2. In the present specification, the term "only the real number term" is intended to include such a case that the path difference $\Delta d$ has some displacement from the relationship of the path condition 2.

Here, particularly where n is an even number, the real number term becomes "+1," and therefore, an unnecessary wave rotates by $2\pi$ in phase with respect to a desired wave because of a path difference. At this time, since "detH=1−$(\alpha \cdot D)^2$=1−$(\alpha \cdot 1)^2$>1," the inverse matrix $H^{-1}$ to the channel matrix H can exist. Since "−$\alpha \cdot D$=−$\alpha$" in the MIMO process on the transmission side, an unnecessary component is made to have a phase of "−$\pi$" with respect to a desired component, that is, have a same phase of the opposite polarity.

On the other hand, where n is an odd number, since the real number term becomes "−1," an unnecessary wave rotates by n in phase with respect to a desired wave, that is, comes to have the same phase in the opposite polarity. At this time, since "detH=1−$(\alpha \cdot D)^2$=1−$(\alpha \cdot -1)^2$>1," the inverse matrix $H^{-1}$ to the channel matrix H can exist. Since "−$\alpha \cdot D$=$\alpha$" in the MIMO process on the transmission side, an unnecessary component is made to have a phase of "$2\pi$" with respect to a desired component, that is, comes to have the same phase in the same polarity.

In short, the difference between the inter-antenna distance d1 of a desired wave and the inter-antenna distance d2 of an unnecessary wave between the antenna 136 which is a transmission antenna and the antenna 236 which is a reception antenna should be set such that each of the elements of unnecessary waves of a channel matrix H which defines the transmission characteristic of the free space transmission path 9B (and also of an inverse matrix $H^{-1}$ to the channel matrix H) can be represented substantially only by a real number term or an imaginary number term.

In the present embodiment, paying attention to such a characteristic based on the preset value of the path difference $\Delta d$ as described above, the antenna arrangement is determined so as to satisfy the path condition 1 or the path condition 2. By the configuration, each of elements of unnecessary waves of a channel matrix can include only an imaginary number term or a real number term. As a result, an inverse matrix calculation process by the MIMO processor 604 can be simplified. Particularly where each element includes only a real number term, the demodulation functional unit 8400 can be configured without using a quadrature detection circuit.

[Path Condition 1]

FIGS. 19A to 19D illustrate a first example of a constraint condition of the antenna arrangement in the present embodiment where two channels or two antenna pairs are used. It is to be noted that the example is hereinafter referred to as antenna arrangement of the first example. The antenna arrangement of the first example is configured such that the path difference $\Delta d$ satisfies the path condition 1 described hereinabove. In other words, the distance difference or path difference $\Delta d$ between the inter-antenna distance d1 of a desired wave and the inter-antenna distance d2 of an unnecessary wave is set so as to approach the relationship of "(n/2+1/4)$\lambda c$."

Where the path difference $\Delta d$ satisfies the path condition 1, as described hereinabove with reference also to FIGS. 18A to 18C, the channel matrix H includes elements only of a real number term Re or an imaginary number term Im as seen in FIG. 19B, and also the inverse matrix $H^{-1}$ to the channel matrix H includes elements only of a real number term Re' or an imaginary number term Im'. In other words, elements of desired waves in the first row in the first column and in the second row in the second column include only a real number term, and elements of unnecessary waves in the first row in the second column and in the second row in the first column include only an imaginary number term. Therefore, the MIMO processing amount can be reduced.

It is to be noted that, since the imaginary number term Im' (quadrature component) exists, even if the modulation method where the present embodiment is not applied is modulation which originally involves no quadrature component like, for example, the ASK method or the BPSK method, a demodulation circuit for an orthogonal component, that is, a quadrature detection circuit, is required as the demodulation functional unit 8400.

FIG. 19C illustrates a state of reception signals of individual channels where a MIMO process is carried out applying the path condition 1 where the modulation method where the present embodiment is not applied is the BPSK method. As seen in FIG. 19C, components of the first channel ch1 are received as a composite signal of an I-axis component (Ch1_I) of an original desired value, that is, a desired wave for a desired signal, and a Q-axis component (Ch2_Q') of an unnecessary wave for an unnecessary signal originating from the second channel ch2 by the antenna 236_1. Components of the second channel ch2 are received as a composite signal of an I-axis component (Ch2_I) of an original desired wave for a desired signal and a Q-axis component (Ch1_Q') of an unnecessary wave for an unnecessary signal originating from the first channel ch1 by the antenna 236_2. As can be recognized from FIG. 19C, since the desired wave and the unnecessary wave are quadrature to each other, the demodulation functional unit 8400 requires a quadrature detection circuit. Since, in the MIMO process on the reception side, a component of an unnecessary wave which appears as an orthogonal component to the desired signal is canceled, the demodulation functional unit 8400 requires a quadrature detection circuit.

FIG. 19D shows the MIMO processor 604A of the first example corresponding to FIG. 19C and preceding stage circuits including the antenna 236, amplifier 8224 and demodulation functional unit 8400.

The demodulation functional unit 8400 includes a reception side local oscillator 8404 provided commonly to the channels for generating a carrier signal and a quadrature detection circuit 8460 provided for each of the channels. Each of the quadrature detection circuits 8460 includes a frequency mixer 8402_I for demodulating an I-axis component, a frequency mixer 8402_Q for demodulating a Q-axis component, and a phase shifter 8462 which is an example of a phase shifting unit for shifting the phase of a recovered carrier signal by 90 degrees, that is, by $\pi/2$. A recovered carrier signal is supplied from the reception side local oscillator 8404 to the frequency mixer 8402_I. The recovered carrier signal from the reception side local oscillator 8404 is supplied to the frequency mixer 8402_Q after it is shifted by $\pi/2$ by the phase shifter 8462. The demodulation functional unit 8400 carries out quadrature detection on a reception signal or desired wave regarding a desired signal and a reception signal or unnecessary wave regarding an unnecessary signal for each transmission channel. Consequently, a desired signal and an unnecessary signal are demodulated individually for each channel.

The quadrature detection circuit 8460 for the first channel supplies a demodulation output of the frequency mixer 8402_I to a filter processor 8410_I and supplies a demodulation output of the frequency mixer 8402_Q to a filter processor 8410_Q. From the filter processor 8410_I, a demodulation signal CH1_I of the first channel ch1 which is a desired component is outputted, and from the filter processor 8410_Q, a demodulation signal CH2_Q' of the second channel ch2 which is an unnecessary component to the first channel is outputted.

Also the quadrature detection circuit 8460 for the second channel similarly supplies a demodulation output of the frequency mixer 8402_I to the filter processor 8410_I and supplies a demodulation output of the frequency mixer 8402_Q to the filter processor 8410. From the filter processor 8410_I, a demodulation signal CH2_I of the second channel ch2 which is a desired component is outputted, and from the filter processor 8410_Q, a demodulation signal CH1_Q' of the first channel ch1 which is an unnecessary component to the second channel is outputted.

A MIMO processor 604A carries out an inverse matrix calculation process by analog processing and includes four multipliers 612, 614, 616 and 618 and two adders 615 and 619. To the multiplier 612, the demodulation signal CH1_I outputted from the filter processor 8410_I of the first channel is inputted, and to the multiplier 614, the demodulation signal CH1_Q' outputted from the filter processor 8410_Q of the second channel is inputted. To the multiplier 616, the demodulation signal CH2_Q' outputted from the filter processor 8410_Q of the first channel is inputted, and to the multiplier 618, the demodulation signal CH2_I outputted from the filter processor 8410_I of the second channel is inputted.

The multiplier 612 multiplies or amplifies the demodulation signal CH1_I of the first channel ch1 of a desired signal by or with an element, which is the real number term Re', in the first row in the first column of the inverse matrix. The multiplier 614 multiplies or amplifies the demodulation signal CH1_Q' of the first channel ch1 of an unnecessary signal to the second channel ch2 by or with an element, which is the imaginary number term Im', in the first row in the second column of the inverse matrix. The multiplier 616 multiplies or amplifies the demodulation signal CH2_Q' of the second channel ch2 of an unnecessary signal to the first channel ch1 by or with an element, which is the imaginary number term Im', in the second row in the first column of the inverse matrix. The multiplier 618 multiplies or amplifies the demodulation signal CH2_I of the second channel ch2 of a desired signal by or with an element, which is the real number term Re', in the second row in the second column of the inverse matrix. It is to be noted that, if an element of the matrix is in the negative, then it is inverted and then amplified.

Each of the adders 615 and 619 adds a signal of a self channel, that is, a channel for the adder itself, received and demodulated as a desired wave in the self channel and a signal of the self channel received and demodulated as an unnecessary wave in the other channel. By such addition, a demodulation component of a desired wave of a self channel and another demodulation component treated as an unnecessary component based on an unnecessary wave in the other channel is acquired.

In particular, the adder 615 adds a signal CH1_Re' of the first channel received as a desired wave and demodulated by signal processing for the self channel and a signal CH1_Im' of the first channel received as an unnecessary wave and demodulated by signal processing for the second channel. By the addition, the demodulation component Ch1_Re' of the desired wave of the self channel and the demodulation component CH1_Im' treated as an unnecessary signal based on an unnecessary wave in the other channel are combined to acquire a transmission-subject signal of the first channel.

Similarly, the adder 619 adds a signal Ch2_Re' of the second channel received as a desired wave and modulated by signal processing for the self channel and a signal Ch2_Im' of the second channel received as an unnecessary wave and demodulated by signal processing for the first channel. By the addition, the demodulation component Ch2_Re' of the desired wave of the self channel and the demodulation component CH2_Im' treated as an unnecessary signal based on an unnecessary wave in the other channel are combined to acquire a transmission-subject signal of the second channel.

In this manner, where the modulation method in the case wherein the present embodiment is not applied is the PBSK method and the number of antennas is two, by carrying out the MIMO process on the reception side applying the path condition 1, the number of times by which real number calculation must be carried out in inverse matrix calculation by the MIMO processor 604A is four, and the number of adders is 2. Thus, the number of times of real number multiplication can be reduced to ¼ and the number of adders can be reduced from those in the case wherein the path condition 1 of the present embodiment is not applied.

[Path Condition 2]

FIGS. 20A to 20D illustrate a second example of the constraint condition to the antenna arrangement of the present embodiment where two channels or two antenna pairs are used. It is to be noted that the example is hereinafter referred to as antenna arrangement of the second example. The antenna arrangement of the second example is configured so as to make the path difference Δd to satisfy the path condition 2 described hereinabove. In particular, the antenna arrangement of the second example is configured so that the distance difference or path difference Δd between the inter-antenna distance d1 of a desired wave and the inter-antenna distance d2 of an unnecessary wave may approach the relationship of "(n/2)λc."

Where the path difference Δd satisfies the path condition 2, as described hereinabove with reference also to FIGS. 18A to 18C, the channel matrix H includes elements only of a real number term Re or Re'' as seen in FIG. 20B. Also the inverse matrix $H^{-1}$ to the channel matrix H includes elements only of a real number term Re' or Re'''. In other words, elements of desired waves in the first row in the first column and in the second row in the second column include only a real number term, and also elements of unnecessary waves in the first row in the second column and in the second row in the first column include only a real number term. Therefore, the MIMO processing amount can be reduced.

In this instance, since no imaginary number term, that is, no orthogonal component, exists, if the modulation method where the present embodiment is not applied is modulation which originally involves no quadrature component like, for example, the ASK method or the BPSK method, a demodulation circuit for a quadrature component, that is, a quadrature detection circuit, is not required in the demodulation functional unit 8400.

FIG. 20C illustrates a state of transmission signals of individual channels where a MIMO process is carried out applying the path condition 2 where the modulation method where the present embodiment is not applied is the BPSK method. As seen in FIG. 20C, components of the first channel ch1 are received as a composite signal of an I-axis component (Ch1_I) of an original desired value, that is, a desired wave for a desired signal, and an I-axis component (Ch2_I') of an unnecessary wave for an unnecessary signal originating from the second channel ch2 by the antenna 236_1. Components of the second channel ch2 are received as a composite signal of an I-axis component (Ch2_I) of an original desired wave for a desired signal and an I-axis component (Ch1_I') of an unnecessary wave for an unnecessary signal originating from the first channel ch1 by the antenna 236_2. As can be recognized from FIG. 20C, in the MIMO process on the reception side, only it is necessary to cancel a component of an unnecessary component which appears as an in-phase component with respect to the desired wave, and the demodulation functional unit 8400 does not require a quadrature detection circuit.

FIG. 20D shows a MIMO processor 604B of the second example corresponding to FIG. 20C and preceding stage circuits including the antenna 236, amplifier 8224 and demodulation functional unit 8400.

The demodulation functional unit 8400 includes the reception side local oscillator 8404 provided commonly to the channels for generating a carrier signal. To the frequency mixer 8402 of each channel, a recovered carrier signal is supplied from the reception side local oscillator 8404. The demodulation functional unit 8400 synchronously detects a signal regarding a desired wave and a signal regarding an unnecessary signal for each transmission channel.

The frequency mixer 8402 for the first channel supplies demodulation outputs of the first channel ch1 of a desired signal and the second channel ch2 of an unnecessary signal to the filter processor 8410. From the filter processor 8410, a composite component of a demodulation signal CH1_I of the first channel ch1 of a desired signal and a component CH2_I' of the second channel ch2 of an unnecessary signal is outputted.

Also the frequency mixer 8402 for the second channel similarly supplies demodulation outputs of the second channel ch2 of a desired signal and the first channel ch1 of an unnecessary signal to the filter processor 8410. From the filter processor 8410, a composite component of a component CH2_I of the second channel ch2 of a desired signal and a component CH1_I' of the first channel ch1 of an unnecessary signal is outputted.

The MIMO processor 604B carries out an inverse matrix calculation process by analog processing and includes four multipliers 622, 624, 626 and 628 and two adders 625 and 629. To the multipliers 622 and 626, the demodulation signal CH1_I+CH2_I' outputted from the filter processor 8410 of the first channel is inputted, and to the multipliers 624 and 628, the modulation signal CH2_I+CH1_I' outputted from the filter processor 8410 of the second channel is inputted.

The multiplier 622 multiplies or amplifies the modulation signal CH1_I+CH2_I' by or with an element, which is a real number term Re', in the first row in the first column of the inverse matrix. The multiplier 624 multiplies or amplifies the modulation signal CH2_I+CH1_I' by or with an element, which is a real number term Re''', in the first row in the second column of the inverse matrix. The multiplier 626 multiplies or amplifies the modulation signal CH1_I+CH2_I' by or with an element, which is the real number term Re'', in the second row in the first column of the inverse matrix. The multiplier 628 multiplies or amplifies the modulation signal CH2_I+CH1_I' by or with an element, which is the real number term Re', in the second row in the second column of the inverse matrix. It is to be noted that, if an element of the matrix is in the negative, then it is inverted and then amplified.

Each of the adders 625 and 629 adds a gain R' correction amount for a composite component of a demodulation signal of the self channel received as a desired wave and demodulated in the self channel and a demodulation signal for the other channel received as an unnecessary wave and demodulated in the self channel and a gain R''' correction amount for a composite component for a demodulation signal of the other channel received as a desired wave and demodulated in the other channel and a demodulation signal of the self channel received as an unnecessary wave and demodulated in the other channel. By such addition, a demodulation component of the other channel demodulated by the demodulation process in the self channel is cancelled to obtain a transmission-subject channel for the self channel.

In particular, the adder 625 adds a signal CH1_Re'+Ch2_Re' outputted from the multiplier 622 and a signal Ch2_Re'''+Ch1_Re''' outputted from the multiplier 624. By the addition, an interference component based on the unnecessary wave from the second channel is canceled and a transmission-subject signal of the first channel is acquired.

Similarly, the adder 629 adds a signal Ch2_Re'+Ch1_Re' outputted from the multiplier 628 and a signal Ch1_Re'''+Ch2_Re''' outputted from the multiplier 626. By the addition, an interference component based on the unnecessary wave from the first channel is canceled and a transmission-subject signal of the second channel is acquired.

In this manner, where the modulation method in the case wherein the present embodiment is not applied is the PBKS method and the number of antennas is two, by carrying out the MIMO process on the reception side applying the path condition 2, the number of times by which real number calculation must be carried out in inverse matrix calculation by the MIMO processor 604B is four, and the number of adders is two. Thus, the number of times of real number multiplication can be reduced to ¼ and the number of adders can be reduced from those in the case wherein the path condition 2 of the present embodiment is not applied. The demodulation functional unit 8400 does not require a demodulation circuit for a quadrature component, that is, a quadrature detection circuit, and the circuit configuration on the reception side is simplified in comparison with that where the path condition 1 is applied.

[Phase Characteristic which Depends Upon Directivity]

FIG. 21 illustrates a countermeasure method where an antenna has a phase characteristic which relies upon directivity. In FIGS. 17A to 20D, the antenna pairs are arranged in a "facing" relationship to each other such that the antennas may not have a phase characteristic which relies upon the directivity. In contrast, where the antenna pairs have a phase characteristic φa which relies upon the directivity, it is necessary to take an influence not only of the path difference Δd but also of the phase characteristic φa into consideration. Basically, the influence of the phase characteristic φa should be eliminated in the following manner.

In FIG. 21, reference character θ1 denotes an incidence angle of a desired wave of the first channel to the antenna 236_1 which corresponds to a radiation angle of the desired wave from the antenna 136_1 which thus cooperates with the antenna 236_1 to form the first antenna pair. The angle θ also is an incidence angle of a desired wave of the second channel to the antenna 236_2 which corresponds to a radiation angle of the desired wave from the antenna 136_2 which thus cooperates with the antenna 236_2 to form the second antenna pair. Here, the angle θ has a value close to zero. Meanwhile, reference character θ2 denotes an incidence angle of an unnecessary wave of the first channel to the antenna 236_1 which corresponds to a radiation angle of the unnecessary wave from the antenna 136_2. Further, since the angle θ is close to zero, the angle θ is also an incidence angle of an unnecessary wave of the second channel to the antenna 236_2 which correspond to the radiation angle of the unnecessary wave from the antenna 136_1.

Although detailed description of a derivation process of expressions is omitted, if an influence amount of the phase characteristic φa is converted into and represented by a distance, then it is given by an expression (5-1). Further, if the path condition 1 is re-calculated with the influence amount taken into consideration, then it is represented by an expression (5-2) given below. If the path condition 2 is re-calculated with the influence amount taken into consideration, then it is represented by an expression (5-3) given below. In all cases, the influence amount of the phase characteristic φa is corrected.

Conversion of influence amount of phase difference into distance $$\begin{aligned}&\lambda c\left\{\frac{\phi_a(\theta_2)-\phi_a(\theta_1)}{\pi}\right\}\ \dots\ (5\text{-}1)\\&\Delta d=d2-d1=\lambda c\left\{\frac{n}{2}+\frac{1}{4}-\frac{\phi_a(\theta_2)-\phi_a(\theta_1)}{\pi}\right\}\ \dots\ (5\text{-}2)\\&\Delta d=d2-d1=\lambda c\left\{\frac{n}{2}-\frac{\phi_a(\theta_2)-\phi_a(\theta_1)}{\pi}\right\}\ \dots\ (5\text{-}3)\end{aligned} \quad (5)$$

[Application to Three or More Channels]

FIGS. 22 and 23 illustrate a countermeasure method where three or more antenna pairs are involved. Also where the number of antenna pairs increases to three or more, if the path difference Δd is set so as to satisfy the path condition 1, then a channel matrix and an inverse matrix to the channel matrix include only elements of a real number term or an imaginary number term similarly as in the case wherein two antenna pairs are involved. In particular, an element of a desired wave where i=j includes only a real number term Re, but an element of an unnecessary wave where i≠j includes only an imaginary number term Im.

Further, as seen in FIG. 23, even where three or more antenna pairs are involved, if the path difference Δd is set so as to satisfy the path condition 2, then a channel matrix and an inverse matrix to the channel matrix come to include elements only of a real number term similarly as in the case wherein two antenna pairs are involved. In particular, an element of a desired wave where i=j includes only a real number term Re, and also an element of an unnecessary wave where i≠j includes only a real number term Re. A combination denoted by an ellipsis in FIG. 23 represents a subject of consideration of a constraint condition.

Generally where the number of channels is M, as can be presupposed from a channel matrix, in regard to both of the path conditions 1 and 2, it is necessary for real number multiplication to be carried out, in such biaxial modulation as the QPSK, by $2\cdot M^2$ times, and in such uniaxial modulation as the ASK method or the BPSK method, by $M^2$ times. This signifies that, where the number of antenna pairs is three or more, if an approach similar to that where the number of antenna pairs is two is applied simply as it is, then the calculation amount in the real number calculation increases in proportion to the square of the antenna pair number.

Therefore, in the present embodiment, where the number of antenna pairs is three or more, a countermeasure is taken based on the characteristic of the antenna arrangement described above such that the number of times of real number calculation may not increase in proportion to the square of the channel number, that is, increase of the number of times of real number calculation may be suppressed. In particular, attention is paid to the fact that the influence of an interference wave from an adjacent antenna is highest and that the influence of an interference wave from the other antennas is comparatively lower. By this, an antenna distance is determined taking an unnecessary wave or interference wave from an adjacent antenna into consideration and is applied also to the other antennas.

By the countermeasure, for example, where the path condition 1 is applied, with regard to the inner side channels except the opposite end channels, it becomes necessary to take only the real number term of an antenna 136 of a desired wave and the imaginary number term regarding those antennas 136 of an unnecessary wave positioned on the opposite sides of the antenna 136 into consideration. In particular, when attention is paid to the ith channel, only a desired wave from the ith antenna 136_i to the antenna 236_i and an unnecessary wave from the i−1th antenna 136_i to the antenna 236_i as well as an unnecessary wave from the i+1th antenna 136_i+1 to the antenna 236_i should be taken into consideration. Therefore, in the ith row of a channel matrix and an inverse matrix to the channel matrix, the element of a desired wave in the ith column becomes a real number term and the elements of an unnecessary wave in the i−1th column and the i+1th column become an imaginary number term while the other elements of an unnecessary wave become zero.

Where the path condition 2 is applied, on the inner side channels except the opposite end channels, it is necessary to take only the real number term regarding an antenna 136 of a desired wave and the real number term regarding those antennas 136 of an unnecessary wave positioned on the opposite sides of the antenna 136 into consideration. In particular, when attention is paid to the ith channel, only it is necessary to take a desired wave from the ith antenna 136_i to the antenna 236_i and an unnecessary wave from the i−1th antenna 136_i−1 to the antenna 236_i as well as an unnecessary wave from the i+1th antenna 136_i+1 to the antenna 236_i into consideration. Therefore, in the ith row of a channel matrix and an inverse matrix to the channel matrix, the element of a desired wave in the ith column becomes a real number term and also the elements of an unnecessary wave in the i−1th column and the i+1th column become a real number term while the other elements of an unnecessary wave become zero.

In regard to both of the path conditions 1 and 2, the number of times of real number multiplication for the opposite end channels is two, and the number of times of real number multiplication for the inner side channels except the opposite end channels is three. Thus, the MIMO processing amount can be reduced from that where the present technique is not applied.

In particular, where the number of channels is M which is an integer equal to or greater than 3, in the case of both of the path conditions 1 and 2, the number of times of real number calculation is, in the case of biaxial modulation such as the QPSK, $2\cdot\{2\cdot2+(M-2)\cdot3\}$, but in the case of uniaxial modulation such as the ASK method or the BPSK method, $\{2\cdot2+(M-2)\cdot3\}$. This signifies that, where the number of antenna pairs is three or more, the calculation amount of real number calculation can be reduced from that where an approach similar to that where the number of antenna pairs is two is applied simply as it is.

[Application to Three-Dimensional Arrangement]

FIGS. 24A and 24B illustrate an application technique of a MIMO process, which is applied to the reception side described hereinabove with reference to FIGS. 15A to 23, to a case wherein transmission and reception antennas are arranged three-dimensionally.

The matter described hereinabove with reference to FIGS. 15A to 23 is application examples to a case wherein antennas 136 on the transmission side and antennas 236 on the reception side are arranged two-dimensionally.

However, the mechanism for reducing the MIMO processing amount on the reception side in the present embodiment can be applied not only to a case wherein transmission and reception antennas are arranged two-dimensionally but also to another case wherein transmission and reception antennas are arranged three-dimensionally as seen in FIG. 24B.

For example, in FIG. 24B, seven antennas 136_1 to 136_7 are arranged in a spaced relationship by a distance G from each other on a semiconductor chip 103 on the transmission side, and antennas 236_@ are provided on a semiconductor chip 203_@ in a facing relationship with the antennas 136_@. Also the antennas 236_@ are provided in a spaced relationship by the distance G from each other.

While, in FIG. 24B, only a desired wave from the semiconductor chip 103 on the transmission side to the semiconductor chip 203 on the reception side is illustrated, as regards unnecessary waves between those antennas which are not disposed in a facing relationship with each other, a similar approach to that in the case of the two-dimensional arrangement described hereinabove may be applied. Also in the three-dimensional arrangement, similar operation and effects to those described hereinabove can be achieved by setting the path difference Δd of desired waves and unnecessary waves so as to satisfy the path condition 1 or the path condition 2 described hereinabove.

Incidentally, the places at which the antennas 236 of the semiconductor chip 203 are arranged with respect to the antennas 136 of the semiconductor chip 103 are positioned basically on a plane parallel to the plane of the semiconductor chip 103, that is, of the antennas 136. A minimum cell formed from the antennas 136 or the antennas 236 is a regular triangle.

Where unnecessary waves or interference waves from the antennas on the opposite sides adjacent a desired wave are considered, a channel matrix to be applied to the three dimensions may be studied paying attention to a state of a regular hexagon as seen in FIG. 24B. For example, it is assumed that a channel of a desired wave is provided by the antennas 136_1 and 236_1 at the center of a regular hexagon. In other words, a desired wave is transmitted from the antenna 136_1 at the center of the regular triangle on the transmission side to the antenna 236_1 at the center of the regular hexagon on the reception side. At this time, the adjacent antennas which make a subject of analysis of unnecessary waves to the antenna 236_1 are the antennas 136_2 to 136_7 arranged at the vertices of the regular polygon.

[Digital MIMO Process]

FIGS. 25A and 25B illustrate a basic technique where the MIMO process on the reception side is carried out by digital processing. In the configuration shown in FIG. 19D where the antenna arrangement is set so as to satisfy the path condition 1 and the configuration shown in 20D where the antenna arrangement is set so as to satisfy the path condition 2, the MIMO processor 604 (604A and 604B) is ready for analog processing.

However, the inverse matrix calculation by the MIMO processor 604 is not necessarily carried out by an analog circuit but may be carried out digital signal processing if there is no problem in the processing speed. In this instance, an analog signal after a demodulation process outputted from the demodulation functional unit 8400 or after a LPF process outputted from the filter processor 8410 should be supplied to the MIMO processor 604 after it is converted into a digital signal.

However, FIG. 25A illustrates an example of a countermeasure for the configuration of FIG. 19D ready for the path condition 1, and FIG. 25B illustrates an example of a countermeasure for the configuration of FIG. 20D ready for the path condition 2. In both examples, an AD converter 632 (ADC) is interposed between the filter processor 8410 and the MIMO processor 604. No alternation is applied to the other part. Though not shown, if also the LPF process is to be carried out digitally, the AD converter 632 should be interposed between the demodulation functional unit 8400 and the filter processor 8410.

Reception MIMO System

First Embodiment

FIGS. 26A to 28 illustrate a first example of particular application of the MIMO process applied to the reception side described hereinabove with reference to FIGS. 15A to 25B. The first example is hereinafter referred to as reception MIMO system of the first embodiment. Here, it is assumed that "an unnecessary wave reaches only an adjacent antenna."

The reception MIMO system 4A of the first embodiment is characterized in that injection locking is applied on the reception side. Further, taking it into consideration that reduction of the required transmission power upon duplex transmission is achieved, only one channel (first channel ch1) from among M channels is used for a method which modulates only the amplitude, here, for the ASK method, while all of the remaining channels are used for any other method than the method which adopts only the amplitude, here, for the BPSK method.

Figure 26A:
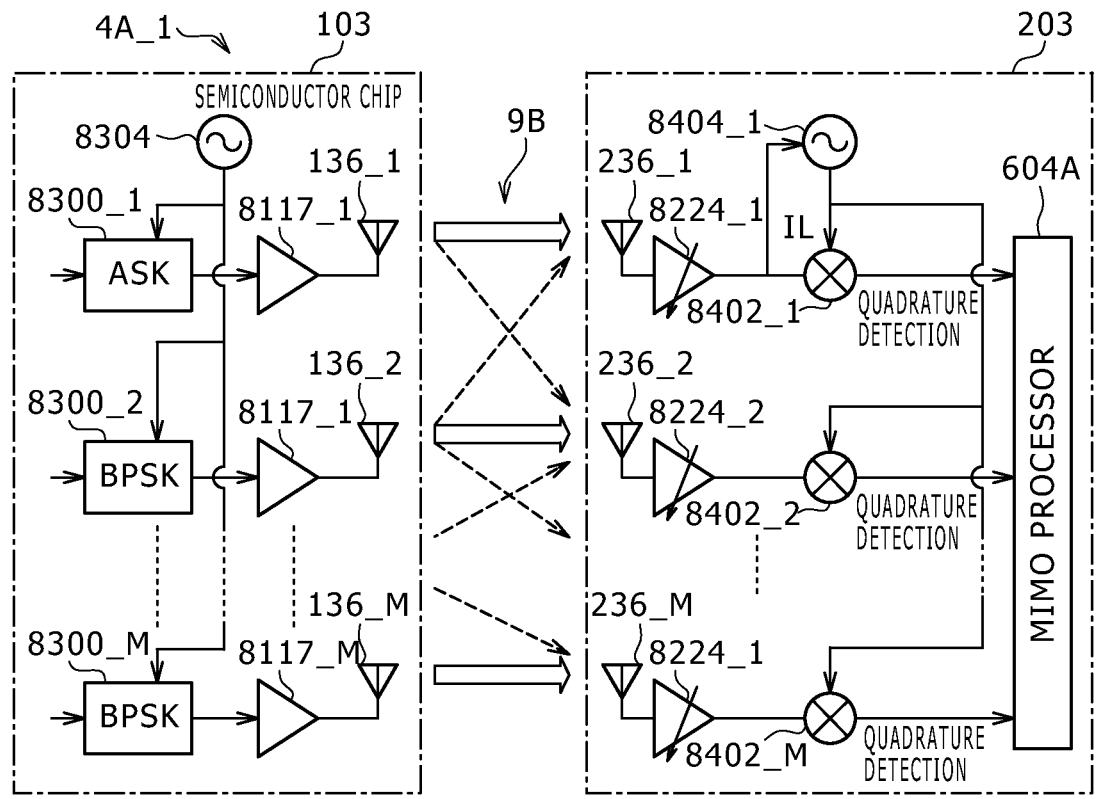
FIGS. 26A and 26B are diagrammatic views showing a first example of a reception MIMO system of a first embodiment.
Figure 26B:
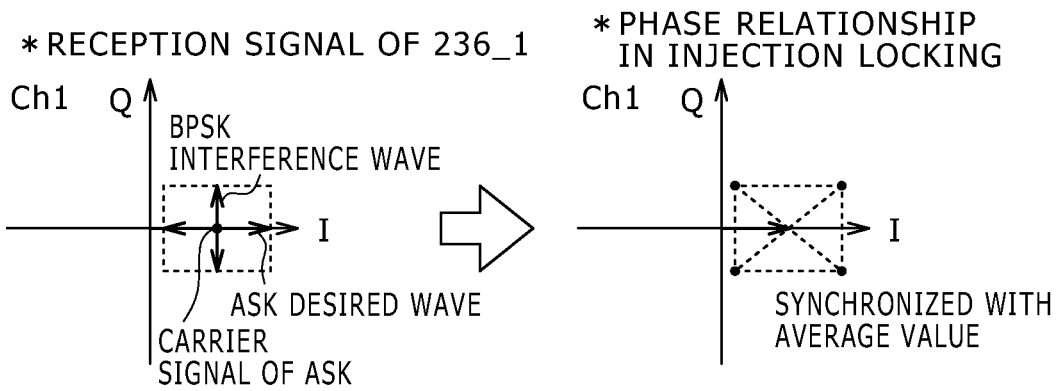

Further, the reception MIMO system 4A_1 of the first example shown in FIGS. 26A and 26B has a one-to-one configuration wherein the transmission side has a one-chip configuration while also the reception side has a one-chip configuration, and on the reception side, the ASK is applied to one channel (first channel ch1) while all of the remaining channels carry out synchronous detection based on a recovered carrier signal acquired by injection locking by the channel of the ASK. Although it is presupposed that "an unnecessary wave arrives only from an adjacent antenna," since injection locking is established by the channel of the ASK method, different from the second example hereinafter described, the number of channels of the BPSK method can be set arbitrarily.

Figure 27A:
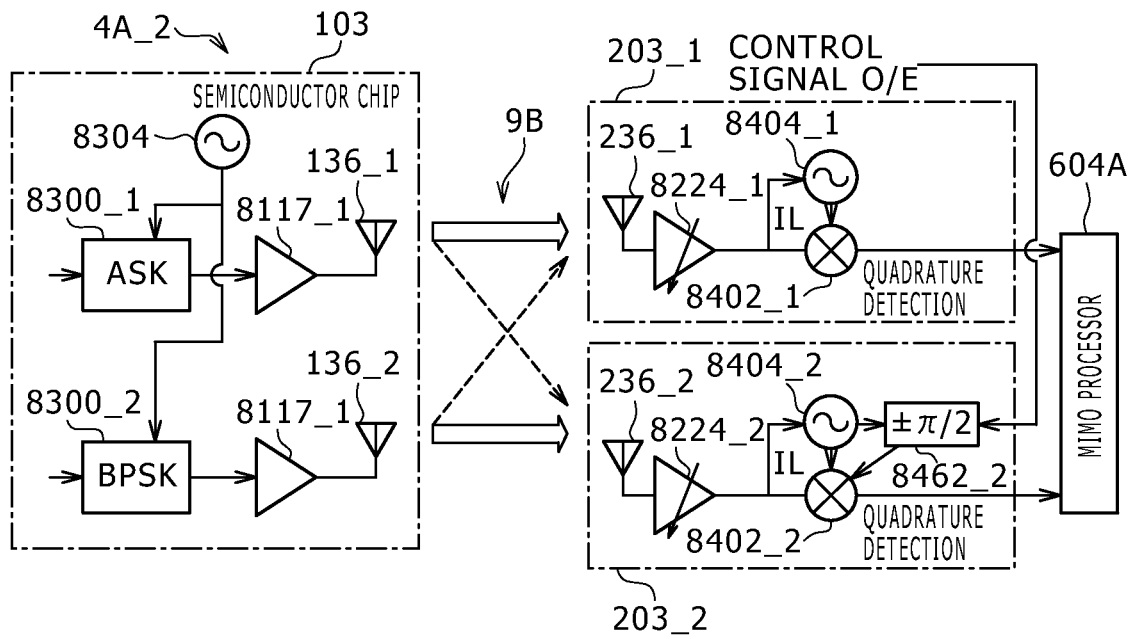
FIGS. 27A to 27C are diagrammatic views showing a second example of the reception MIMO system of the first embodiment.
Figure 27B:
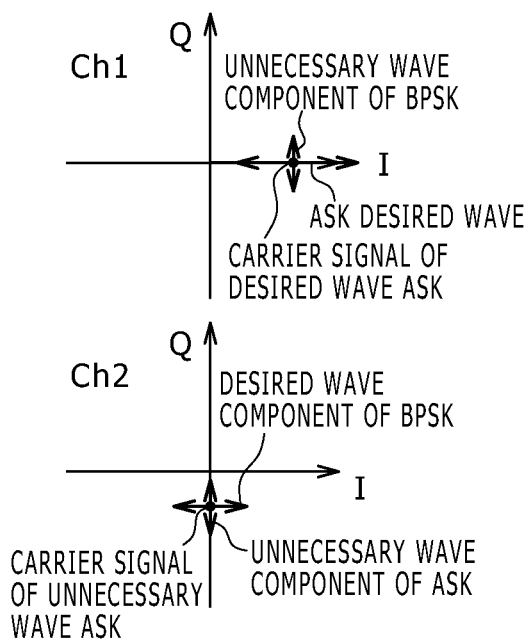
Figure 27C:
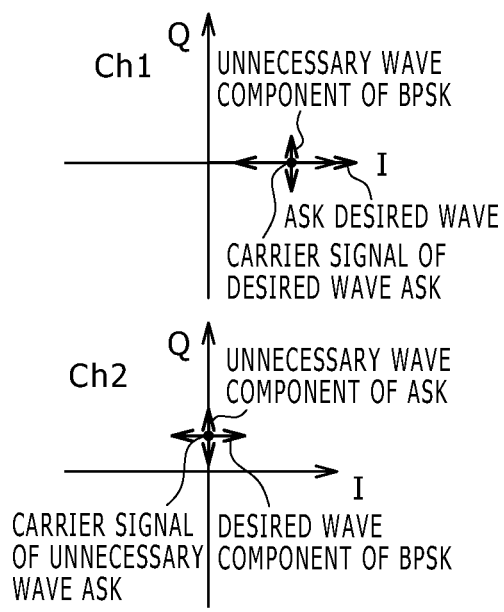

On the other hand, the reception MIMO system 4A_2 of the second example shown in FIGS. 27A to 27C has a one-to-N configuration wherein, while M channels are involved, the transmission side has a one-chip configuration and the reception side uses the semiconductor chip 203 for each of the channels. Further, on the reception side, injection locking is applied to a reception signal for each of the channels. Since it is presupposed that "an unnecessary wave arrives only from an adjacent antenna," the reception MIMO system 4A_2 of the second example is based on a configuration which involves two channels as in the case of the second example.

Figure 28:
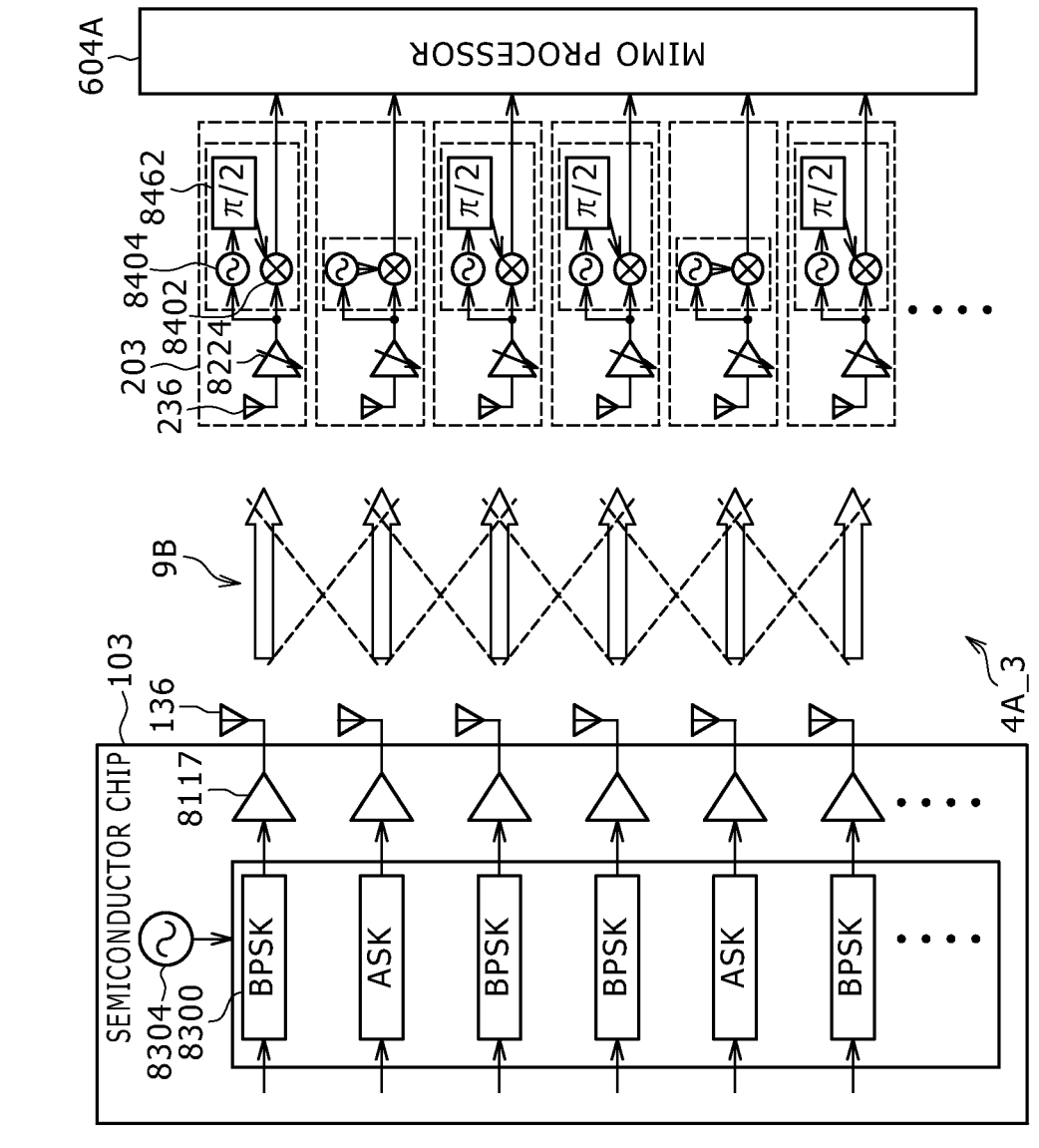
FIG. 28 is a diagrammatic view showing a third example of the reception MIMO system of the first embodiment.

The reception MIMO system 4A_3 of the third example shown in FIG. 28 is configured so as to increase the number of channels while adopting the approach of the second example. While the presupposition that "an unnecessary wave arrives only from an adjacent antenna" is maintained, the channel of the ASK method is arranged so that a modulation signal of the ASK method reaches all antennas 236. In particular, a three-channel configuration wherein channels of the BPSK method are disposed on the opposite sides of the channel of the ASK method is determined as a basic element, and such basic elements should be arranged repetitively.

Further, the antenna arrangement is set such that the path difference Δd satisfies the path condition 1. In particular, the antennas 136 and 236 are arranged so that the relationship of the path difference $Δd=(n/2+1/4)λc$ may be approached. It is to be noted that, where the path difference Δd has a phase characteristic which relies upon the directivity, the antennas 136 and 236 are arranged so that the relationship of the expression (5-2) may be approached as described hereinabove.

Since the path condition 1 is applied, the MIMO processor 604A of the first example described hereinabove with reference to FIG. 19D is used as the MIMO processor 604.

In the injection locking on the reception side, a channel in which an ASK wave and a BPSK wave are received in a mixed state is synchronized with an average value of the input signals, and therefore is synchronized with a carrier signal component of the ASK. Consequently, the individual reception signals can be demodulated.

However, in the second example described hereinabove with reference to FIG. 27A, except the first channel to which the ASK method is not applied (but the BPSK method is applied), a signal component of the BPSK received as a desired wave and a carrier signal component of the ASK received as an unnecessary wave have a quadrature relationship, that is, have a phase difference of π/2 therebetween. Therefore, a phase shifter 8462 for shifting the phase of a recovered carrier signal generated by injection locking, that is, a carrier signal synchronized with the carrier signal component of the ASK received as an unnecessary wave, by 90 degrees, that is, by π/2, is provided. To the phase shifter 8462, a control signal O/E for controlling the phase shifting direction based on "n" which defines the path condition 1 is supplied.

In the relationship of the path difference $Δd=(n/2+1/4)λc$, whether the phase relationship between a signal component of the BPSK and a carrier signal component of the ASK of a received signal becomes +90 degrees, that is, +π/2, or −90 degrees, that is, −π/2, is influenced by whether n is an odd number or an even number as seen in FIGS. 27B and 27C.

In particular, where n is an odd number, since the imaginary number term or sine term is in the negative as seen in FIG. 18C because there is a phase delay of 3π/2, in the other channels than the first channel, a carrier signal component of the ASK appears in the negative direction of the Q axis with respect to a signal component of the BPSK in the I axis direction as seen in FIG. 27B.

On the other hand, where n is an even number, since the imaginary number term or sine term is in the positive as seen in FIG. 18C because there is a phase delay of π/2, in the other channels than the first channel, a carrier signal component of the ASK appears in the positive direction of the Q axis with respect to a signal component of the BPSK in the I axis direction as seen in FIG. 27C.

Accordingly, it is necessary for the shift by the phase shifter 8462 to be changed over between −90 degrees, that is, −π/2, and +90 degrees, that is, +π/2, in response to whether n is an odd number or an even number. Incidentally, since actually it is known at the stage of installation of the antennas whether n is an odd number or an even number, one of an odd number of an even number is selected in advance to form the antennas rather than the changeover by a control signal.

Reception MIMO System

Second Embodiment

FIGS. 29A to 30B illustrate a second example of particular application of the MIMO process applied to the reception side described hereinabove with reference to FIGS. 15A to 25B. The second example is hereinafter referred to as reception MIMO system of the second embodiment. Also here, it is assumed that "an unnecessary wave reaches only an adjacent antenna."

The reception MIMO system 4B of the second embodiment is characterized in that injection locking is applied on the reception side. Further, taking it into consideration that reduction of the required transmission power upon duplex transmission is achieved, only one channel (first channel ch1) from among M channels is used for a method which modulates only the amplitude, here, for the ASK method, while all of the remaining channels are used for any other method than the method which adopts only the amplitude, here, for the BPSK method.

Figure 29A:
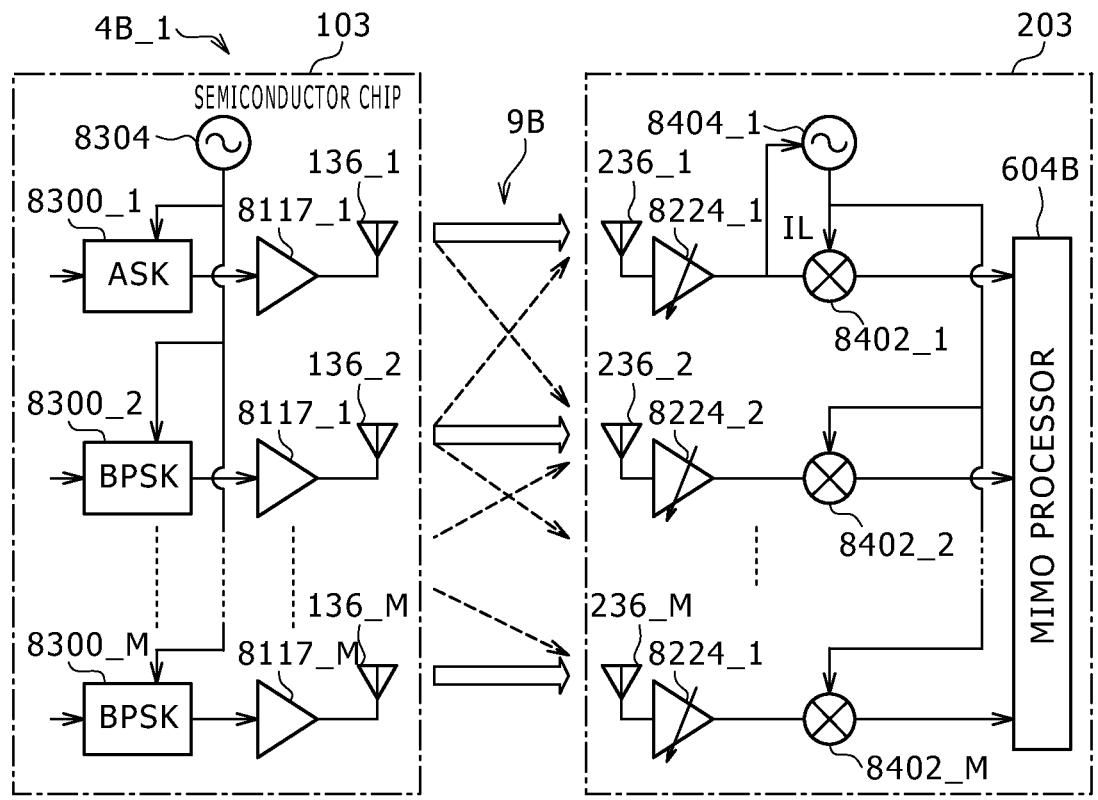
FIGS. 29A and 29B are diagrammatic views illustrating a first example of a reception MIMO system of a second embodiment.
Figure 29B:
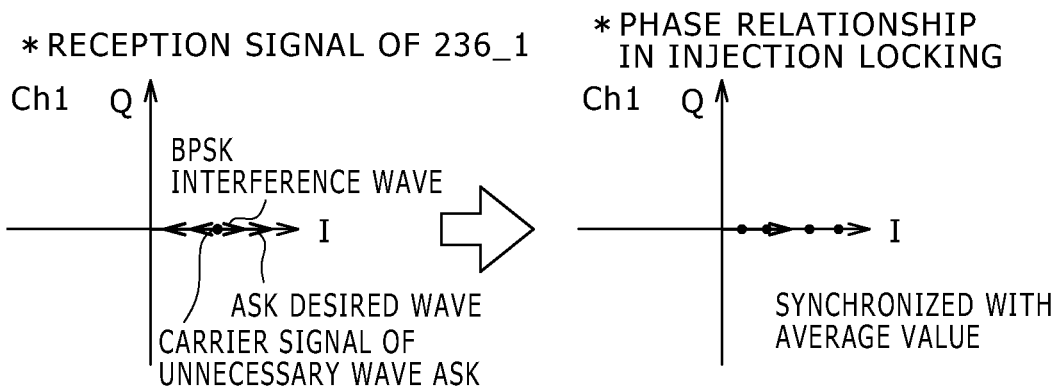

Further, the reception MIMO system 4B_1 of the first example shown in FIGS. 29A and 29B has a one-to-one configuration wherein the transmission side has a one-chip configuration while also the reception side has a one-chip configuration, and on the reception side, the ASK is applied to one channel (first channel ch1) while all of the remaining channels carry out synchronous detection based on a recovered carrier signal acquired by injection locking by the channel of the ASK. Although it is presupposed that "an unnecessary wave arrives only from an adjacent antenna," since injection locking is established by the channel of the ASK method, different from the second example hereinafter described, the number of channels of the BPSK method can be set arbitrarily.

Figure 30A:
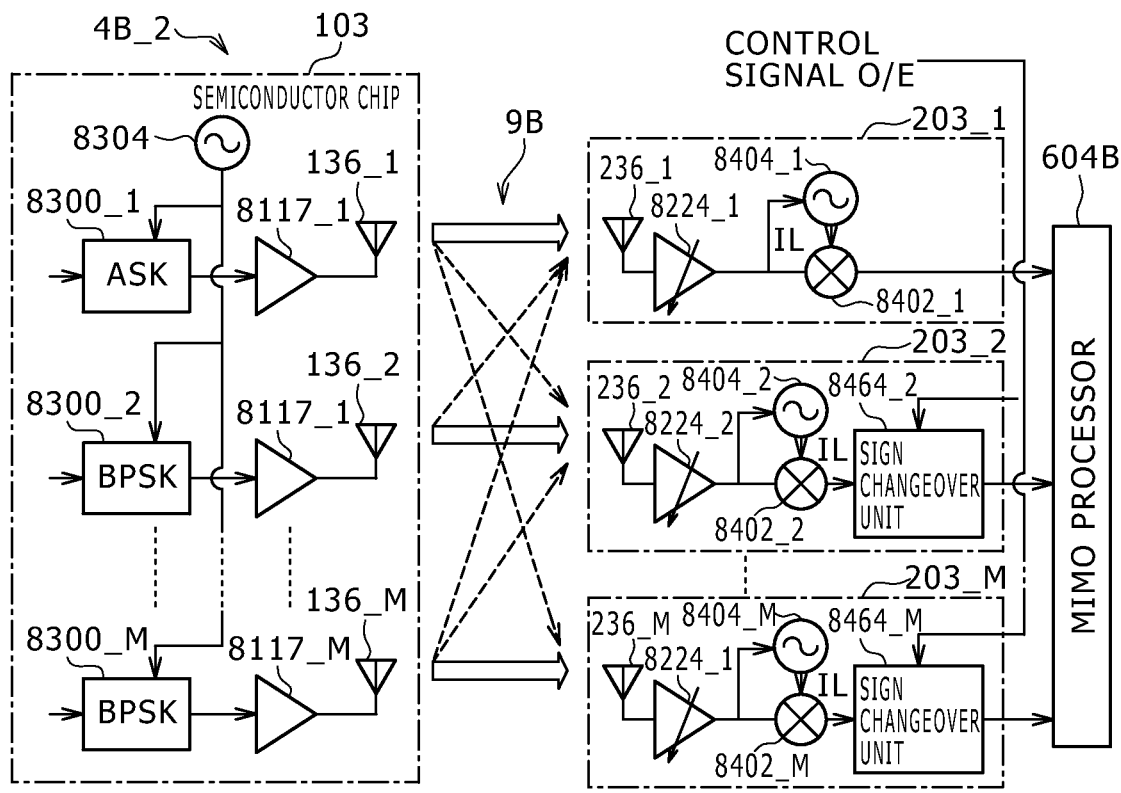
FIGS. 30A to 30C are diagrammatic views a second example of the reception MIMO system of the second embodiment.
Figure 30B:
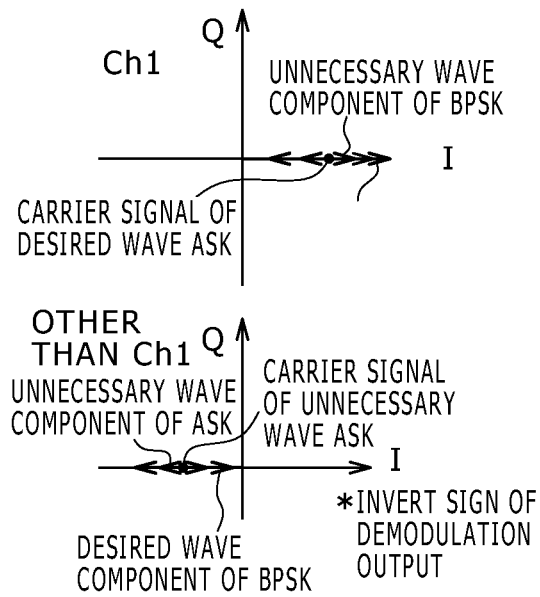
Figure 30C:
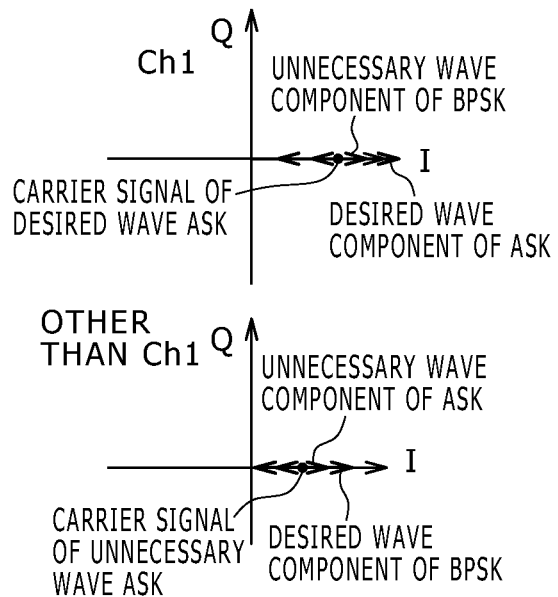
Figure 31:
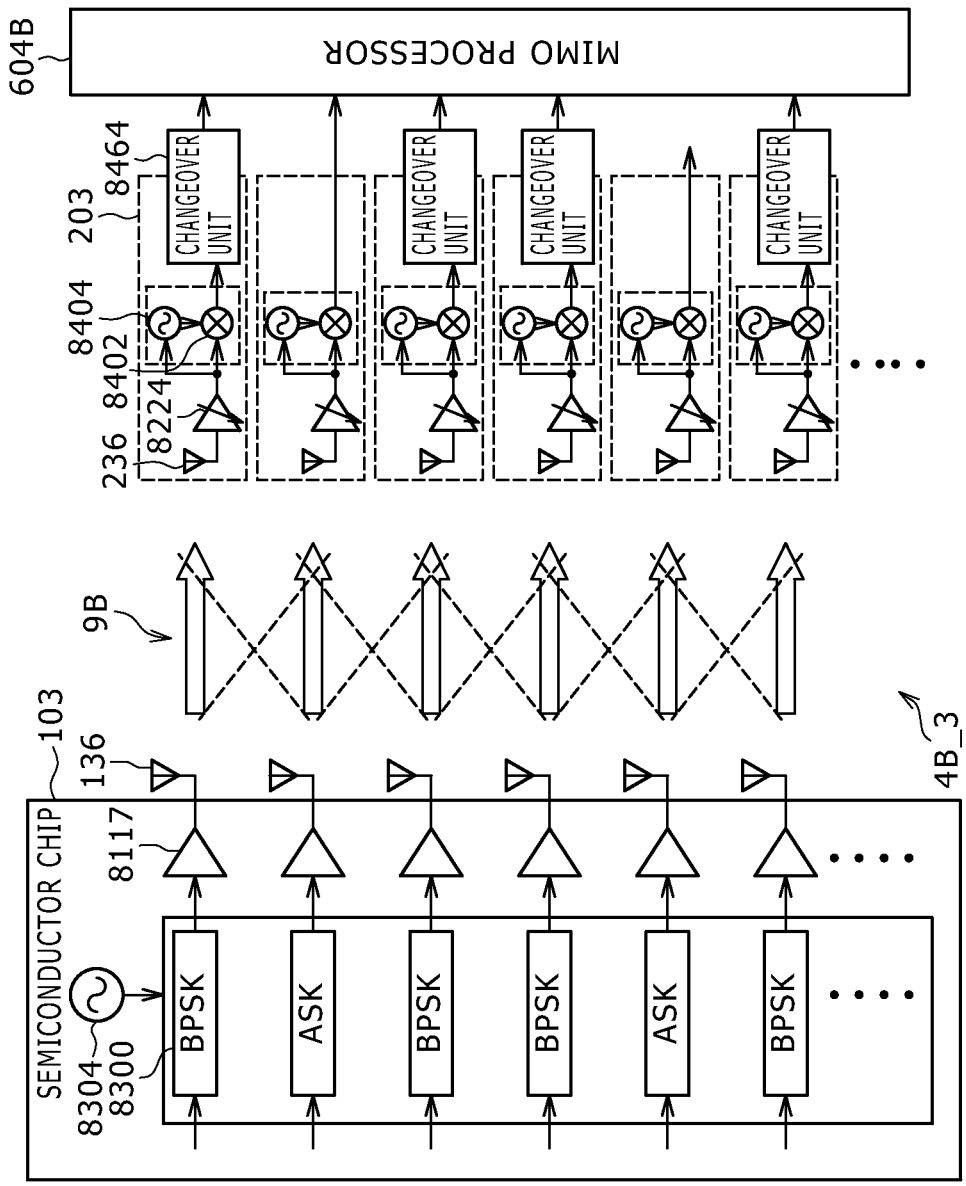
FIG. 31 is a diagrammatic view showing a third example of the reception MIMO system of the second embodiment.

On the other hand, the reception MIMO system 4B_2 of the second example shown in FIGS. 30A to 30C has a one-to-N configuration wherein, while M channels are involved, the transmission side has a one-chip configuration and the reception side uses the semiconductor chip 203 for each of the channels. Further, on the reception side, injection locking is applied to a reception signal for each of the channels. Since it is presupposed that "an unnecessary wave arrives only from an adjacent antenna," the reception MIMO system 4B_2 of the second example is based on a configuration which involves two channels as in the case of the second example.

The reception MIMO system 4B_3 of the third example shown in FIG. 14B is configured so as to increase the number of channels while adopting the approach of the second example. While the presupposition that "an unnecessary wave arrives only from an adjacent antenna" is maintained, the channel of the ASK method is arranged so that a modulation signal of the ASK method reaches all antennas 236. In particular, a three-channel configuration wherein channels of the BPSK method are disposed on the opposite sides of the channel of the ASK method is determined as a basic element, and such basic elements should be arranged repetitively.

Further, the antenna arrangement is set such that the path difference Δd satisfies the path condition 2. In particular, the antennas 136 and 236 are arranged so that the relationship of the path difference $Δd=(n/2+1/4)λc$ may be approached. It is to be noted that, where the path difference Δd has a phase characteristic which relies upon the directivity, the antennas 136 and 236 are arranged so that the relationship of the expression (5-3) may be approached as described hereinabove.

Since the path condition 2 is applied, the MIMO processor 604B of the second example described hereinabove with reference to FIG. 20D is used as the MIMO processor 604.

In the injection locking on the reception side, synchronization is established with an average value of the input signals, and therefore is synchronized with a carrier signal component of the ASK. Consequently, the individual reception signals can be demodulated.

However, in the second example described hereinabove with reference to FIG. 30A, except the first channel to which the ASK method is not applied (but the BPSK method is applied), the sign of a signal component of the BPSK and a carrier signal component of the ASK which have an in-phase relationship with each other is influenced by "n" which defines the path condition 2. Therefore, a sign changeover unit 8464, which is an example of a sign setting unit, for changing over the sign of the demodulation output is provided on the succeeding stage to the frequency mixer 8402. To the sign changeover unit 8464, a control signal O/E for controlling the sign of the demodulation signal based on "n" which defines the path condition 2 is supplied.

In the relationship of the path difference $\Delta d=(n/2)\lambda c$, whether a signal component of the BPSK and a carrier signal component of the ASK of a received signal appear on the negative side on the I axis or on the positive side on the I axis is influenced by whether n is an odd number or an even number as seen in FIG. 30B.

In particular, where n is an odd number, since the real number term or cos term is in the negative as seen in FIG. 18B because there is a phase delay of n or the phase is reversed, in the other channels than the first channel, a signal component of the BPSK and a carrier signal component of the ASK appear on the negative side on the I axis as seen in FIG. 30B. Since this signifies that, when n is an odd number, the phase of the received signal is reversed, it is necessary to reverse the sign of the demodulation output.

On the other hand, where n is an even number, since the real number term or cos term is in the positive as seen in FIG. 18B, that is, there is no phase delay and the phase is maintained, a signal component of the BPSK and a carrier signal component of the ASK appear on the positive side on the I axis as seen in FIG. 30C.

Accordingly, it is necessary for the sign changeover unit 8464 to change over the sign of the demodulation output between the positive and the negative depending on whether n is an odd number or an even number. Incidentally, since actually it is known at the stage of installation of the antennas whether n is an odd number or an even number, one of an odd number of an even number is selected in advance to form the antennas rather than the changeover by a control signal.

Reception MIMO System

Third Embodiment

Figure 32A:
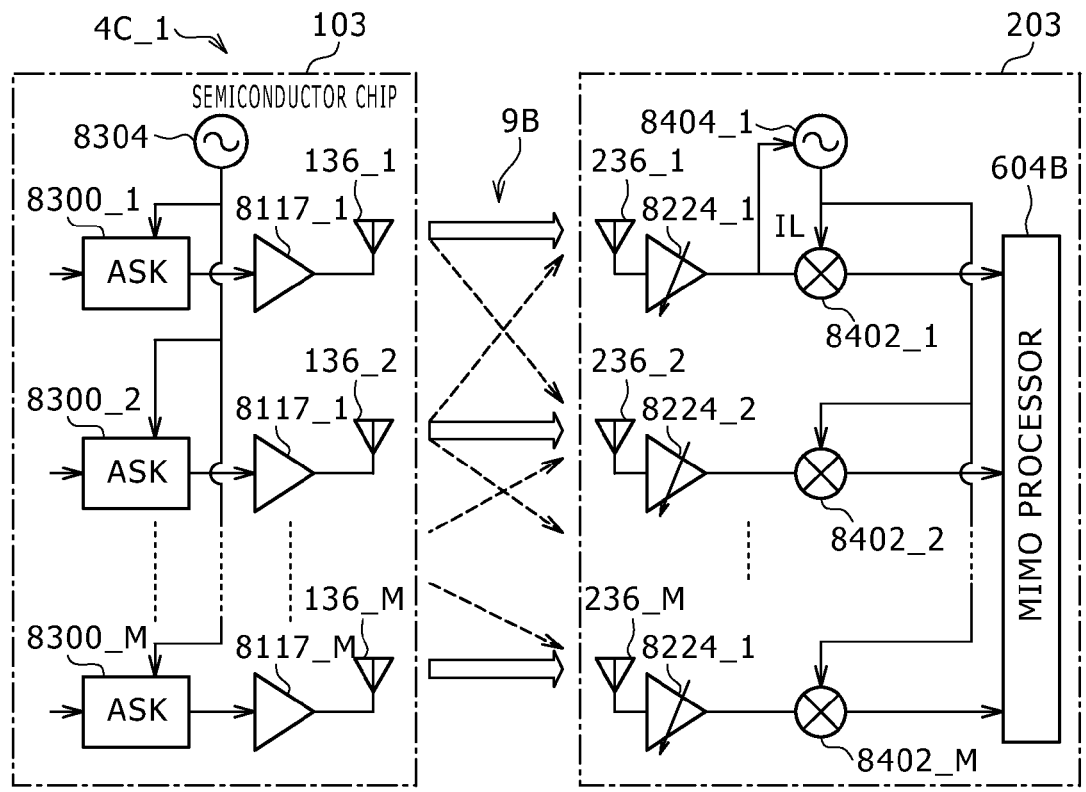
FIGS. 32A to 32C are diagrammatic views showing a first example of a reception MIMO system of a third embodiment.
Figure 32B:
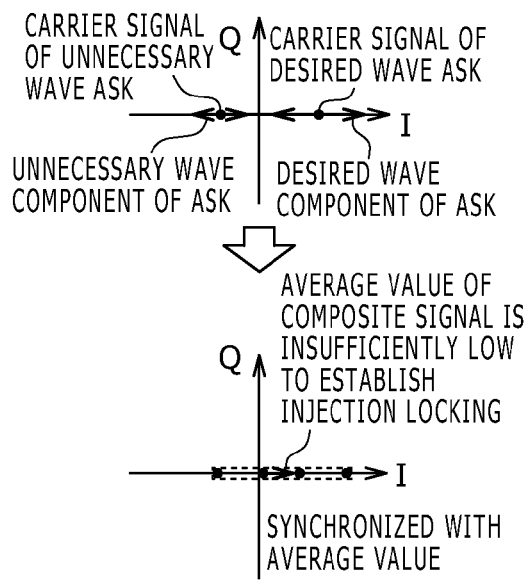
Figure 32C:
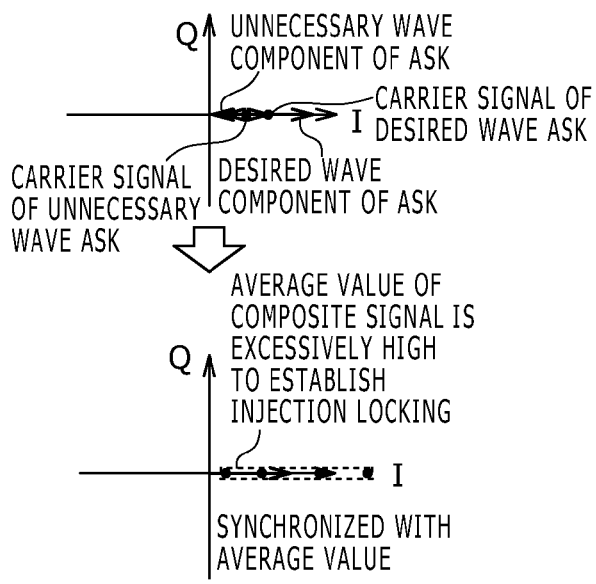
Figure 33:
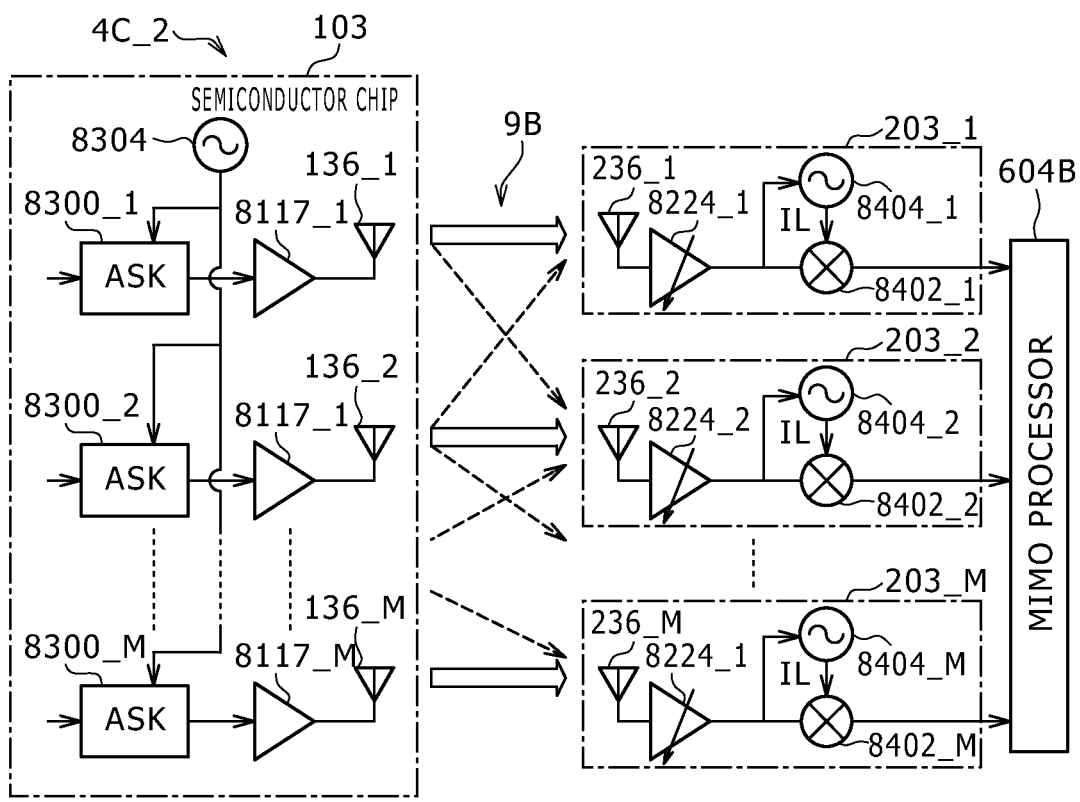
FIG. 33 is a diagrammatic view showing a second example of the reception MIMO system of the third embodiment.

FIGS. 32A to 33 illustrate a third example of particular application of the MIMO process applied to the reception side described hereinabove with reference to FIGS. 15A to 25B. The third example is hereinafter referred to as reception MIMO system of the third embodiment.

In the reception MIMO system 4C of the third embodiment, injection locking is applied on the reception side. Further, taking easiness in establishment of injection locking on the reception side into consideration, all of M channels are used for a method which modulates only the amplitude, here, for the ASK method. Since all channels use the ASK method, the number of channels can be set arbitrarily.

Further, the reception MIMO system 4C_1 of the first example shown in FIG. 32A has a one-to-one configuration wherein the transmission side has a one-chip configuration while also the reception side has a one-chip configuration, and on the reception side, the ASK is applied to one channel, for example, to the first channel ch1, while all of the remaining channels carry out synchronous detection based on a recovered carrier signal acquired by injection locking by the channel of the ASK. It is to be noted that only it is necessary for the reception MIMO system 4C_1 to include, in a mixed state, a channel wherein a carrier signal for demodulation synchronized with a carrier signal for modulation is generated by injection locking based on a reception signal and the received modulation signal is frequency-converted with the carrier signal for the demodulation to demodulate the modulation signal and another channel wherein the modulation signal received based on the carrier signal for the demodulation generated by the injection locking is frequency-converted and demodulated. Further, the number of channels which adopt injection locking may not be one but may be a plural number which is smaller than the total number of channels.

On the other hand, the reception MIMO system 4C_2 of the second example shown in FIG. 33 has a one-to-N configuration wherein, while M channels are involved, the transmission side has a one-chip configuration and the reception side uses the semiconductor chip 203 for each of the channels. Further, on the reception side, injection locking is applied to a reception signal for each of the channels.

Further, the antenna arrangement is set such that the path difference $\Delta d$ satisfies the path condition 2. In particular, the antennas 136 and 236 are arranged so that the relationship of the path difference $\Delta d=(n/2)\lambda c$ may be approached. It is to be noted that, where the path difference $\Delta d$ has a phase characteristic which relies upon the directivity, the antennas 136 and 236 are arranged so that the relationship of the expression (5-3) may be approached as described hereinabove.

Since the path condition 2 is applied, the MIMO processor 604B of the second example described hereinabove with reference to FIG. 20D is used as the MIMO processor 604.

In the injection locking on the reception side, synchronization is established with an average value of the input signals, and therefore is synchronized with a carrier signal component of the ASK. Consequently, the individual reception signals can be demodulated.

It is to be noted that, as can be supposed from FIGS. 18A to 18C, the magnitude of the average level of the received composite signal is influenced by whether n is an odd number or an even number.

In particular, where n is an odd number, since the real number term or cos term is in the negative as seen in FIG. 18B because there is a phase delay of n or the phase is reversed, an unnecessary wave appears in the opposite phase to that of a desired wave as seen in FIG. 32B. Therefore, an effective carrier signal component of the ASK drops in level. In other words, the average value of the composite signal received by the antenna 236 on the reception side decreases, and injection locking becomes less likely to be established.

On the other hand, where n is an even number, since the real number term or cos term is in the positive as seen in FIG. 18B, that is, there is no phase delay and the phase is same, a desired phase and an unnecessary wave appear in the same phase as seen in FIG. 32C. Therefore, the effective carrier signal component of the ASK increases. In other words, the average value of the composite signal received by the antenna 236 on the reception side increases, and injection locking becomes likely to be established.

Further, in regard to the phase relationship of carrier signals of the ASK of desired waves and unnecessary waves, whether the carrier signals have an opposite phase relationship or a same phase relationship is controlled depending upon whether "n" is an odd number or an even number. However, the sign of the sum of the carrier signals is not influenced by "n" which defines the path condition 2. This is because, even if they have an opposite phase relationship to each other, the unnecessary waves have a lower level than the desired waves, and the sum of the carrier signals becomes positive without fail.

In this manner, in the third embodiment, the situation that n is an even number, in short, $\Delta d = m\lambda c$ where m is an integer equal to or greater than 1, is more preferable because the average value of the composite signal is higher and injection locking can be established more readily.

It is to be noted that, as seen from FIG. 32B, where "n" is an odd number and the carrier signals have an opposite phase relationship to each other, since the phase of the composite signal of the desired wave and the unnecessary wave at the antenna 236 on the reception side may possibly be reversed, the reception signal may possibly become like that of the BPSK. For example, the OOK is assumed as an example of the ASK in order to facilitate understandings. Where the desired wave is "1," the unnecessary wave level is lower than the desired wave level, and therefore, even if the unnecessary wave is "1," the phase of the reception signal is not reversed. However, when the desired wave is "0," if the unnecessary wave is "1," then the phase of the reception signal is reversed. However, with the demodulation functional unit 8400, since synchronous detection is carried out, the composite signal of the desired wave and the unnecessary wave can be demodulated without a problem.

The present application contains subject matter related to that disclosed in Japanese Priority Patent Application JP 2009-223682 filed in the Japan Patent Office on Sep. 29, 2009, the entire content of which is hereby incorporated by reference.

It should be understood by those skilled in the art that various modifications, combinations, sub-combinations and alterations may occur depending on design requirements and other factor in so far as they are within the scope of the appended claims or the equivalents thereof.

What is claimed is:

1. A wireless transmission system, comprising:
   first and second antenna pairs, each including a transmission antenna and a corresponding reception antenna that are arranged such that a wireless signal transmitted from the transmission antenna of the first antenna pair directly arrives as a desired wave at the reception antenna of the first antenna pair and a wireless signal transmitted from the transmission antenna of the second antenna pair directly arrives as an unnecessary wave at the reception antenna of the first antenna pair; and
   a transmission characteristic correction unit that calculates a correction matrix based on a transmission characteristic of a transmission space between the transmission antennae and the reception antennae based on signals received by the reception antennae to acquire an output signal corresponding to a transmission subject signal,
   wherein the first and second antenna pairs are arranged such that:

$$d_2 - d_1 = \left(\frac{n}{2} + \frac{1}{4} - \frac{\phi_a(\theta_2) - \phi_a(\theta_1)}{\pi}\right)\lambda_C,$$

where $d_1$ is a distance between the transmission and reception antennae of the first antenna pair and $d_2$ is a distance between the transmission antenna of the second antennae pair and the reception antenna of the first reception pair, n is zero or an integer greater than or equal to one, $\theta_1$ is a radiation angle from the transmission antenna to the reception antenna of the of the first antenna pair $\theta_2$ is a radiation angle from the transmission antenna of the second antenna pair to the reception antenna of the first antenna pair, and phase characteristics which rely upon the directivity of the individual antennae are represented by $\phi_a(\theta_1)$ and $\phi_a(\theta_2)$.

2. The wireless transmission system according to claim 1, wherein a modulation functional unit for modulating a carrier signal with the transmission subject signal and transmitting the modulated carrier signal from the corresponding transmission antenna is provided corresponding to each of the antenna pairs, and the modulation functional unit of at least one of channels of the antenna pairs for a plurality of transmission subject signals adopts a method for modulating only the amplitude of the transmission subject signal while the modulation functional unit of the remaining channels adopts a method other than the method which modulates only the amplitude; and the demodulation functional unit in the channel which adopts the method which modulates only the amplitude of the transmission subject signal generates a carrier signal for demodulation synchronized with a carrier signal for modulation by injection locking based on the reception signal, frequency-converts the received modulation signal with the carrier signal for demodulation and demodulates the modulation signal while the demodulation functional units in the channel or channels which do not adopt the injection locking method frequency-converts the received modulation signal based on the carrier signal for demodulation generated in the channel which adopts the injection locking method and demodulates the modulation signal.

3. The wireless transmission system according to claim 1, wherein a modulation functional unit for modulating a carrier signal with the transmission subject signal and transmitting the modulated carrier signal from the corresponding transmission antenna is provided corresponding to each of the antenna pairs, and the modulation functional unit of at least one of channels of the antenna pairs for a plurality of transmission subject signals adopts a method for modulating only the amplitude of the transmission subject signal while the modulation functional unit of the remaining channels adopts a method other than the method which modulates only the amplitude;

the demodulation functional unit generating, for each of the plural transmission subject signals, a carrier signal for demodulation synchronized with a carrier signal for modulation by injection locking based on the reception signal, frequency-converting the received modulation signal with the carrier frequency for demodulation and demodulating the modulation signal;

the wireless transmission system further comprising a phase shifter provided for each of the channels which adopts the method other than the method which modulates only the amplitude for shifting the phase of the carrier signal for demodulation and supplying the phase-shifted carrier signal for modulation to the corresponding demodulation functional unit.

4. The wireless transmission system according to claim 1, wherein carrier signals used by the demodulation functional units have a common frequency to all channels.

5. The wireless transmission system of claim 1, wherein n is an even number.

6. The wireless transmission system of claim 1, wherein n is an odd number.

7. The wireless transmission system of claim 1, wherein the first and second antenna pairs are arranged such that $\phi_a(\theta_1)=0$ and $\phi_a(\theta_2)=0$.

8. A wireless transmission system comprising:
first and second antenna pairs, each including a transmission antenna and a corresponding reception antenna that are arranged such that a wireless signal transmitted from the transmission antenna of the first antenna pair directly arrives as a desired wave at the reception antenna of the first antenna pair and a wireless signal transmitted from the transmission antenna of the second antenna pair directly arrives as an unnecessary wave at the reception antenna of the first antenna pair; and
a transmission characteristic correction unit that calculates a correction matrix based on a transmission characteristic of a transmission space between the transmission antennae and the reception antennae based on signals received by the reception antennae to acquire an output signal corresponding to a transmission subject signal,
wherein a distance between the transmission and reception antennae of the first antenna pair and a distance between the transmission antenna of the second antennae pair and the reception antenna of the first reception pair are set such that each of the elements of the correction matrix that correspond to the desired wave are represented only by a real number term while each of the elements of the correction matrix that correspond to the unnecessary wave are represented only by an imaginary number term.

9. The wireless transmission system according to claim 8, wherein the modulation functional unit for modulating a carrier signal with the transmission subject signal and transmitting the modulated carrier signal from the corresponding transmission antenna is provided corresponding to each of the antenna pairs, and the modulation functional unit of at least one of channels of the antenna pairs for a plurality of transmission subject signals adopts a method for modulating only the amplitude of the transmission subject signal while the modulation functional unit of the remaining channels adopts a method other than the method which modulates only the amplitude; and
the demodulation functional unit, for the plural transmission subject signals, in the channel which adopts the method which modulates only the amplitude of the transmission subject signal generates a carrier signal for demodulation synchronized with a carrier signal for modulation by injection locking based on the reception signal, frequency-converts the received modulation signal with the carrier signal for demodulation and demodulates the modulation signal while the demodulation functional units in the channel or channels which do not adopt the injection locking method frequency-converts the received modulation signal based on the carrier signal for demodulation generated in the channel which adopts the injection locking method and demodulates the modulation signal.

10. A wireless transmission system comprising:
first and second antenna pairs, each including a transmission antenna and a corresponding reception antenna that are arranged such that a wireless signal transmitted from the transmission antenna of the first antenna pair directly arrives as a desired wave at the reception antenna of the first antenna pair and a wireless signal transmitted from the transmission antenna of the second antenna pair directly arrives as an unnecessary wave at the reception antenna of the first antenna pair; and
a transmission characteristic correction unit that calculates a correction matrix based on a transmission characteristic of a transmission space between the transmission antennae and the reception antennae based on signals received by the reception antennae to acquire an output signal corresponding to a transmission subject signal,
wherein a distance between the transmission and reception antennae of the first antenna pair and a distance between the transmission antenna of the second antennae pair and the reception antenna of the first reception pair are set such that each of the elements of the correction matrix that correspond to the desired wave are represented only by a real number term while each of the elements of the correction matrix that correspond to the unnecessary wave are represented only by a real number term.

11. A wireless transmission system, comprising:
first and second antenna pairs, each including a transmission antenna and a corresponding reception antenna that are arranged such that a wireless signal transmitted from the transmission antenna of the first antenna pair directly arrives as a desired wave at the reception antenna of the first antenna pair and a wireless signal transmitted from the transmission antenna of the second antenna pair directly arrives as an unnecessary wave at the reception antenna of the first antenna pair;
a demodulation functional unit for each of the antenna pairs that demodulates a signal received by the reception antenna; and
a transmission characteristic correction unit that calculates a correction matrix based on a transmission characteristic of a transmission space between the transmission antennae and the reception antennae based on the signals demodulated by the demodulation functional units to acquire an output signal corresponding to a transmission subject signal,
wherein the first and second antenna pairs are arranged such that:

$$d_2 - d_1 = \left(\frac{n}{2} - \frac{\phi_a(\theta_2) - \phi_a(\theta_1)}{\pi}\right)\lambda_C,$$

where $d_1$ is a distance between the transmission and reception antennae of the first antenna pair and $d_2$ is a distance between the transmission antenna of the second antennae pair and the reception antenna of the first reception pair,
n is an integer greater than or equal to one,
$\theta_1$ is a radiation angle from the transmission antenna to the reception antenna of the of the first antenna pair $\theta_2$ is a radiation angle from the transmission antenna of the second antenna pair to the reception antenna of the first antenna pair, and phase characteristics which rely upon the directivity of the individual antennae are represented by $\phi_a(\theta_1)$ and $\phi_a(\theta_2)$.

12. The wireless transmission system according to claim 11, wherein a modulation functional unit for modulating a carrier signal with the transmission subject signal and transmitting the modulated carrier signal from the corresponding transmission antenna is provided corresponding to each of the antenna pairs, and the modulation functional unit of at least one of channels of the antenna pairs for a plurality of transmission subject signals adopts a method for modulating only the amplitude of the transmission subject signal while the modulation functional unit of the remaining channels adopts a method other than the method which modulates only the amplitude;

the demodulation functional unit generating, for each of the plural transmission subject signals, a carrier signal for demodulation synchronized with a carrier signal for modulation by injection locking based on the reception signal, frequency-converting the received modulation signal with the carrier frequency for demodulation and demodulating the modulation signal;

the wireless transmission system further comprising a coding setting unit provided in the channel or channels which adopts the method other than the method which modulates only the amplitude for setting a sign of an output signal outputted from the demodulation functional unit.

13. The wireless transmission system according to claim 11, wherein a modulation functional unit for modulating a carrier signal with the transmission subject signal and transmitting the modulated carrier signal from the corresponding transmission antenna is provided corresponding to each of the antenna pairs, and the modulation functional unit of all of channels for a plurality of transmission subject signals adopts a method for modulating only the amplitude of the transmission subject signal; and the demodulation functional units includes, in a mixed state, a channel for generating a carrier signal for demodulation synchronized with the carrier signal for modulation by injection locking based on the reception signal, frequency converting the received modulation signal with the carrier signal for demodulation and then demodulating the frequency-converted modulation signal and another channel for frequency-converting the received modulation signal based on the carrier signal for demodulation generated by the injection locking and demodulating the frequency-converted modulation signal.

14. The wireless transmission system according to claim 13, wherein the carrier signal for demodulation is generated by the injection locking by the single channel.

15. The wireless transmission system according to claim 11, wherein a modulation functional unit for modulating a carrier signal with the transmission subject signal and transmitting the modulated carrier signal from the corresponding transmission antenna is provided corresponding to each of the antenna pairs, and the modulation functional unit of all of channels for a plurality of transmission subject signals adopts a method for modulating only the amplitude of the transmission subject signal; and each of the demodulation functional units of a wireless communication device on a reception side generates, for each of the plural transmission subject signals, a carrier signal for demodulation synchronized with a carrier signal for modulation by injection locking based on the reception signal, frequency-converts the received modulation signal with the carrier signal for demodulation and demodulating the frequency-converted modulation signal.

16. The wireless transmission system of claim 11, wherein n is an even number.

17. The wireless transmission system of claim 11, wherein n is an odd number.

18. The wireless transmission system of claim 11, wherein the first and second antenna pairs are arranged such that $\phi_a(\theta_1)=0$ and $\phi_a(\theta_2)=0$.

19. A wireless transmission system comprising:

first and second antenna pairs, each including a transmission antenna and a corresponding reception antenna that are arranged such that a wireless signal transmitted from the transmission antenna of the first antenna pair directly arrives as a first desired wave at the reception antenna of the first antenna pair, a wireless signal transmitted from the transmission antenna of the second antenna pair directly arrives as a first unnecessary wave at the reception antenna of the first antenna pair, a wireless signal transmitted from the transmission antenna of the second antenna pair directly arrives as a second desired wave at the reception antenna of the second antenna pair, and a wireless signal transmitted from the transmission antenna of the first antenna pair directly arrives as a second unnecessary wave at the reception antenna of the second antenna pair;

a first demodulation functional unit for the first antenna pair that demodulates a signal received by the reception antenna of the first antenna pair by quadrature detection and outputs a first Q signal and a first I signal;

a second demodulation functional unit for the second antenna pair that demodulates a signal received by the reception antenna of the second antenna pair by quadrature detection and outputs a second Q signal and a second I signal; and a transmission characteristic correction unit that calculates a correction matrix based on a transmission characteristic of a transmission space between the transmission antennae and the reception antennae based on the demodulated signals to acquire output signals corresponding to transmission subject signals, wherein a distance between the transmission and reception antennae of the first antenna pair and a distance between the transmission antenna of the second antennae pair and the reception antenna of the first reception pair are set such that the first Q signal corresponds only to the first desired wave, the second Q signal corresponds only to the second desired wave, the first I signal corresponds only to the first unnecessary wave, and the second I signal corresponds only to the second unnecessary wave, and the transmission characteristic correction unit corrects the first and second Q signals and the first and second I signals based on the correction matrix, and adds a corrected first Q signal to a corrected second I signal and adds a corrected second Q signal to a corrected first I signal, to acquire the output signals corresponding to the transmission subject signals.

20. A wireless transmission system comprising:

first and second antenna pairs, each including a transmission antenna and a corresponding reception antenna that are arranged such that a wireless signal transmitted from the transmission antenna of the first antenna pair directly arrives as a first desired wave at the reception antenna of the first antenna pair, a wireless signal transmitted from the transmission antenna of the second antenna pair directly arrives as a first unnecessary wave at the reception antenna of the first antenna pair, a wireless signal transmitted from the transmission antenna of the second antenna pair directly arrives as a second desired wave at the reception antenna of the second antenna pair, and a wireless signal transmitted from the transmission antenna of the first antenna pair directly arrives as a second unnecessary wave at the reception antenna of the second antenna pair;

a demodulation functional unit for each of the antenna pairs that demodulates a signal received by the reception antenna by quadrature detection and outputs a demodulated signal that includes a desired wave component and an unnecessary wave component; and a transmission characteristic correction unit that calculates a correction matrix based on a transmission characteristic of a transmission space between the transmission antennae and the reception antennae based on the demodulated signals to acquire output signals corresponding to transmission subject signals, the transmission characteristic correction unit corrects each of the demodulated signals based on the correction matrix such that:
  the desired wave component of the demodulated signal is corrected based on only real number terms,
  the unnecessary wave component of the demodulated signal is corrected based on only imaginary number terms, and the transmission characteristic correction unit adds a corrected desired wave component of the demodulated signal of the first antenna pair to a corrected unnecessary wave component of the demodulated signal of the second antenna pair.

* * * * *